(12) United States Patent
Kiuchi et al.

(10) Patent No.: US 8,169,504 B2
(45) Date of Patent: May 1, 2012

(54) IMAGE PROCESSING DEVICE AND IMAGE PROCESSING METHOD

(75) Inventors: Yutaka Kiuchi, Ayabe (JP); Yutaka Kato, Fukuchiyama (JP)

(73) Assignee: Omron Corporation, Kyoto-shi (JP)

( * ) Notice: Subject to any disclaimer, the term of this patent is extended or adjusted under 35 U.S.C. 154(b) by 301 days.

(21) Appl. No.: 12/714,285

(22) Filed: Feb. 26, 2010

(65) Prior Publication Data

US 2011/0058065 A1 Mar. 10, 2011

(30) Foreign Application Priority Data

Mar. 13, 2009 (JP) ................................ P2009-061015
Feb. 5, 2010 (JP) ................................ P2010-024377

(51) Int. Cl.
*H04N 5/235* (2006.01)
(52) U.S. Cl. ....................... 348/229.1; 348/364; 348/239
(58) Field of Classification Search ............... 348/229.1, 348/239, 362, 364, 86, 92
See application file for complete search history.

(56) References Cited

U.S. PATENT DOCUMENTS

| 5,264,940 | A | * | 11/1993 | Komiya et al. | ............... | 348/298 |
| 6,833,864 | B1 | * | 12/2004 | Ashida | ........................ | 348/229.1 |
| 6,952,234 | B2 | * | 10/2005 | Hatano | ........................ | 348/363 |

FOREIGN PATENT DOCUMENTS

JP 2002-334326 A 11/2002

OTHER PUBLICATIONS

European Patent Office search report on Application No. 10154943.4 mailed Jun. 28, 2010; 3 pages.

Yamada, Keichi, et al.; A Vision Sensor Having an Expanded Dynamic Range for Autonomous Vehicles; IEEE Transactions on Vehicular Technology, vol. 47, No. 1, Feb. 1998; pp. 332-341.

Mantiuk, Rafal, et al.; High Dynamic Range Imaging Pipeline: Perception-Motivated Representation of Visual Content; Human Vision and Electronic Imaging XII, Proceedings of SPIE-IS&T Electronic Imaging, SPIE vol. 6492, 2007; pp. 1-12.

Mantiuk, Radoslaw, et al.; Acceleration of High Dynamic Range Imaging Pipeline Based on Multi-threading and SIMD Technologies; ICCS 2008, Part I, Lecture Notes in Computer Science 5101; 2008; pp. 780-789.

Kumar, Ajay; Computer-Vision-Based Fabric Defect Detection: A Survey; IEEE Transactions on Industrial Electronics, vol. 55, No. 1 Jan. 2008; pp. 348-363.

Moganti, Madhav, et al.; Automatic PCB Inspection Algorithms: A Survey; Computer Vision and Image Understanding vol. 63, No. 2, Mar. 1996; pp. 287-313.

* cited by examiner

*Primary Examiner* — Tuan Ho

(74) *Attorney, Agent, or Firm* — Foley & Lardner LLP

(57) ABSTRACT

This invention provides an image processing device and an image processing method capable of performing image processing of higher accuracy using the synthetic image data with enlarged dynamic range. An image processing method including the steps of acquiring a plurality of input image data with pixel information defined with a first tone range by performing imaging over plural times at different exposure conditions using an imaging unit, generating synthetic image data with pixel information defined with a second tone range wider than the first tone range by synthesizing the plurality of input image data, generating processed image data containing pixel information defined with the second tone range by performing image processing on the synthetic image data for facilitating detection or measurement related to an imaged target; and converting the processed image data to output image data containing pixel information defined with a third tone range narrower than the second tone range is disclosed.

15 Claims, 31 Drawing Sheets

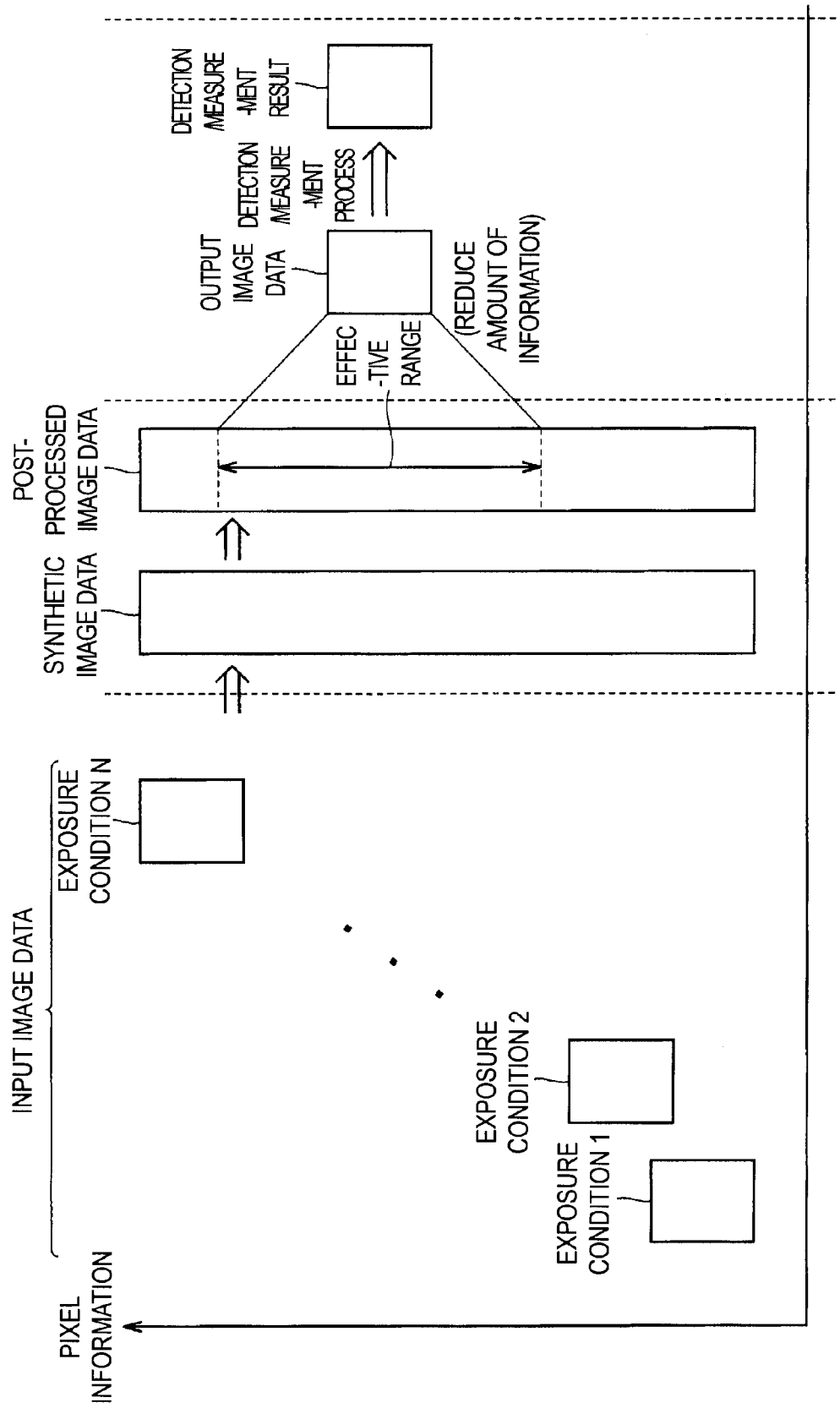

FIG. 7
| EXPOSURE TIME (SEC.) | BRIGHTNESS RANGE |
|---|---|
| 1/125 | 10~30 |
| 1/250 | 20~40 |
| 1/500 | 30~50 |
| 1/1000 | 40~60 |
| 1/2000 | 50~70 |
| 1/4000 | 60~80 |
| 1/8000 | 70~90 |
| 1/16000 | 80~100 |
FIG. 8A
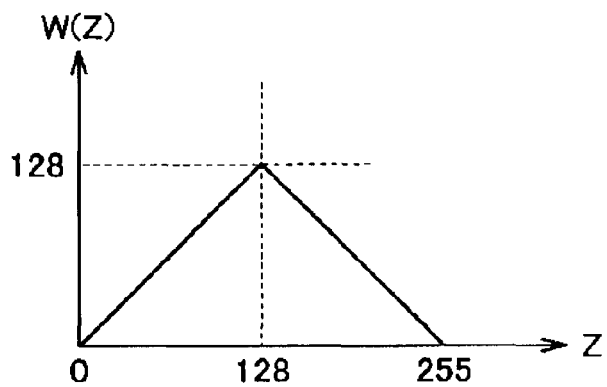
FIG. 8B
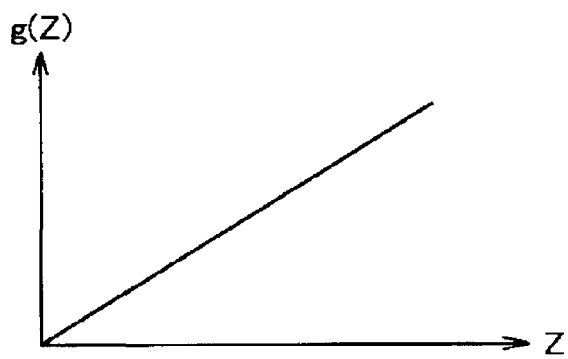

IMAGE PROCESSING DEVICE AND IMAGE PROCESSING METHOD

This application is based on Japanese Patent Application Nos. 2009-061015 and 2010-024377 filed with the Japan Patent Office on Mar. 13, 2009 and Feb. 5, 2010, respectively, the entire content of which is hereby incorporated by reference.

BACKGROUND OF THE INVENTION

1. Technical Field

The present invention relates to an image processing device and an image processing method for enlarging a dynamic range by synthesizing a plurality of images acquired by imaging over plural times under different exposure conditions.

2. Related Art

In the field of FA (Factory Automation) and the like, a so-called visual sensor is being put to practical use as a device for optically detecting defects and the like in a half-finished product of the manufacturing process, a product before shipment, and the like, and for optically measuring the size of the defects and the like.

When performing detections and measurements using such a visual sensor, the target needs to be appropriately imaged. The dynamic range (tone range where light can be detected) of the imaging element such as a CCD (Coupled Charged Device) and CMOS (Complementary Metal Oxide Semiconductor) is generally finite. Thus, when the exposure time in time of imaging becomes relatively long, whiteout (halation) entirely or partially occurs, and the luminance and the color information of the target cannot be accurately acquired. When the exposure time in time of imaging becomes relatively short, total underexposure entirely or partially occurs, and an effective luminance cannot be acquired. Furthermore, in the target having portions where the reflectivity locally differs and the target having portions of large curvature, local whiteout and total underexposure occur from influence of lighting and the like.

Thus, if the difference between the minimum value and the maximum value of the light intensity (light energy that enters per unit time) radiated from the same target exceeds the range of the dynamic range of the imaging element, the entire target cannot be appropriately imaged.

A technique of enlarging the dynamic range by imaging the same target over plural times under different exposure conditions, and synthesizing a plurality of images obtained thereby is known. Such a process is also referred to as a high dynamic synthesizing process or super latitude process (Super Latitude process). For instance, Japanese Unexamined Patent Publication No. 2002-334326 discloses a visual sensor that realizes enlargement of the dynamic range with small calculation processing load.

SUMMARY

However, if the subsequent process of the output destination and the dynamic range of the device are limited, the interiorly generated image data in which the dynamic range is enlarged by the image synthesizing process need to be adapted to the dynamic range of the output destination at the time of output. In other words, the synthetic image data in which each pixel has greater amount of information had to be output with the amount of information reduced. Thus, when attempting to perform further image processing (e.g., defect detection process etc.) on the synthetic image data output with the amount of information reduced, the amount of information of the synthetic image data with enlarged dynamic range cannot be effectively used.

The present invention has been devised to solve the problems described above, and an object thereof is to provide an image processing device and an image processing method capable of performing image processing of higher accuracy using the synthetic image data with enlarged dynamic range.

In accordance with one aspect of the present invention, there is provided an image processing device connected to an imaging unit, in which exposure conditions are changeable. The image processing device includes an acquiring unit, a synthesizing unit, a processing unit, and a conversion unit. The acquiring unit acquires a plurality of input image data by performing imaging over plural times at different exposure conditions using the imaging unit. The input image data contains pixel information defined with a first tone range corresponding to a detection sensitivity of the imaging unit. The synthesizing unit generates synthetic image data by synthesizing the plurality of input image data. The synthetic image data containing pixel information defined with a second tone range wider than the first tone range. The processing unit generates processed image data containing pixel information defined with the second tone range by performing image processing on the synthetic image data to facilitate detection or measurement related to an imaged target. The conversion unit for converting the processed image data to output image data containing pixel information defined with a third tone range narrower than the second tone range.

Preferably, the processing unit generates the processed image data by performing image data comparison on the synthetic image data.

Further preferably, the processing unit generates the processed image data by calculating an image difference with respect to model image data registered in advance for the synthetic image data.

Further preferably, the processing unit includes, a unit for generating first smoothed image data by performing a first smoothing process on the synthetic image data, a unit for generating second smoothed image data by performing a second smoothing process different from the first smoothing process on the synthetic image data, and a unit for generating the processed image data by calculating an image difference between the first smoothed image data and the second smoothed image data.

Preferably, the processing unit generates the processed image data reflecting a characteristic quantity on the pixel information contained in the synthetic image data.

Further preferably, the processing unit calculates, from pixel information of each pixel and pixels adjacent to the pixel contained in the synthetic image data, the pixel information of each pixel of the processed image data corresponding to the pixel.

Preferably, the image processing device is further connected to a display unit, and the third tone range is adapted to a displayable tone in the display unit.

Preferably, the third tone range is adapted to an output destination device of the output image data. Preferably, the conversion unit assigns the pixel information including a value being within a predetermined range of the pieces of pixel information of the processed image data to an effective value in the third tone range.

Further preferably, the image processing device is further connected to an input unit for accepting user instruction, and when a lower limit value and an upper limit value are set through the input unit, the conversion unit assigns a tone value of the lower limit value of the third tone range with respect to a pixel, a value of the pixel information matching the lower limit value, and assigns a tone value of the upper limit value of the third tone range with respect to a pixel, a value of the pixel information matching the upper limit value.

Preferably, the processing unit generates the processed image data from image data, which is one part of the synthetic image data.

Preferably, the image processing device further includes a detection measurement unit for executing a detection process or a measurement process related to the imaged target using the output image data.

In accordance with another aspect of the present invention, there is provided an image processing method in a processing device connected to an imaging unit, in which exposure conditions are changeable. The method includes the steps of: acquiring a plurality of input image data by performing imaging over plural times at different exposure conditions using the imaging unit, the input image data containing pixel information defined with a first tone range corresponding to a detection sensitivity of the imaging unit; generating synthetic image data by synthesizing the plurality of input image data, the synthetic image data containing pixel information defined with a second tone range wider than the first tone range; generating processed image data containing pixel information defined with the second tone range by performing image processing on the synthetic image data to facilitate detection or measurement related to an imaged target; and converting the processed image data to output image data containing pixel information defined with a third tone range narrower than the second tone range.

Preferably, the generating step includes a step of generating the processed image data by performing image data comparison on the synthetic image data.

Preferably, the generating step includes a step of generating the processed image data reflecting a characteristic quantity on the pixel information contained in the synthetic image data.

According to the present invention, image processing of higher accuracy can be performed using the synthetic image data with enlarged dynamic range.

BRIEF DESCRIPTION OF THE DRAWINGS

FIG. 4 is a conceptual view for describing the outline of the process in the image processing device according to the embodiment of the present invention;

FIG. 7 is a view showing one example of a relationship of the exposure time set in the imaging unit 8 and the "brightness" range suited for imaging;

FIGS. 8A and 8B are views showing one example of characteristics of the weight function and the response function;

DETAILED DESCRIPTION

Figure 1:
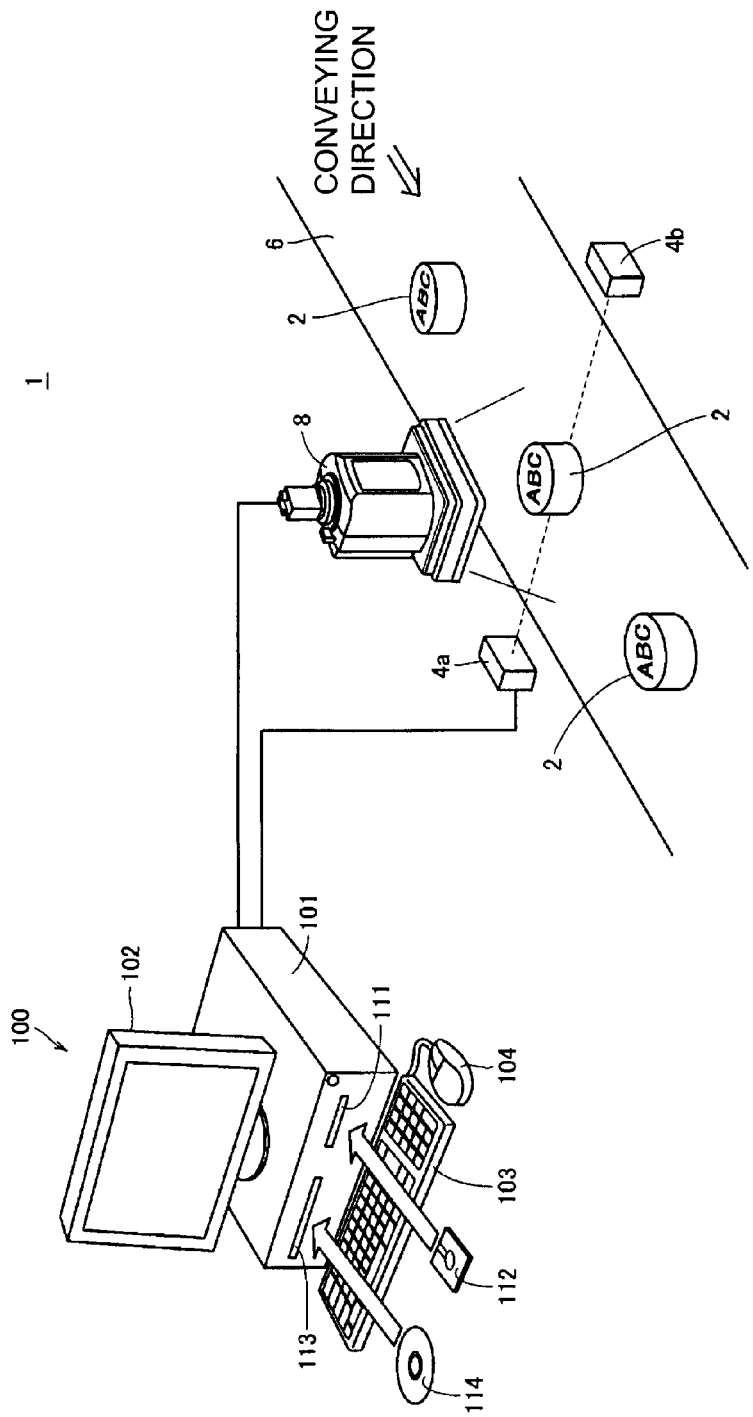
FIG. 1 is a schematic view showing an overall configuration of a visual sensor system including an image processing device according to an embodiment of the present invention.

Hereinafter, preferred embodiments of the present invention will be described with reference to the drawings. The same reference numerals will be denoted on the same or corresponding portions throughout the figures, and the description thereof will not be repeated.

A. General Outline

An image processing device according to the embodiments of the present invention acquires a plurality of image data (hereinafter also referred to as "input image data") by imaging a target (hereinafter also referred to as "work") over plural times under different exposure conditions, and generates synthetic image data reflecting the pixel information (color information and luminance) of each acquired input image data. Through such an image synthesizing process, image data (hereinafter also referred to as "synthetic image data") having a wider dynamic range is generated compared to the dynamic range (tone range corresponding to detection sensitivity) unique to the imaging unit.

In particular, according to the present embodiment, various types of image processing (post-process) are directly performed with the synthetic image data having a wider dynamic range as the target, and the image data obtained from such a post-process (hereinafter also referred to as "post-processed image data") is converted to image data (hereinafter also referred to as "output image data") having a dynamic range adapted to the tone range of the output destination. The post-process is typically image processing for facilitating the detection or the measurement related to the imaged work. In the post-process, the process is carried out while maintaining the dynamic range of the synthetic image data. Thus, the pixel information of the synthetic image data will not be lost when generating the post-processed image data. In the following description, the generation process of the post-processed image data and the conversion process from the post-processed image data to the output image data are sometimes collectively termed as "post-process".

Thus, image processing of higher accuracy can be performed using the synthetic image data with enlarged dynamic range, and display, process, and the like corresponding to the ability of the output destination can be performed.

Various types of post-processes implemented by the image processing device according to the present embodiment will be described after describing the configuration of the image processing device according to the present embodiment and the image synthesizing process for generating the synthetic image data.

B. Entire Device Configuration

FIG. 1 is a schematic view showing an overall configuration of a visual sensor system 1 including an image processing device according to an embodiment of the present invention.

With reference to FIG. 1, the visual sensor system 1 is representatively incorporated in a production line and the like to optically detect defects and the like in a work 2 and to optically measure the size thereof. By way of example, the work 2 is conveyed by a conveyance line 6 such as a belt conveyor. The control on the conveyance line 6 such as start and stop of conveyance, and change of conveyance speed may be carried out by a PLC (Programmable Logic Controller) and the like (not shown).

An imaging unit 8 arranged at a predetermined relative position with respect to the conveyance line 6 starts imaging of plural times when the work 2 reaches the view thereof. The arrival of the work 2 is detected by a sensor arranged on the conveyance line 6. As shown in FIG. 1, a photoelectric sensor is typically arranged on both sides of the conveyance line 6, and imaging by the imaging unit 8 starts in response to a detection signal (hereinafter also referred to as "trigger signal") from the photoelectric sensor. More specifically, the photoelectric sensor includes a light receiving portion 4a and a light emitting portion 4b arranged on the same optical axis, where the trigger signal is output when the light receiving portion 4a detects that the light radiated from the light emitting portion 4b is shielded by the work 2. The imaging unit 8 may repeatedly perform imaging at a predetermined cycle during the period the image synthesizing process is stopped.

A plurality of input image data acquired by imaging over plural times by the imaging unit 8 is transmitted to a computer 100, which is a processing device typically embodying the image processing device according to the present embodiment. In the present embodiment, a process handling color input image data will be mainly described, but application can be similarly made to monochrome input image data.

By way of example, the imaging unit 8 is configured to include an imaging element partitioned into a plurality of pixels such as a CCD (Coupled Charged Device) and CIS (Complementary Metal Oxide Semiconductor Image Sensor) sensor in addition to an optical system such as a lens. The imaging element corresponding to each pixel has one or a plurality of spectral sensitivity with respect to the incident light.

More specifically, the imaging element of the imaging unit 8 typically has spectral sensitivity for each of "red", "green", and "blue" based on three primary colors of light with respect to each pixel. The imaging element of the imaging unit 8 outputs detection values (R luminance, G luminance, B luminance) of three colors of "red", "green", and "blue" for the incident light. The R luminance corresponds to a gray value indicating the magnitude of the light intensity (light energy entered within a certain exposure time) corresponding to the wavelength component contained in the red spectral sensitivity of the light entering the imaging element. The G luminance and the B luminance respectively correspond to the gray value indicating the magnitude of the light intensity corresponding to the wavelength component contained in the corresponding spectral sensitivity. In the present embodiment, the R luminance, the G luminance, and the B luminance are all assumed to be typically defined in the range of eight bits (0 to 255 tones). In other words, the imaging unit 8 outputs the input image data having pixel information defined by the 256 tone ranges corresponding to the detection sensitivity thereof. The pixel information of the input image data output from the imaging unit 8 may have greater amount of information, and may be ten bits or twelve bits.

The spectral sensitivity of the imaging element is not limited to three (three bands) and the imaging element may have spectral sensitivity to more colors. A more imageable color gamut can be enlarged by using the multiband imaging element. Alternatively, the detection values (C luminance, M luminance, Y luminance) of three colors of "cyan", "magenta", and "yellow", which are complementary colors of the three primary colors of light, may be included as pixel information. When using a single CCD and the like, each pixel sometimes has light reception sensitivity with respect to only one of "red", "green", and "blue". In such a case, the input image data having pixel information for each of "red", "green", and "blue" may be generated by an interpolation unit (not shown).

The imaging unit 8 can change the exposure condition in time of imaging. The exposure condition is a value for adjusting the light energy entering the imaging element in one imaging, and is typically adjusted, representatively, by a mechanical or electronic shutter speed, an aperture amount of the optical system, illumination intensity to irradiate the imaging target, and the like. In the present embodiment, a configuration of adjusting the "exposure time" is illustrated as a representative example of the exposure condition assuming the illumination intensity on the imaging target is constant, but not limited to the exposure time, the aperture amount, the illumination intensity, and the like may be adjusted.

The computer 100 includes a computer body 101 for mounting a FD (Flexible Disc) driving device 111 and a CD-ROM (Compact Disc Read Only Memory) driving device 113, a monitor 102 serving as an output unit, and a keyboard 103 and a mouse 104 serving as input units. The computer body 101 executes a program stored in advance to implement the image processing device according to the present embodiment.

C. Hardware Configuration

Figure 2:
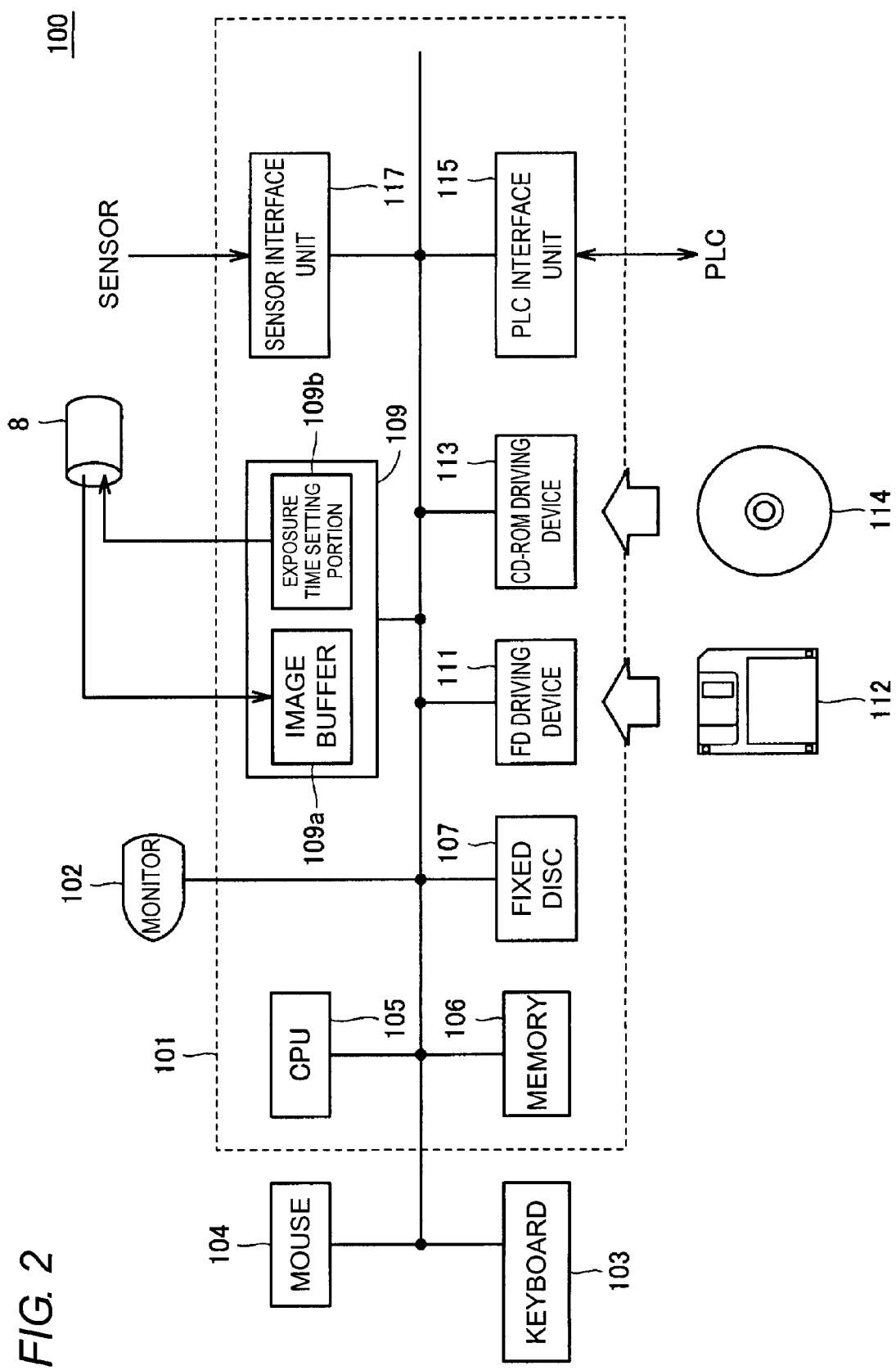
FIG. 2 is a schematic configuration diagram showing a hardware configuration of a computer according to an embodiment of the present invention.

FIG. 2 is a schematic configuration diagram showing a hardware configuration of the computer 100 according to an embodiment of the present invention.

With reference to FIG. 2, the computer body 101 includes, in addition to the FD driving device 111 and the CD-ROM driving device 113 shown in FIG. 1, a CPU (Central Processing Unit) 105, a memory 106, a fixed disc 107, a camera interface unit 109, a PLC interface unit 115, and a sensor interface unit 117, which are mutually connected with a bus.

An FD 112 is attachable to the FD driving device 111, and a CD-ROM 114 is attachable to the CD-ROM driving device 113. As described above, the image processing device according to the present embodiment is typically implemented when the CPU 105 executes a program using a computer hardware such as the memory 106. Such a program is generally stored in a recording medium such as the FD 112 and the CD-ROM 114, or circulated through network and the like. Such a program is read from the recording medium by the FD driving device 111 or the CD-ROM driving device 113, and once stored in the fixed disc 107, which is a storage device. The program is then read from the fixed disc 107 to the memory 106 and executed by the CPU 105.

The CPU 105 is a calculation processing unit for performing various types of calculations by sequentially executing the programmed commands. The memory 106 temporarily stores various types of information according to the execution of the program in the CPU 105.

The camera interface unit 109 enables data communication between the computer body 101 and the imaging unit 8. More specifically, the camera interface unit 109 includes an image buffer 109a and an exposure time setting portion 109b. The image buffer 109a once accumulates the input image data imaged and sequentially transmitted by the imaging unit 8, and transfers the accumulated data to the memory 106 or the fixed disc 107 when the input image data for one imaging is accumulated. The exposure time setting portion 109b transmits a command to the imaging unit 8 before imaging according to an internal command from the CPU 105, and sets the exposure time in the imaging unit 8.

The PLC interface unit 115 is a device for enabling data communication between the computer body 101 and a PLC (not shown). The sensor interface unit 117 receives a trigger signal from the photoelectric sensor, and the like, and transmits the same to the CPU 105.

The fixed disc 107 is a non-volatile storage device for storing programs to be executed by the CPU 105, input image data, and the like.

The monitor 102 connected to the computer body 101 is a display unit for displaying the information output by the CPU 105, and is configured by LCD (Liquid Crystal Display), CRT (Cathode Ray Tube), and the like, by way of example.

The mouse 104 accepts instruction from the user corresponding to the operation of clicking, sliding, and the like. The keyboard 103 accepts instruction from the user corresponding to the input key. The input device is not limited to the keyboard 103 and the mouse 104, and a touch device, a push button, and the like may be used.

D. Operation Mode

The visual sensor system 1 according to the present embodiment can generate the synthetic image data by imaging the work 2 over plural times, and can select an "operation mode" for executing detections and measurements on the synthetic image data, as necessary, and a "setting mode" for performing the setting related to the image synthesizing process for the work 2. The user can adjust the setting related to the image synthesizing process while referencing the generated synthetic image data on the monitor 102 in the "setting mode".

E. Image Synthesizing Process

The image synthesizing process for generating the synthetic image data will now be described. The image synthesizing process according to the present embodiment mainly aims to synthesize the image data having a dynamic range wider than the unique dynamic range of the imaging unit 8.

Figure 3A:
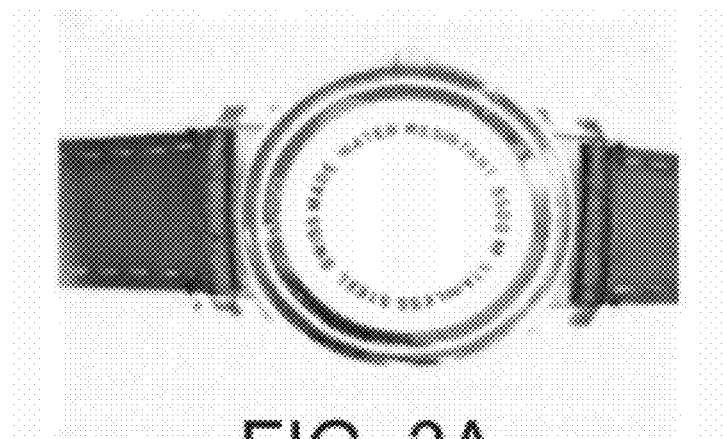
FIGS. 3A to 3C are views showing input image data when the back surface of a watch is imaged as a work.
Figure 3B:
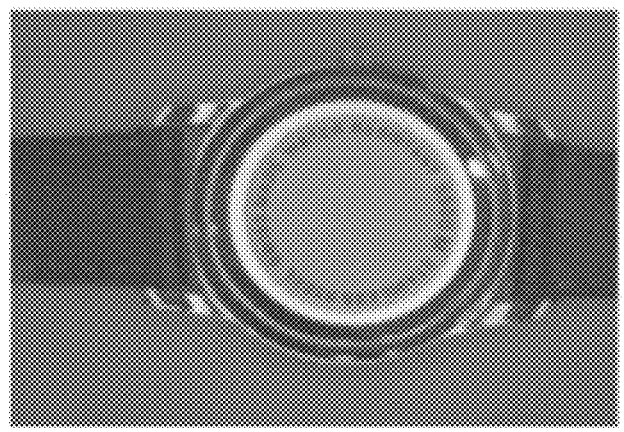
Figure 3C:
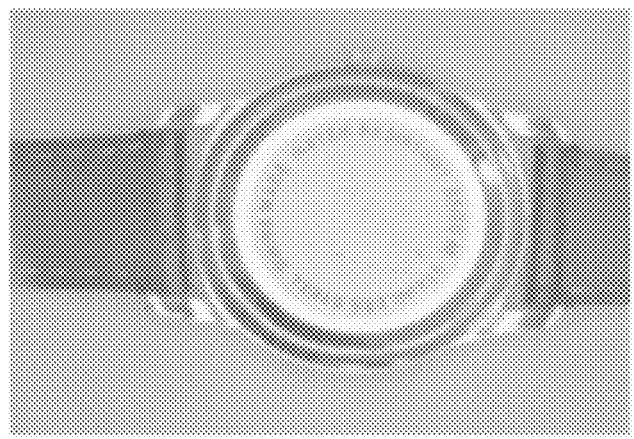

FIGS. 3A to 3C are views showing the input image data when the back surface of a watch is imaged as a work. FIG. 3A shows the input image data acquired by one imaging under a condition of relatively long exposure time, and FIG. 3B shows the input image data acquired by one imaging under a condition of relatively short exposure time. In FIGS. 3A and 3B, the intensity of the incident light is assumed to be the same condition. The work shown in FIGS. 3A to 3C includes a clock main body made of metal and a band made of leather. As the reflectivity of the clock main body and the band greatly differs, a large difference also creates in the light intensity (light energy radiated per unit time) radiated from each part.

Thus, when the exposure time becomes long, the clock main body having a relatively high reflectivity produces whiteout, and effective pixel information cannot be acquired. In other words, the characters marked on the clock main body cannot be identified, as shown in FIG. 3A. When the exposure time becomes short, the light energy cannot be sufficiently received from the band having a relatively low reflectivity, and effective pixel information cannot be acquired. In other words, the band produces total underexposure, and defects such as stitches cannot be identified, as shown in FIG. 3B.

The image processing device according to the present embodiment thus images the same work 2 over plural times at different exposure conditions (exposure time), and generates the synthetic image data from a plurality of acquired input image data. The input image data includes pixel information (tone value indicating the luminance of each color) indicating the distribution of the light intensity entering the imaging unit 8, and the image processing device according to the present embodiment calculates the color information (hereinafter also referred to as "synthetic color information") and the luminance (hereinafter also referred to as "synthetic luminance") of each pixel of the synthetic image data based on the value (tone value indicating the luminance of each color) indicating the light intensity contained in the respective input image data corresponding to each pixel and the exposure condition (exposure time) in time of imaging of the corresponding input image data. The synthetic image data is then generated based on the synthetic color information and the synthetic luminance.

In other words, the synthetic luminance is equivalent to the luminance value corresponding to the light intensity entering the imaging element of the imaging unit 8, and has a luminance resolution of greater than or equal to a constant value within the effective dynamic range. The effective dynamic range means the difference between the minimum value and the maximum value of the synthetic luminance, or the range in between.

In summary, in the calculation process of the synthetic luminance, the value (luminance) indicating the light intensity in the respective input image data is standardized with the exposure time for each pixel. That which magnitude of the standardized light intensity is in an appropriate range is preferentially adopted. In other words, the synthetic luminance of each pixel in the synthetic image data is calculated with the information of the pixel imaged at the exposure time suited to the light intensity (light energy that enters per unit time) radiated from the work 2 of the information of the corresponding pixels of the plurality of input image data as the main component. Through such a process, the synthetic image data can be generated as a collection of pixels having the luminance imaged at an appropriate exposure time. FIG. 3C is a view showing one example of the synthetic image data generated by the image synthesizing process according to the present embodiment. As shown in FIG. 3C, the synthetic image data that does not include whiteout as in FIG. 3A and total underexposure as in FIG. 3B can be generated by performing the above-described image synthesizing process.

F. Outline of Process

Figure 5:
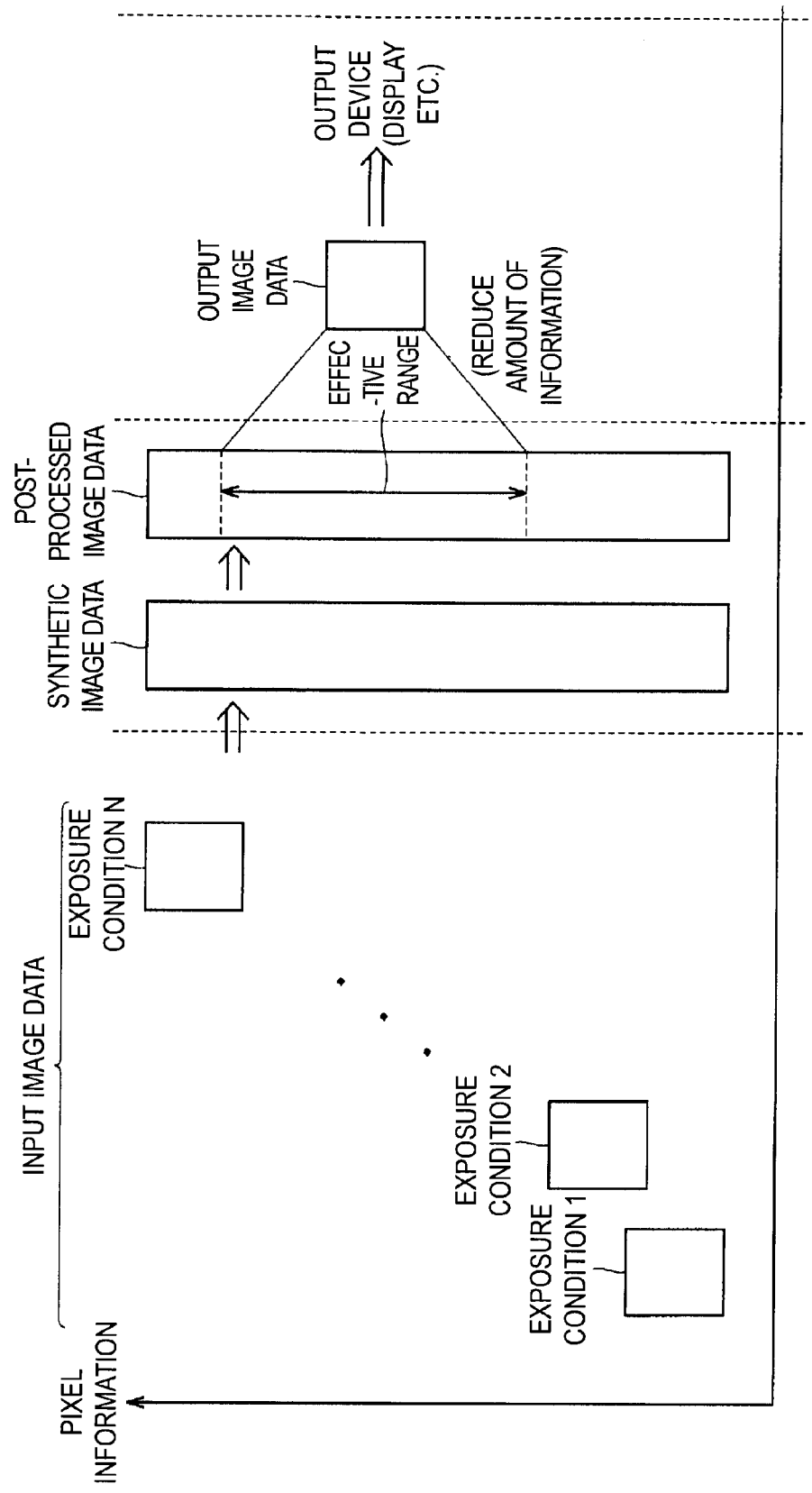
FIG. 5 is a conceptual view for describing the outline of the process in the image processing device according to the embodiment of the present invention.

FIGS. 4 and 5 are conceptual views for describing the outline of the process in the image processing device according to the embodiment of the present invention. FIG. 4 shows an example in which the detection/measurement process is executed as the subsequent process, and FIG. 5 shows an example in which the display process to the monitor, and the like is executed as the subsequent process.

With reference to FIGS. 4 and 5, the image processing device according to the present embodiment acquires plural input image data by performing imaging over plural times under different exposure conditions with respect to the imaging unit 8. Each input image has pixel information defined with the tone range (dynamic range) corresponding to the detection sensitivity of the imaging unit 8.

The synthetic image data with enlarged dynamic range is generated by performing the image synthesizing process on the plurality of input image data. In other words, the synthetic image data has pixel information defined with the tone range (dynamic range) wider than the tone range of the pixel information of the respective input image data.

Furthermore, the post-processed image data is generated by performing the post-process for facilitating the detection or the measurement related to the imaged work with the synthetic image data as the target. The post-processed image data has pixel information defined with the tone range (dynamic range) the same as the tone range of the pixel information of the synthetic image data.

Generally, output image data effectively containing only the pixel information existing in a predetermined range specified by the user rather than all pixel information of the generated post-processed image data. In this case, the dynamic range of the output image data is also limited to adapt to the output destination if the subsequent process of the output destination or the tone range (dynamic range) of the device is limited. In other words, the output image data is generated after the amount of information of the post-processed image data is reduced. That is, the post-processed image data is converted to the output image data having pixel information defined with the tone range narrower than the tone range (dynamic range) of the synthetic image data.

For instance, as shown in FIG. 4, when outputting the output image data to the subsequent process such as the detection process or the measurement process, the pixel information of each pixel of the output image data is adapted to the processable tone in the detection/measurement process. The detection process and the measurement process are then executed on the output image data.

As shown in FIG. 5, when outputting the output image data to the display device such as the monitor 102, the pixel information of each pixel of the output image data is adapted to the displayable tone in the display device.

More specifically, in the present embodiment, both the input image data and the output image data have amount of information of eight bits (256 tones) for each color, and the synthetic image data has amount of information of 32 bits ($4.29 \times 10^9$ tones) for each color.

Thus, when performing various types of post-processes on the output image data after the amount of information is reduced, the amount of information of the brightness obtained by the image synthesizing process cannot be sufficiently utilized.

The image processing device according to the present embodiment thus applies the post-process on the synthetic image data having greater amount of information rather than the output image data in the application where various types of post-processes need to be performed, and outputs the processing result as the output image data.

A greater amount of information obtained by the image synthesizing process can be utilized as is, and displaying, processing, and the like corresponding to the ability of the output destination can be performed by adopting such processing procedure.

The output destination device includes other image processing devices, printer devices, plotter devices, information transmitting devices, and like, in addition to the monitor 102.

G. Processing Content

The image synthesizing process according to the present embodiment mainly executes the following processes.
(1) Process of imaging the work over plural times at different exposure times (imaging process)

(2) Process of calculating the synthetic luminance from the luminance of the imaged input image data (luminance synthesizing process)

(3) Process of calculating the synthetic color information from the color information of the imaged input image data (color synthesizing process)

(4) Process of generating the synthetic image data from the synthetic color information and the synthetic luminance (image synthesizing process)

(5) Process of executing various types of image processing on the synthetic image data and outputting the result as the output image data (post-process)

(6) (as necessary) Process (detection/measurement process) of executing the detection process of the measurement process related to the imaged work using the output image data.

Hereinafter, the outline of the processes (1) to (4) will be first described, and then the process of generating the image data by performing image data comparison based on the synthetic image data and the process of generating the image data reflecting the feature quantity on the pixel information contained in the synthetic image data will be described as an example of the typical (5) post-process.

H. Overall Control Structure

Figure 6:
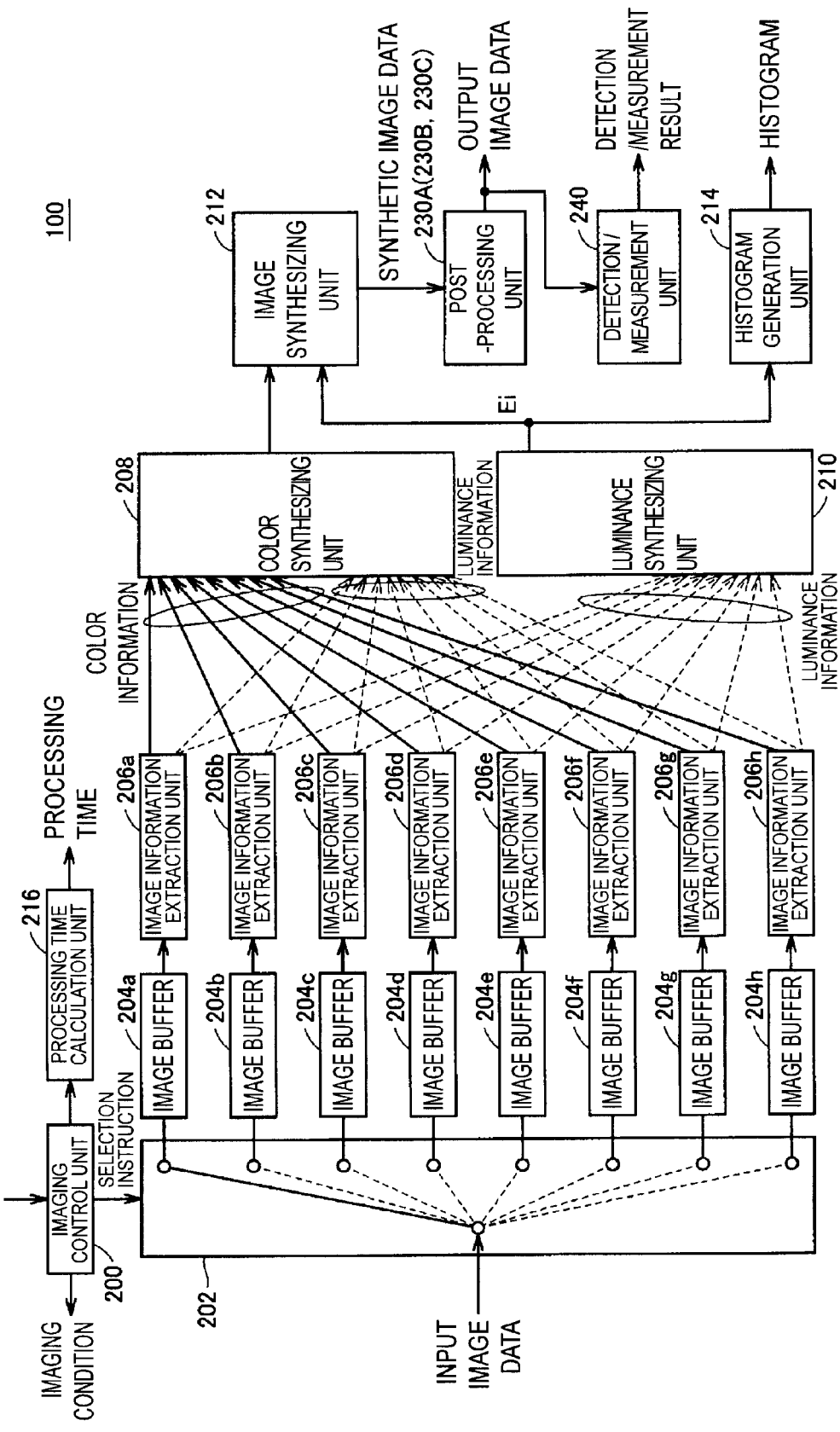
FIG. 6 is a function block diagram showing an overall control structure of the image processing device according to the embodiment of the present invention.

FIG. 6 is a function block diagram showing the overall control structure of the image processing device according to the embodiment of the present invention.

With reference to FIG. 6, the image processing device includes, a photographing control unit 200, a selection unit 202, and image buffers 204a to 204h as a control structure for realizing the (1) imaging process; image information extraction units 206a to 206h, a luminance synthesizing unit 210 and a histogram generation unit 214 as a control structure for realizing the (2) luminance synthesizing process; the image information extraction units 206a to 206h and a color synthesizing unit 208 as a control structure for realizing the (3) color synthesizing process; an image synthesizing unit 212 as a control structure for realizing the (4) image synthesizing process; a post-processing unit 230A (or post-processing unit 230B or 230C) as a control structure for realizing the (5) post-process; and a detection/measurement unit 240 as a control structure for realizing the (6) detection/measurement process.

The content of each process in the image processing device according to the present embodiment will be described below with the operation of each function block.

(1) Imaging Process

With reference to FIG. 6, the imaging control unit 200 acquires a plurality of input image data by imaging the same work 2 over plural times at different exposure conditions (exposure time) using the imaging unit 8. The input image data indicates the content of view of the imaging unit 8 at the respective imaging timing. The imaging control unit 200 determines how to set to the exposure condition according to the user setting. More specifically, the imaging unit 8 according to the present embodiment includes an electronic shutter, which shutter speed can be arbitrarily set, by way of example, so that the exposure time can be arbitrarily changed. The exposure time that can be changed includes eight patterns, as a default, "1/125 seconds", "1/250 seconds", "1/500 seconds", "1/1000 seconds", "1/2000 seconds", "1/4000 seconds", "1/8000 seconds", and "1/16000 seconds" as a standard. The exposure time group that can be changed is set so as to be sequentially faster at the power of two with "1/125 seconds" as a reference (slowest value).

The imaging control unit 200 repeatedly executes the setting of the exposure time to the imaging unit 8 before each imaging and the imaging of the work 2 at the set exposure time using the imaging unit 8 according to the set value (number of imaging times, exposure time in each imaging, etc.) defined in advance. Furthermore, the imaging control unit 200 provides a selection instruction to the selection unit 202 in synchronization with each imaging, and sequentially stores the input image data generated when the imaging unit 8 sequentially images the work 2 in the image buffers 204a to 204h.

The selection unit 202 is arranged between the imaging unit 8 and the image buffers 204a to 204h, and electrically connects one of the image buffers 204a to 204h and the imaging unit 8 in response to the selection instruction from the imaging control unit 200. According to such an operation, the input image data generated when the imaging unit 8 images the work 2 is sequentially stored in the image buffers 204a to 204h. In the following, the image buffers 204a to 204h are also collectively referred to as "image buffer 204".

The image buffer 204 is arranged in correspondence to the exposure time of the imaging unit 8, and stores the input image data imaged at a corresponding specific exposure time. For instance, the image buffer 204a stores only the input image data imaged at a condition where the exposure time is "1/125 seconds", and the image buffer 204b stores only the input image data imaged at a condition where the exposure time is "1/250 seconds".

As hereinafter described, the work 2 does not need to be imaged at all exposure times that can be set to the imaging unit 8 when generating the synthetic image data. In other words, a plurality of exposure times can be set so as to include the appropriate "brightness" range according to the light intensity radiated by the work 2.

(2) Luminance Synthesizing Process

The image information extraction units 206a to 206h are respectively corresponded to the image buffers 204a to 204h, and extract the color information and the luminance from the input image data stored in the corresponding image buffer 204. The input image data is assumed to representatively contain the luminance (R luminance, G luminance, B luminance) of three colors or values corresponding to the light energy entering each pixel. The color information of the input image data represents the relative relationship (relative ratio) of each luminance after standardizing the luminance of the three colors. The luminance of the input image data comprehensively represents the light energy entering each pixel, and corresponds to the average value (or sum) of the luminance of the three colors.

The image information extraction units 206a to 206h then output the extracted color information to the color synthesizing unit 208 and output the extracted luminance to the color synthesizing unit 208 and the luminance synthesizing unit 210.

After a series of imaging over plural times (all imaging necessary for generating one synthetic image data) by the imaging unit 8 are completed, the luminance synthesizing unit 210 calculates the synthetic luminance of each pixel after standardizing the luminance of the respective input image data with the corresponding exposure time. As described above, the range of the light intensity suited for imaging fluctuates by changing the exposure time in the imaging unit 8. In other words, relatively short exposure time is suited for imaging of the range of greater light intensity and the relatively long exposure time is suited for imaging of the range of smaller light intensity.

In the present specification, an index "brightness" corresponding to the magnitude of the light energy radiated from the work is used. The "brightness" is a relative value that depends on the performance of the imaging unit 8, where the actual light intensity (or light energy) differs even if the "brightness" is the same if the sensitivity of the imaging element, the open value of the optical value, and the like are different.

Generally, the magnitude of the light energy entering the imaging unit 8 (imaging element) is assumed to be proportional to the exposure time. Thus, the "brightness" in the present specification obtained by dividing the luminance detected by the imaging unit 8 with the exposure time and taking the logarithm of such a value is representatively used. Therefore, the "brightness" in the present specification is an index indicating the magnitude of the light energy (light intensity) per unit exposure time. Through the use of such a "brightness", the "brightness" range suited for imaging by the imaging unit 8 can be defined in advance in correspondence to each exposure time that can be set to the imaging unit 8.

More specifically, as the eight exposure times that can be set to the imaging unit 8 according to the present embodiment become sequentially shorter at power of two, the correspondence relationship of each exposure time and the "brightness" can be defined as in FIG. 7.

FIG. 7 is a view showing one example of a relationship of the exposure time set in the imaging unit 8 and the "brightness" range suited for imaging. With reference to FIG. 7, if the "brightness" range suited for imaging when the exposure time is "1/125 seconds" is "10 to 30", the "brightness" range suited for imaging can be set to "20 to 40", added by "10" when the exposure time is "1/250 seconds", which is ½ times. The exposure time can be set to cover the "brightness" range of "10 to 100" in correspondence to the range of "1/125 seconds" to "1/16000 seconds" by sequentially setting in such a manner.

Furthermore, the respective "brightness" range is preferably set to be covered by a plurality of exposure times. In the example shown in FIG. 7, the "brightness" range is set to be covered by at least two exposure times at any position between 10 and 90. In other words, the exposure time where the "brightness" range includes "60" is "1/1000 seconds", "1/2000 seconds", and "1/4000 seconds". According to such a setting, the setting can be made such that the imaging of plural times can be performed at different exposure times.

The relationship of the exposure time and the "brightness" range shown in FIG. 7 is such that the imaging at each of the plurality of exposure times corresponding to the setting is performed when the necessary "brightness" range is set by the user of the "brightness" ranges that can be imaged in the imaging unit 8. In other words, the processing time necessary to generate one synthetic image data can be shortened by performing only the imaging at the specific exposure time instead of performing the imaging at all exposure times that can be set to the imaging unit 8.

More specifically, when the "brightness" range is set to "30 to 50" by the user, three imaging per one process are performed at the exposure time of "1/250 seconds", "1/500 seconds", and "1/1000 seconds" included in such a range.

Again referring to FIG. 6, the luminance synthesizing unit 210 calculates the synthetic luminance of the luminance of each pixel of the synthetic image using a plurality of input image data acquired by a series of photographing with respect to the workpiece 2. More specifically, the luminance synthesizing unit 210 standardizes the luminance of each pixel in the P pieces of input image data corresponding to each pixel (coordinate position i) of the synthetic image data with the exposure time to calculate the synthetic luminance $E_i$ of each pixel. The calculation formula of the synthetic luminance $E_i$ by the luminance synthesizing unit 210 is as expressed in equation (1).

$$\ln E_i = \frac{\sum_{j=1}^{P} w(Z_{i,j})(\ln g(Z_{i,j}) - \ln \Delta t_j + C)}{\sum_{j=1}^{P} w(Z_{i,j})} \quad (1)$$

Where,
$w(Z)$: weighting function,
$g(Z)$: response function of imaging element
$Z_{i,j}$: luminance information at coordinate position i of $j^{th}$ input image datum
$\Delta t_j$: exposure time of $j^{th}$ input image datum In equation (1), the term "$\ln(g(Z_{i,j}) - \ln \Delta t_j)$" is equivalent to the value obtained by standardizing the luminance in each input image data with the exposure time and evaluating as the "brightness". This is based on the technical idea that even if the luminance is the same "128", the actual "brightness" is to be evaluated as a greater value if the exposure time is relatively short, and the actual "brightness" is to be evaluated as a smaller value if the exposure time is relatively long. In other words, the standardization ($=g(Z_{i,j})/\Delta t_j$) by the exposure time is performed by multiplying the coefficient $1/\Delta t_j$ corresponding to the exposure time at the time of photographing of the corresponding input image data so that the term can be transformed as $\ln \{g(Z_{i,j})/\Delta t_j\}$, and then the synthetic luminance $E_i$ is calculated using the standardized value.

Representatively, the synthetic luminance $E_i$ is calculated as a value in the range of 0 to 100 according to the relationship of each exposure time and the "brightness" range shown in FIG. 7. For the sake of facilitating the understanding, the synthetic luminance is expressed in the range of between 0 and 100, but the tone range of "brightness" of the image data obtained by synthesizing becomes greater than the tone range of the image data acquired in one imaging, and thus is a value having digits after the decimal point as the data (e.g., handle as value up to four digits or five digits after the decimal point using data of 32 bits).

In the above equation, the weighting function $w(Z)$ and the response function $g(Z)$ of the imaging element of the imaging unit 8 are introduced. Such functions will be described with reference to FIGS. 8A and 8B.

FIGS. 8A and 8B are diagrams showing one example of characteristics of the weighting function and the response function. FIG. 8A shows the characteristic of the weighting function $w(Z)$, and FIG. 8B shows the characteristic of the response function $g(Z)$.

With reference to FIG. 8A, the weighting function $w(Z)$ is a function reflecting the reliability in accordance with the value of the luminance outputted from the imaging unit 8. In other words, the value close to the lower limit (0) or the upper limit (255) of the luminance outputted from the imaging unit 8 at a certain exposure time is assumed to have low reliability compared to the value close to an intermediate value (128). In other words, if the imaging unit 8 photographs the measuring article having the most suitable "brightness" at a certain exposure time, the luminance is assumed to be at substantially the intermediate value.

In view of such characteristics, a function in which the value in the vicinity of the lower limit value or the upper limit value becomes smaller compared to the vicinity of the intermediate value in the fluctuation range of the luminance is preferably used for the weight function w(Z). By way of example, in the present embodiment, a weight function of triangular shape in which the intermediate value in the fluctuation range of the luminance becomes a maximum value (128) and becomes zero at the lower limit value and the upper limit value is adopted. With the use of such a weight function, that which luminance is within the predetermined range, of the input image data for every exposure time, is preferentially used to calculate the synthetic luminance.

Using FIG. 8B, the response function g(Z) is a function for compensating the nonlinearity between the luminance distribution output from the imaging unit 8 and the light energy distribution actually input to the imaging unit 8. For instance, in the imaging element such as the CCD, the relationship of the input light energy or the light quantity and the output voltage signal is nonlinear. Such a nonlinear characteristic is also referred to as a gamma characteristic, and the like. The response function g(Z) compensates such a gamma characteristic, and corrects the luminance output from the imaging unit 8 so as to be proportional to the light energy to be actually input to the imaging unit 8. In FIG. 8B, the response function g(Z) when the luminance output from the imaging unit 8 is in proportional relationship with the input light energy is shown for simplification.

The "C" of the constant term in the equation is a term for compensating the offset that occurs when the relationship between each exposure time and the "brightness" range is defined as in FIG. 7, and is appropriately set according to the relationship between each exposure time and the "brightness" range.

In the equation, a natural logarithm having the Napier number "e" as the base is used, but is not necessarily limited to "e", and the logarithm having "2" as the base or the common logarithm having "10" as the base may be used.

Again referring to FIG. 6, the luminance synthesizing unit 210 outputs the calculated synthetic luminance $E_i$ to the histogram generation unit 218. The histogram generation unit 218 generates the histogram for the synthetic luminance $E_i$. In other words, the histogram generation unit 218 generates distribution data for displaying the distribution of the synthetic luminance $E_i$ on the monitor 102. More specifically, the luminance synthesizing unit 210 sectionalizes the synthetic luminance $E_i$ of each pixel into classes of a predetermined width, and then calculates the frequency of each class. This helps the user to initially set the "brightness" upper limit and the "brightness" lower limit while referencing the range of relatively high ratio of the synthetic luminance $E_i$ calculated by the luminance synthesizing unit 210.

The histogram generation unit 214 is configured to be able to interrupt or resume the histogram generation process according to the user setting.

(3) Color Synthesizing Process

The color synthesizing unit 208 calculates the synthetic color information from the color information of a plurality of input image data. As hereinafter described, the synthetic image data is obtained by multiplying the synthetic luminance $E_i$ of the corresponding pixel calculated by the luminance synthesizing unit 210 to the synthetic color information of each pixel calculated by the color synthesizing unit 208. Thus, the synthetic color information output from the color synthesizing unit 208 takes a value indicating a relative ratio of "red", "green", and "blue" without the information on the concentration of each pixel.

Similar to the above luminance synthesizing unit 210, the color synthesizing unit 208 calculates the synthetic color information of each pixel of the synthetic image data based on the color information of each pixel in a plurality of input image data corresponding to each coordinate position. More specifically, the color synthesizing unit 208 calculates the synthetic color information by cumulatively adding the value obtained by multiplying the color information of each input image data and the weight corresponding to the reliability thereof.

Assume the color information at the coordinate position i ($0 \leq i \leq$ number of pixels n) of the $j^{th}$ input image data is ($r_{i,j}$, $g_{i,j}$, $b_{i,j}$). The color synthesizing unit 208 standardizes the color information output from the image information extraction units 206a to 206h so that $r_{i,j}+g_{i,j}+b_{i,j}=1$ are satisfied. Assume the luminance at the coordinate position i of the $j^{th}$ input image data is $Z_{i,j}$. Using the standardized color information and the luminance, the calculation formula of the synthetic color information ($r_i$, $g_i$, $b_i$) is as expressed in equations (2.1) to (2.3).

$$r_i = \frac{\sum_{j=1}^{P} w(Z_{i,j}) \cdot r_{i,j}}{\sum_{j=1}^{P} w(Z_{i,j})} \quad (2.1)$$

$$g_i = \frac{\sum_{j=1}^{P} w(Z_{i,j}) \cdot g_{i,j}}{\sum_{j=1}^{P} w(Z_{i,j})} \quad (2.2)$$

$$b_i = \frac{\sum_{j=1}^{P} w(Z_{i,j}) \cdot b_{i,j}}{\sum_{j=1}^{P} w(Z_{i,j})} \quad (2.3)$$

Here, w(Z): weighting function
P: the number of input image data

The weighting function w(Z) has a characteristic similar to FIG. 8A. In other words, the weighting function w(Z) is a function for reflecting the reliability according to the value of the luminance outputted from the imaging unit 8. The technical meaning of the weighting function w(Z) is as described above, and thus detailed description will not be repeated.

The color synthesizing unit 208 outputs the calculated synthetic color information to the image synthesizing unit 212.

(4) Image Synthesizing Process

The image synthesizing unit 212 sequentially calculates the image information of the pixel of coordinate position i by sequentially multiplying the synthetic value $E_i$ calculated by the luminance synthesizing unit 210 to the corresponding synthetic color information ($r_i$, $g_i$, $b_i$), and generates the synthetic image data.

In other words, the absolute color information ($R_i$, $G_i$, $B_i$) at the coordinate of the coordinate position i of the synthetic image data can be expressed as below.

$$(R_i, G_i, B_i) = E_i \times (r_i, g_i, b_i)$$

The synthetic image data is ultimately generated according to the above procedure.

(5) Post-Process

The post-processing units 230A, 230B, and 230C generate the post-processed image data by performing the post-process for facilitating the detection or the measurement related to the imaged work 2 with the synthetic image data output from the image synthesizing unit 212 as a target, and further generates the output image data by reducing the dynamic range of the post-processed image data. The content of the post-process will be specifically described in the section [J] to be described later.

(6) Measurement/Detection Process

The detection/measurement unit 240 executes the detection process or the measurement process related to the imaged work 2 using the output image data output from the post-processing units 230A, 230B, and 230C. A known image processing technique can be used for the detection process and the measurement process. In other words, for instance, the process such as pattern search based on the model registered in advance and defect detection, as well as, the process for measuring the size, tilt, position, and the like of the imaged work, and the like are used with respect to the imaged work.

The detection/measurement unit 240 outputs the result (resultant image data and detection/measurement value) obtained by the detection process or the measurement process.

(Others)

The imaging control unit 200 calculates the prospective processing time (synthesizing time) required for the generation of one synthetic image data from the start of imaging. More specifically, the imaging control unit 200 estimates the synthesizing time in view of the number of imaging times by the imaging unit 8, the exposure time in each imaging, the processing amount of the image synthesizing process, and the like. The user determines whether or not the setting that can be applied to the actual production line with reference to the synthesizing time.

I. User Interface Example

One example of the user interface related to the image synthesizing process displayed on the monitor 102 (FIG. 1) will be described with reference to FIGS. 9 and 10 to facilitate the understanding on the image synthesizing process according to the present embodiment.

Figure 9:
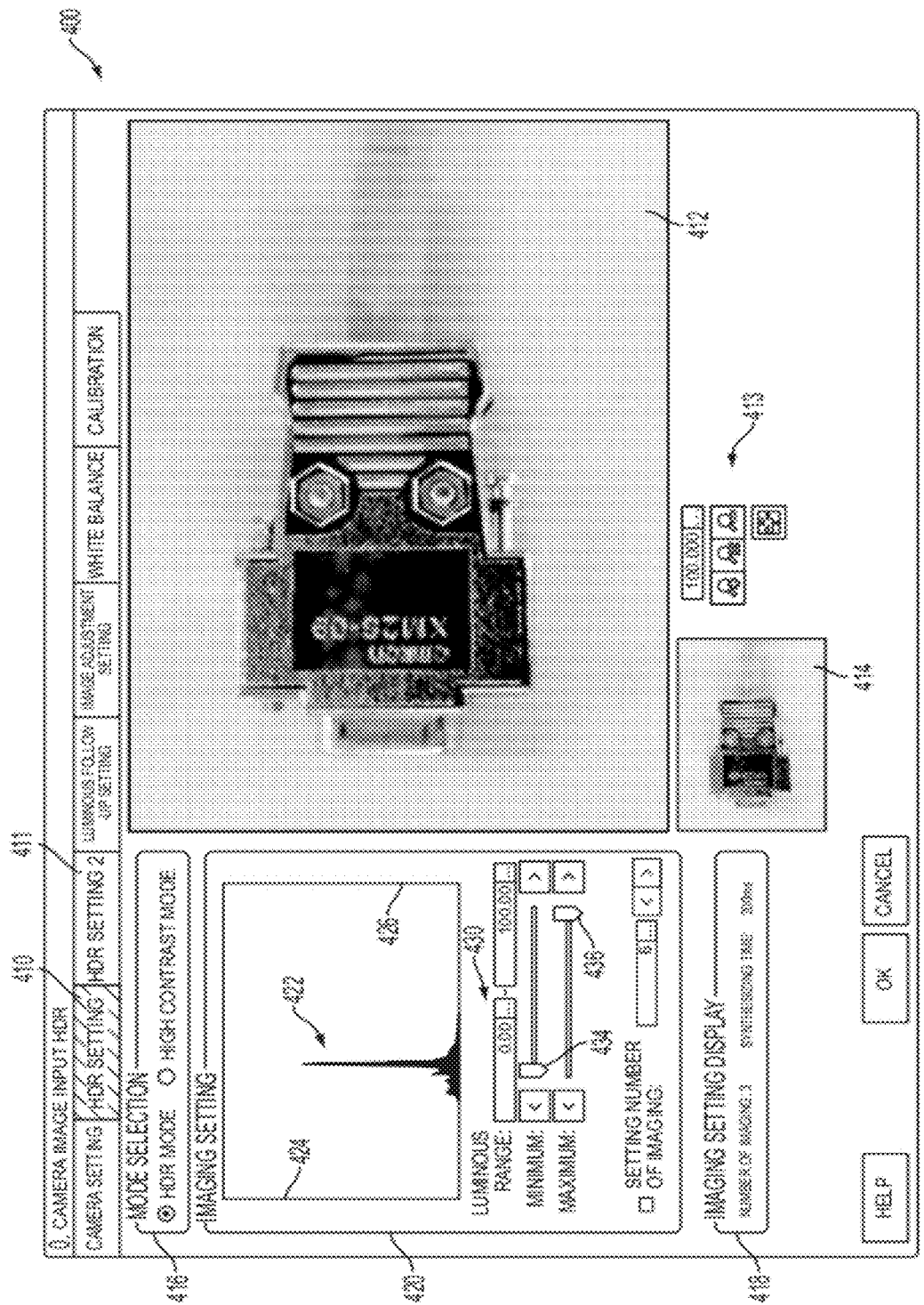
FIG. 9 is a view showing a screen display example in the "setting mode" displayed on the monitor of the image processing device according to the embodiment of the present invention.
Figure 10:
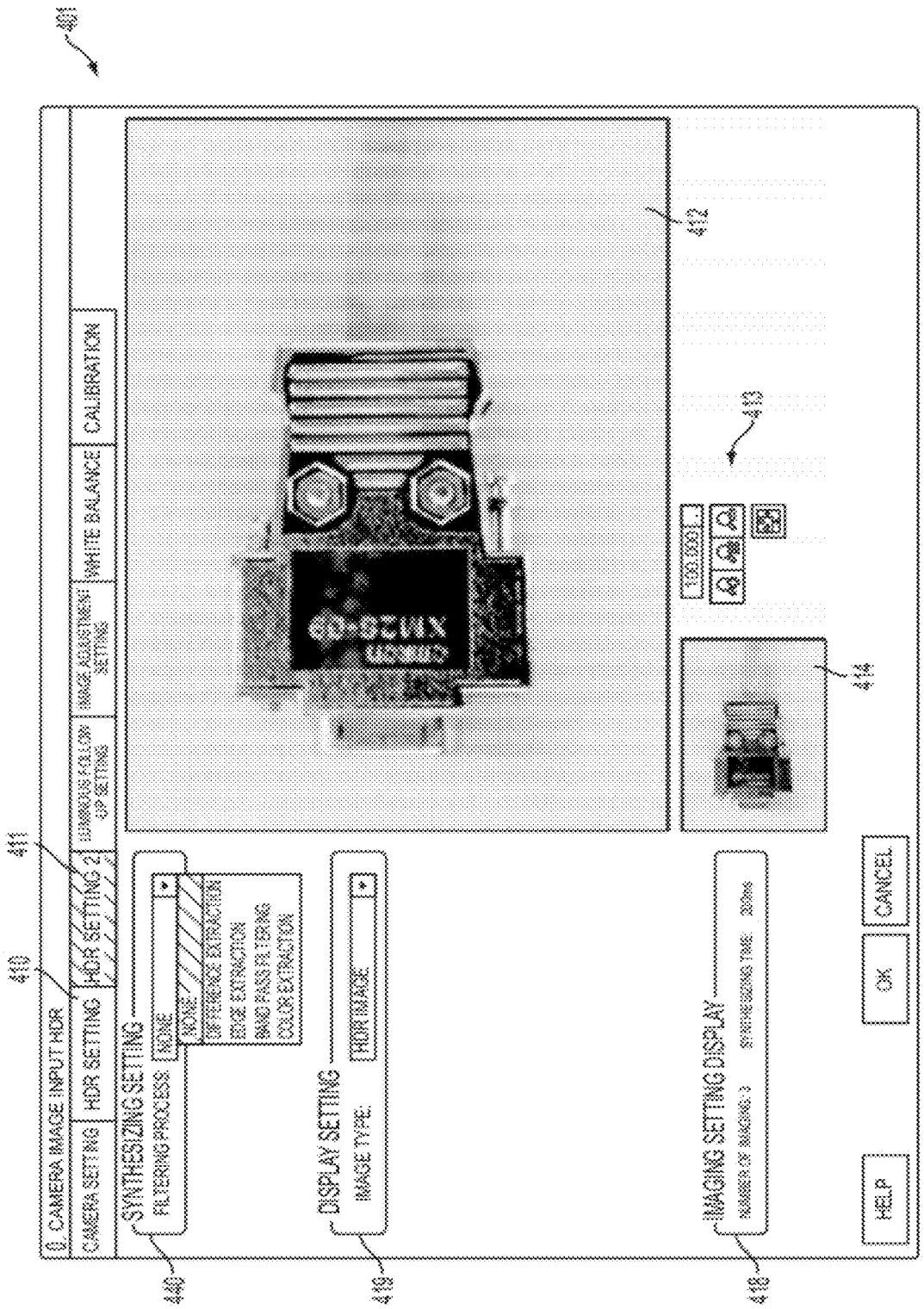
FIG. 10 is a view showing a screen display example in the "setting mode" displayed on the monitor of the image processing device according to the embodiment of the present invention.

FIGS. 9 and 10 are views showing a screen display example in the "setting mode" displayed on the monitor 102 of the image processing device according to the embodiment of the present invention. The user interface as shown in FIGS. 9 and 10 can be provided when the CPU 105, the graphic board (not shown), and the like cooperate with each other. Such a screen display is implemented by the GUI (Graphical User Interface) program incorporated as one part of the OS (Operating System), and the GUI provides an environment for performing various user setting using the cursor on the screen operated with the keyboard 103 and the mouse 104 by the user.

In the "setting mode", various types of setting can be performed, and a screen on which a total of seven tabs, "camera setting", "HDR setting", "HDR setting 2", "luminosity follow-up setting", "image adjustment setting", "white balance", and "calibration", can be selected is displayed, by way of example, as shown in FIGS. 9 and 10. In the following description, the user interface when the "HDR setting" tab 410 and the "HDR setting 2" tab 411 for performing the main setting related to the image synthesizing process according to the present embodiment are respectively selected will be described. Other initial setting (arrangement and initial setting of the imaging unit 8 etc.) are assumed to be completed. In other words, a plurality of input image data including the image of a reference work is acquired by the imaging of the imaging unit 8.

In FIG. 9, one example of a setting screen 400 displayed when the "HDR setting" tab 410 is selected is shown. The setting screen 400 shown in FIG. 9 accepts the setting (hereinafter also referred to as "synthesizing process setting") related to the image synthesizing process including exposure conditions.

The setting screen 400 includes a mode setting area 416, an imaging setting area 420, an imaging setting display area 418, an image display area 412, a display control icon group 413, and an entire display area 414.

The mode setting area 416 selectively displays the "HDR mode" indicating the image synthesizing process for enlarging the dynamic range and the "high contrast mode" indicating the image synthesizing process with enhanced contrast in a radio button-form.

The image setting area 420 displays a histogram 422 on the "brightness" of the generated synthetic image data, and also displays indicators 426 and 424 indicating the user set "brightness" upper limit value and the lower limit value. The histogram 422 is appropriately generated by the histogram generation unit 214 (FIG. 6).

The imaging setting area 420 displays a slide bar 434 for setting the "brightness" lower limit value and a slide bar 436 for setting the "brightness" upper limit value in a changeable manner. The "brightness" upper and lower limit range is appropriately changed according to the user operation on the slide bars 434 and 436. Furthermore, the imaging setting area 420 also displays a numerical value input box 430 for accepting direct numerical input of the "brightness" lower limit value and upper limit value.

The synthesizing process setting including imaging conditions, and the range (display range) to be the output image data of the synthetic image data shown in FIG. 4 are set according to the "brightness" upper and lower limit range ("brightness" upper limit value and "brightness" lower limit value) set by user operation with respect to the slide bar 434 or 436, or the numerical input box 430. In other words, the user sets the desired "brightness" upper and lower limit range while referencing the displayed histogram 422. The range that can cover substantially the entire histogram 422 is preferable for the "brightness" upper and lower limit range of the initial value.

The imaging setting display area 418 displays the content of the synthesizing process set value determined as above. As one specific example, the imaging setting display area 418 displays the number of input images (number of imaging) required for one image synthesis, the time (synthesizing time) required for one image synthesis, and the like.

In the image display area 412, the image display based on the synthetic image data generated through imaging and image synthesizing process is made according to the synthesizing process set value determined as above. The image display area 412 displays the image corresponding to the synthetic image data used in detection and measurement in the operation mode. The user, and the like adjust the "brightness" upper and lower limit range, and the like with reference to the image displayed in the image display area 412. The display size of the image in the image display area 412 can be changed according to the user operation with respect to the display control icon group 413.

The entire display area 414 displays the image same as the image displayed in the image display area 412 in a reduced manner. The entire display area 414 constantly displays the entire image to be displayed independent from the display size in the image display area 412. In other words, in which region in the entire image the image being displayed in the image display area 412 is at is shown in the image display area 412. The user thus can enlarge and observe to the portion (region) to be focused while grasping the entire synthetic image.

The user who does not desire to execute the post-process on the synthetic image data can complete the necessary setting in the setting screen 400 shown in FIG. 9.

FIG. 10 shows one example of a setting screen 401 displayed when the "HDR setting 2" tab 411 is selected. The setting screen 401 shown in FIG. 10 accepts the setting (hereinafter also referred to as "post-process setting") related to the post-process on the synthetic image data.

The setting screen 401 includes a synthesizing setting area 440, a display setting area 419, the imaging setting display area 418, the image display area 412, the display control icon group 413, and the entire display area 414.

The synthesizing setting area 440 displays a pull-down box for selecting various types of post-processes according to the present embodiment. The pull-down box displays a total of five items, "none", "difference extraction", "edge extraction", "band pass filter", and "color extraction", in a selectable manner as a typical example. When the item "none" is selected, the post-process according to the present embodiment is disabled. When one of the other four items is selected, the post-process of the selected item is executed on the synthetic image data. Other post-processes include high-pass filter, low-pass filter, and the like.

The display setting area 419 displays a pull-down menu (not shown) for selecting the image to be displayed on the image display area 412 and the entire display area 414. The pull-down menu displays items such as "HDR image", "model image", "difference image", "first input image", "second input image", . . . , "$n^{th}$ input image" in a selectable manner.

When the "HDR image" is selected, the image display based on the synthetic image data obtained by the image synthesizing process is made.

The "model image" and the "difference image" are selectable only when the "difference extraction" is selected in the synthesizing setting area 440. When the "model image" is selected, the model image registered in advance related to the "difference extraction" process is displayed. When the "difference image" is selected, the image display based on the difference image data obtained by the "difference extraction" process is made.

The "first input image", "second input image", . . . , "$n^{th}$ input image" are image displayed based on the "first", "second", . . . , "$n^{th}$" of the plurality of input image data acquired by the imaging unit 8 to be used in the image synthesizing process.

The imaging setting display area 418, the image display area 412, the display control icon group 413, and the entire display area 414 in the setting screen 401 are similar to those in the setting screen 400, and thus detailed description will not be repeated.

J. Post-Process

As typical examples of the post-process, the difference extracting process, the edge extracting process, the band pass filtering process, and the color extracting process will be described.

(j1. Difference Extracting Process)
<1. Configuration>
The difference extracting process will be described as a post-process executed when the "difference extraction" is selected in the synthesizing setting area 440 of the setting screen 401 shown in FIG. 10. The difference extracting process is a process of extracting a color difference between the model image data registered in advance and the synthetic image data generated by the image synthesizing process. In other words, the process calculates the image difference with respect to the model image data on the synthetic image data by comparing the generated synthetic image data and the model image data registered in advance.

Such a difference extracting process is used when detecting the work with defect and the like at the production line on which the same product is continuously manufactured.

Figure 11:
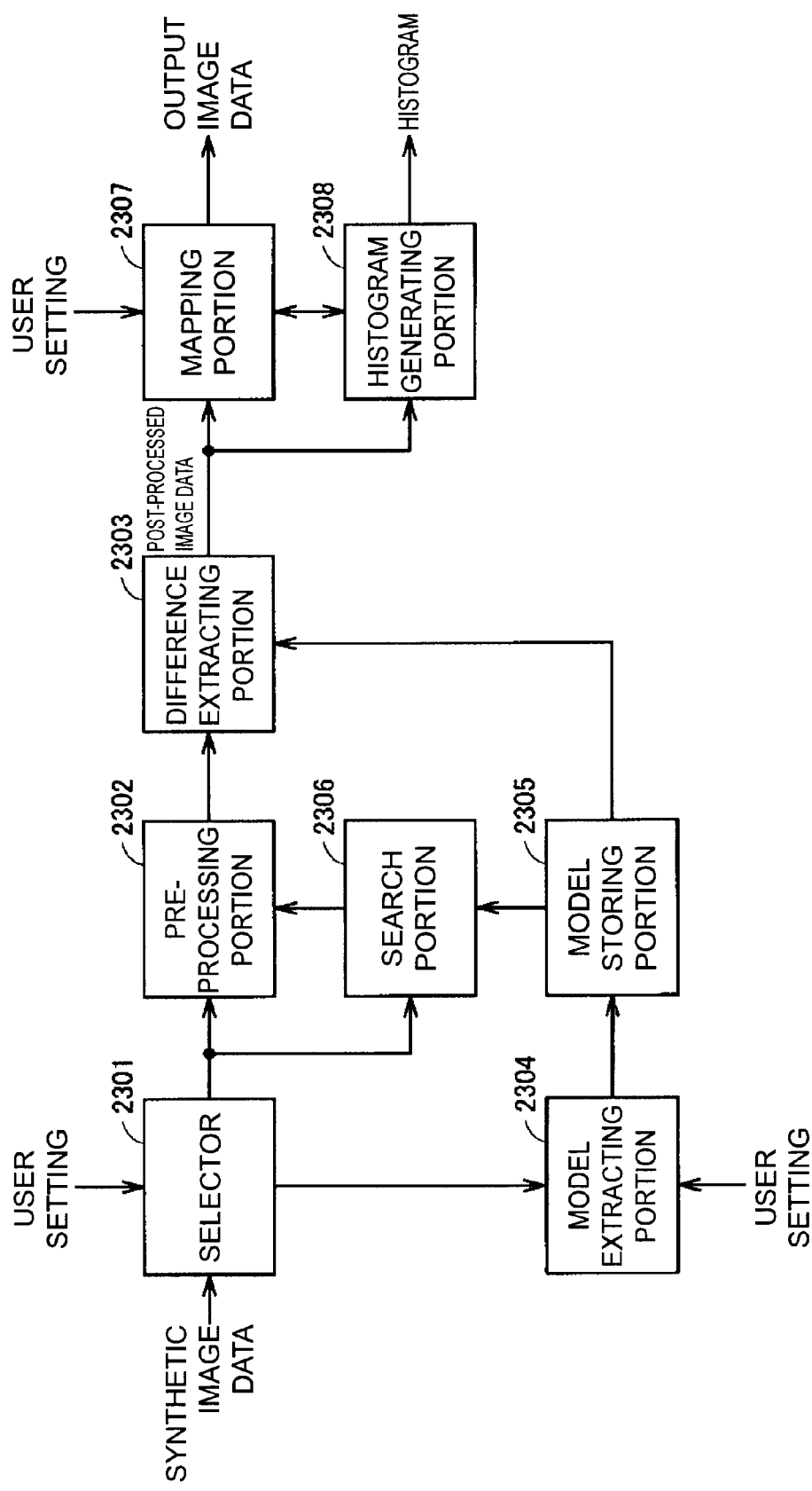
FIG. 11 is a function block diagram showing a control structure of a post-processing unit according to the embodiment of the present invention.

FIG. 11 is a function block diagram showing a control structure of the post-processing unit 230A (FIG. 6) according to the embodiment of the present invention. With reference to FIG. 11, the post-processing unit 230A includes a selector 2301, a pre-processing portion 2302, a difference extracting portion 2303, a model extracting portion 2304, a model storing portion 2305, a search portion 2306, a mapping portion 2307, and a histogram generating portion 2308.

The selector 2301 inputs the synthetic image data output from the image synthesizing unit 212 (FIG. 6), and selectively outputs the synthetic image data to the pre-processing portion 2302 and the search portion 2306, or the model extracting portion 2304 according to user setting. In other words, in the normal difference extracting process, the selector 2301 outputs the input synthetic image data to the pre-processing portion 2302 and the search portion 2306, but outputs the input synthetic image data to the model extracting portion 2304 when registering to the model image data (to be described later).

The model extracting portion 2304 extracts partial image data contained in the model region set by the user (operation will be described later) with respect to the synthetic image data, and outputs the same to the model storing portion 2305 as model image data. The model storing portion 2305 stores the model image data received from the model extracting portion 2304, and outputs the stored model image data to the search portion 2306 and/or the difference extracting portion 2303, as necessary.

The pre-processing portion 2302 and the search portion 2306 are function blocks for performing position correction process, to be described later. More specifically, when new synthetic image data is output from the selector 2301, the search portion 2306 searches for the portion of highest degree of similarity in the model image data stored in the model storing portion 2305, and outputs the search result to the pre-processing portion 2302. The pre-processing portion 2302 performs image conversion for correcting the position and/or size of the synthetic image data according to the search result from the search portion 2306, and then outputs the synthetic image data after the conversion to the difference extracting portion 2303. The position correction process by the pre-processing portion 2302 and the search portion 2306 may be disabled according to the user setting.

The difference extracting portion 2303 generates difference image data (post-processed image data) by extracting the difference between the synthetic image data (after conversion) input from the pre-processing portion 2302, and the model image data input from the model storing portion 2305. More specifically, the difference extracting portion 2303 calculates a color difference vector of the color information ($R_i$, $G_i$, $B_i$) at a coordinate position i of the synthetic image data and the color information ($R^{(m)}_i$, $G^{(m)}_i$, $B^{(m)}_i$) at a corresponding coordinate position i of the model image data, and calculates an absolute value of such a color difference vector as a luminosity $V_i$ at the coordinate position i of the difference image data. The difference extracting portion 2303 outputs the difference image data including the luminosity $V_i$ calculated for all pixels. The difference extracting portion 2303 outputs the luminosity $V_i$ having a tone range same as the tone range (32 bits of each color) of the input synthetic image data.

The mapping portion 2307 limits the difference value (i.e., luminosity $V_i$) calculated in the difference extracting portion 2303 to a narrower predetermined tone range, and outputs as the output image data. Specifically, the mapping portion 2307 determines the gray value (luminosity) of the synthetic image data by assigning the luminosity $V_i$ of each pixel to the tone value $Y_i$ (e.g., 0 to 255 tone values) at the corresponding coordinate position i. Generally, the tone range of the luminosity $V_i$ of each pixel is wider than the tone range of the tone value $Y_i$. In other words, the mapping portion 2307 converts the luminosity $V_i$ having the value of a predetermined tone range to the toner value $Y_i$ of narrower tone range.

Figure 12:
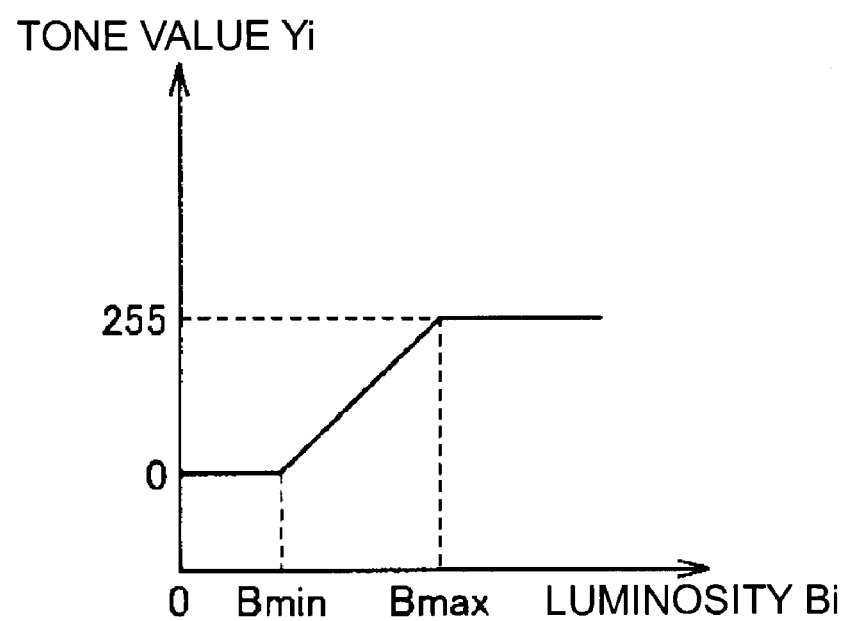
FIG. 12 is a view for describing the mapping process by a mapping portion shown in FIG. 11.

FIG. 12 is a view describing the mapping process by the mapping portion 2307 shown in FIG. 11. With reference to FIG. 12, the process when converting the luminosity $V_i$ of each pixel of the difference image data to the tone value of the range of 0 to 255 while maintaining the proportional relationship will be illustrated. As hereinafter described, when the range of mapping (luminosity upper limit value $V_{max}$ and luminosity lower limit value $V_{min}$) is set by the user, the mapping portion 2307 performs assignment to the tone value $Y_i$ according to the following conversion equation.

$$V_i < V_{min} : Y_i = 0 \quad \text{(i)}$$

$$V_{min} \leq V_i \leq V_{max} : Y_i = 255 \times (V_i - V_{min})/(V_{max} - V_{min}) \quad \text{(ii)}$$

$$V_{max} < V_i : Y_i = 255 \quad \text{(iii)}$$

Thus, the correspondence relationship used in the conversion from the luminosity $V_i$ to the tone value $Y_i$ is appropriately updated by changing the luminosity upper limit value $V_{max}$ and the luminosity lower limit value $V_{min}$ in the mapping portion 2307.

To simplify the description, a case of performing the linear mapping process is illustrated in FIG. 12, but a non-linear mapping process may be adopted according to the visibility, and the like of the human. The following conversion formula may be used as one example.

$$V_{min} \leq V_i \leq V_{max} : Y_i = 255 \times \log\{(V_i - V_{min})\}/\log\{(V_{max} - V_{min})\} \quad \text{(ii')}$$

The pixel of excessively high luminosity is converted to a relatively low tone value, and the pixel of excessively low luminosity is converted to a relatively high tone value by adopting such a nonlinear conversion formula, and thus whiteout and total underexposure can be reduced.

As expressed with the above conversion formula, the pixels having the luminosity $V_i$ larger than the luminosity upper limit value $V_{max}$ are all limited (held) to the maximum tone value (e.g., 255), and the information on such luminosity is lost. Similarly, the pixels having the luminosity $V_i$ smaller than the luminosity lower limit value $V_{min}$ are all limited (held) to the minimum tone value (e.g., 0), and the information on such luminosity is lost. Therefore, only the pixel in which the value of the luminosity $V_i$ is in the range from the luminosity lower limit value $V_{min}$ to the luminosity upper limit value $V_{max}$ becomes the pixel having an effective tone value on the output image data. In other words, the mapping portion 2307 assigns that which value is in the predetermined range to the effective value in the tone range of the luminosity $V_i$ of the difference image data. In other words, the mapping portion 2307 assigns the lower value (0) in the tone value $Y_i$ with respect to the pixel in which the value of the luminosity $V_i$ matches the luminosity lower limit value $V_{min}$, and assigns the upper value (255) in the tone value $Y_i$ with respect to the pixel in which the value of the luminosity $V_i$ matches the luminosity upper limit value $V_{max}$ when the luminosity upper limit value $V_{max}$ and the luminosity lower limit value $V_{min}$ are set by the user.

Returning back to FIG. 11, the histogram generating portion 2308 generates a histogram on the luminosity $V_i$ of the pixel contained in the difference image data. In other words, the histogram generating portion 2308 generates distribution data for displaying the distribution of the luminosity $V_i$ of the pixel contained in the difference image data on the monitor 102. More specifically, the histogram generating portion 2308 partitions the luminosity $V_i$ of each pixel to a class of a predetermined width, and calculates the frequency of each class. The user can easily set which pixel having the luminosity of which range to output as the output image data by referencing the histogram generated by the histogram generating portion 2308.

The color information of the synthetic image data generated based on the input image data imaged by the imaging unit 8 and the color information of the model image data registered in advance are assumed to rarely exactly match with each other. Thus, the portion assumed as error of the color information is preferably masked by appropriately setting the value of the luminosity lower limit value $V_{min}$. Many cases in which the kind of defects that may occur is not known in advance are assumed. In other words, to the value of what extent to set the luminosity upper limit value $V_{max}$ may not be known by simply looking at the difference image.

In the image processing device according to the present embodiment, the distribution state of the luminosity of the pixel contained in the difference image data is provided to the user, so that the luminosity upper limit value $V_{max}$ and the luminosity lower limit value $V_{min}$ can be more easily set to an appropriate range.

<2. User Interface Example>

To facilitate the understanding on the difference extracting process, one example of user interface according to the difference extracting process displayed on the monitor 102 (FIG. 1) will be described with reference to FIG. 13 and FIG. 14.

Figure 13:
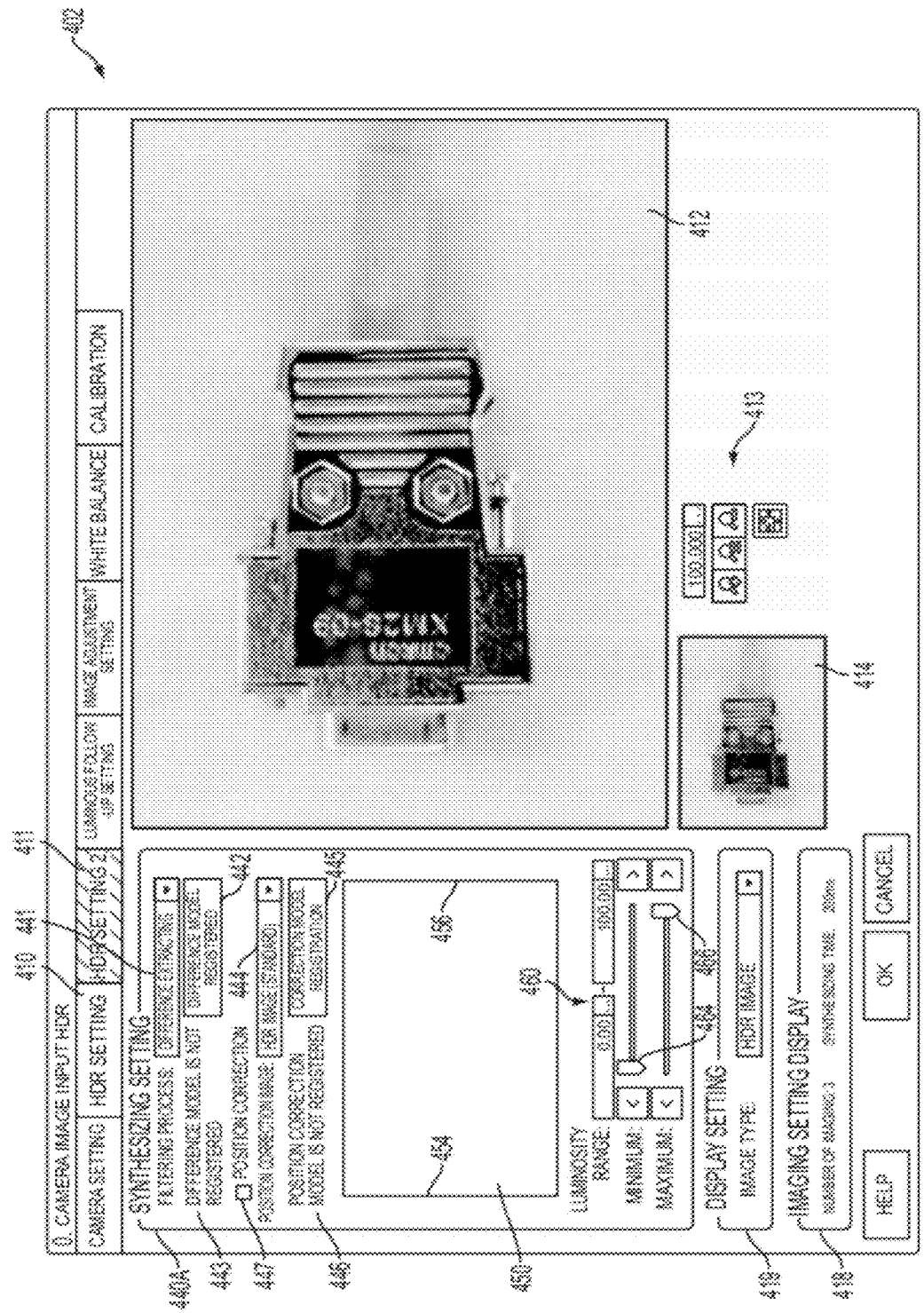
FIG. 13 is a view showing a screen display example at the time of selection of the difference extracting process displayed on the monitor of the image processing device according to the embodiment of the present invention.
Figure 14:
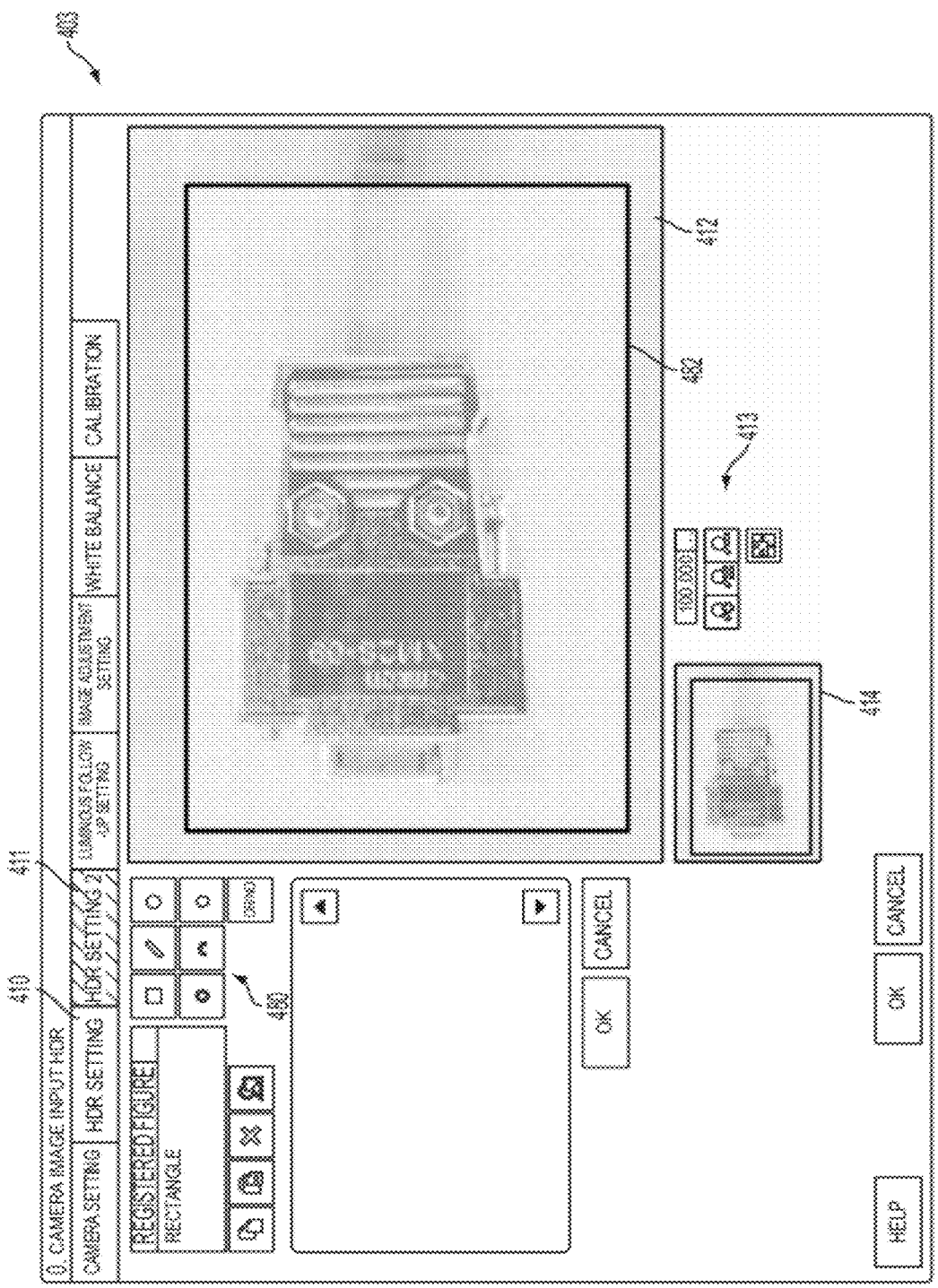
FIG. 14 is a view showing a screen display example at the time of selection of the difference extracting process displayed on the monitor of the image processing device according to the embodiment of the present invention.

FIG. 13 and FIG. 14 are views showing a screen display example at the time of selection of the difference extracting process displayed on the monitor 102 of the image processing device according to the embodiment of the present invention.

FIG. 13 shows one example of a setting screen 402 displayed when the item "difference extraction" is selected in the filtering process pull-down box 441 in the synthesizing setting area 440 shown in FIG. 10. The setting screen 402 shown in FIG. 13 includes a synthesizing setting area 440A, the display setting area 419, the imaging setting display area 418, the image display area 412, the display control icon group 413, and the entire display area 414. The display setting area 419, the imaging setting display area 418, the image display area 412, the display control icon group 413, and the entire display area 414 are similar to the setting screen 401 shown in FIG. 10, and thus the detailed description will not be repeated.

The synthesizing setting area 440A corresponds to that in which a difference model registration button 442, a position correction image pull-down box 444, a correction model registration button 445, a position correction checkbox 447, and a histogram display area 450 are added to the synthesizing setting area 440 shown in FIG. 10.

The difference model registration button 442 accepts the instruction for registering the model image data used in the difference extracting process. When the model image data is not yet registered, a message 443 "difference model is not registered" is displayed adjacent to the difference model registration button 442. When the difference model registration button 442 is selected, the screen transitions to a region setting screen 403 for registering the model image data shown in FIG. 14.

With reference to FIG. 14, the region setting screen 403 displays an icon group 480 for selecting the shape of the region to be extracted as the model image data. When the user selects one of the icon groups 480, the region 482 of the selected shape is displayed overlapping the synthetic image displayed on the image display area 412. The shape of the region 482 to be extracted as the model image data may be basically only a rectangle.

The user generates the synthetic image data by imaging the reference work to be registered as the model image data, and sets the region 482 to the appropriate size and position while referencing the image displayed on the image display area 412 based on the synthetic image data. Specifically, the user can interactively change the size and the position by performing the mouse operation (e.g., click, drag, and the like) with respect to the region 482 displayed at the image display area 412.

In the region setting screen 403, the model extracting portion 2304 (FIG. 11) extracts the partial image data contained in the region 482 set by the user and stores the same in the model storing portion 2305 (FIG. 11) by selecting the "OK" button after the user sets the size and the position of the region 482 to be extracted as the model image data. The screen then returns to the setting screen 402 shown in FIG. 13.

With reference again to FIG. 13, the position correction checkbox 447, the position correction image pull-down box 444, and the correction model registration button 445 accept the setting to be used in the position correction process, to be described later. The details will be described later.

The histogram display area 450 displays a histogram (not shown) on the luminosity of the difference image data obtained by the difference extracting process. In other words, the histogram generated by the histogram generating portion 2308 (FIG. 11) is displayed in the histogram display area 450.

Indicators 454 and 456 indicating the user set luminosity upper limit value $V_{max}$ and the luminosity lower limit value $V_{min}$, respectively, are displayed in the histogram display area 450. Furthermore, a numerical value input box 460 for accepting direct numerical input of the luminosity upper limit value $V_{max}$ and the lower limit value $V_{min}$, a slide bar 464 for setting the luminosity lower limit value $V_{min}$, and a slide bar 466 for setting the luminosity upper limit value $V_{max}$ are displayed in association with the histogram display area 450.

The mapping process is performed on the difference image data obtained by the difference extracting process according to the luminosity upper and lower limit range (luminosity upper limit value $V_{max}$ and luminosity lower limit value $V_{min}$) set by the user operation on the slide bar 464 or 466, or the numerical value input box 460. In other words, the luminosity upper and lower limit range (luminosity upper limit value $V_{max}$ and luminosity lower limit value $V_{min}$) set through the slide bar 464 or 466, or the numerical value input box 460 is provided to the mapping portion 2307 (FIG. 11).

<3. Processing Example of Difference Extracting Process>

Figure 15A:
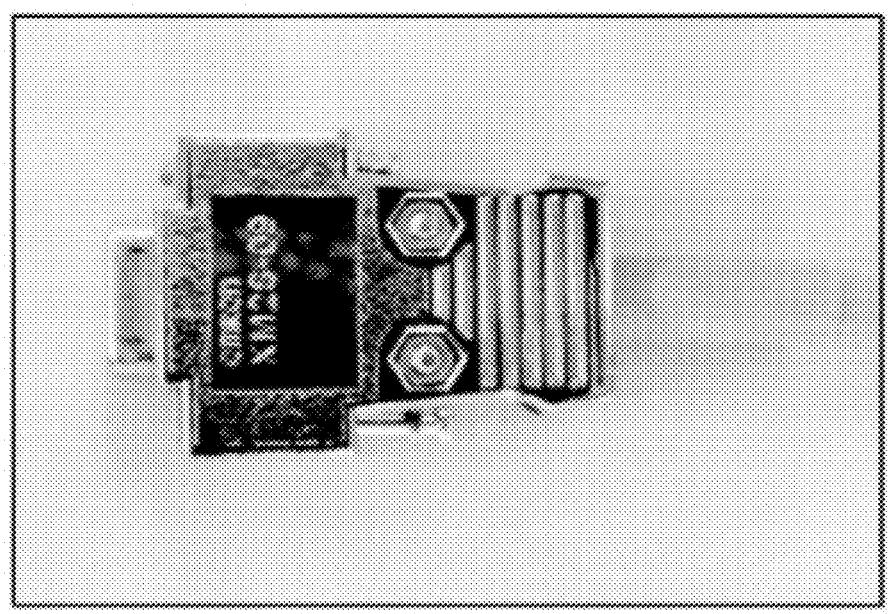
FIGS. 15A and 15B are views showing one example of the synthetic image data used in the difference extracting process according to the embodiment of the present invention.
Figure 15B:
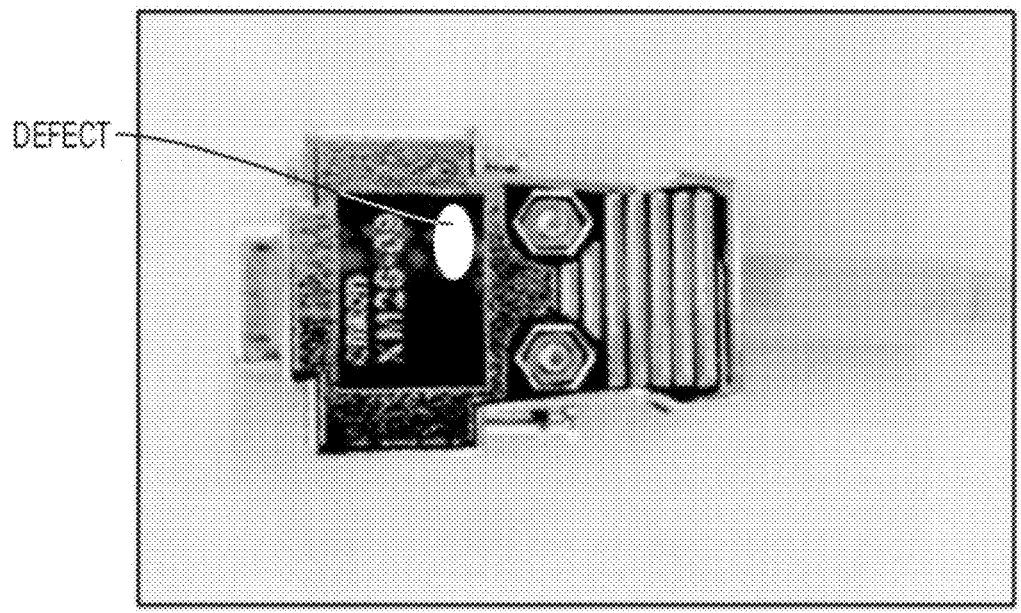
Figure 16:
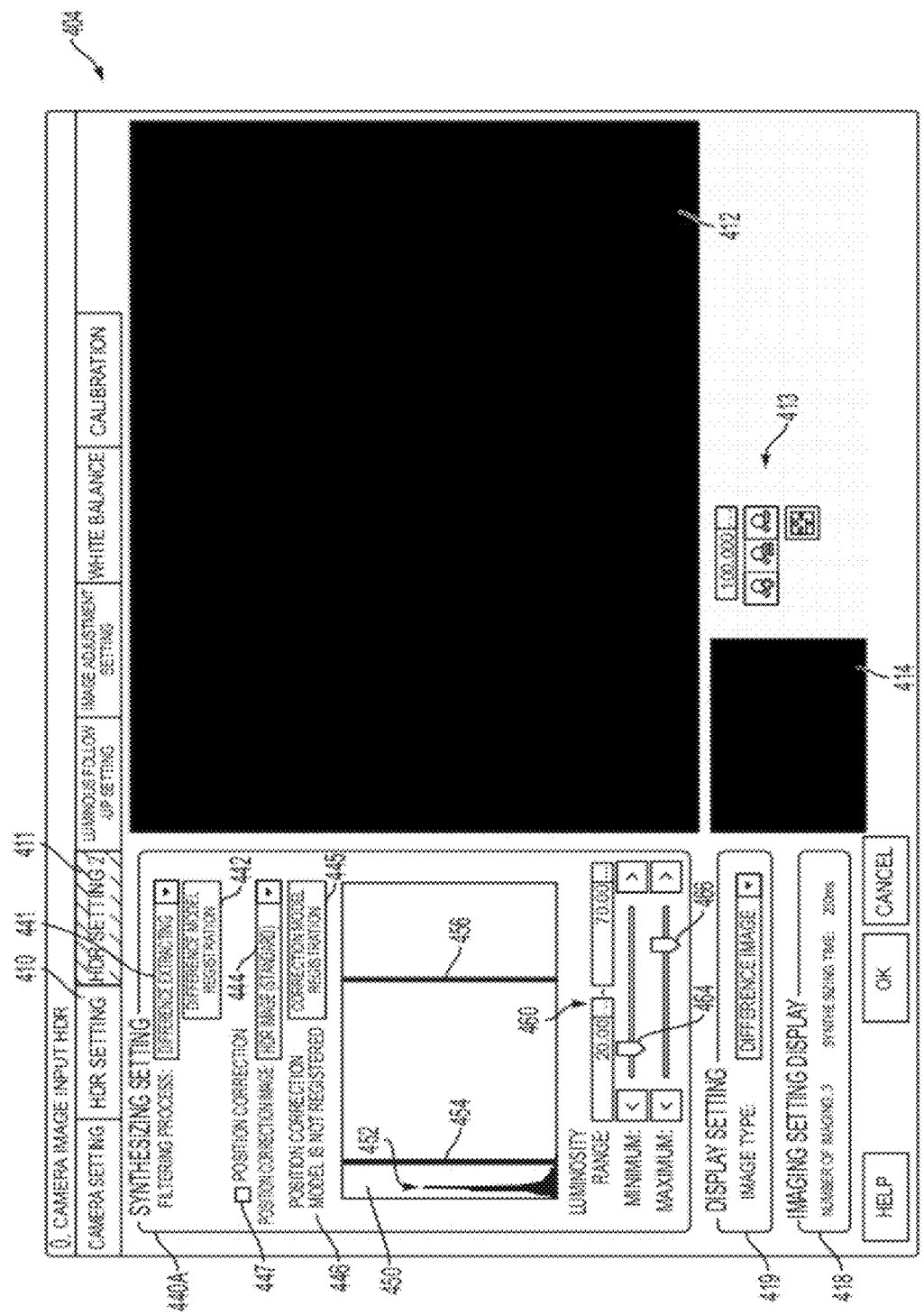
FIG. 16 is a view showing a screen display example when the image shown in FIG. 15A is the target.
Figure 17:
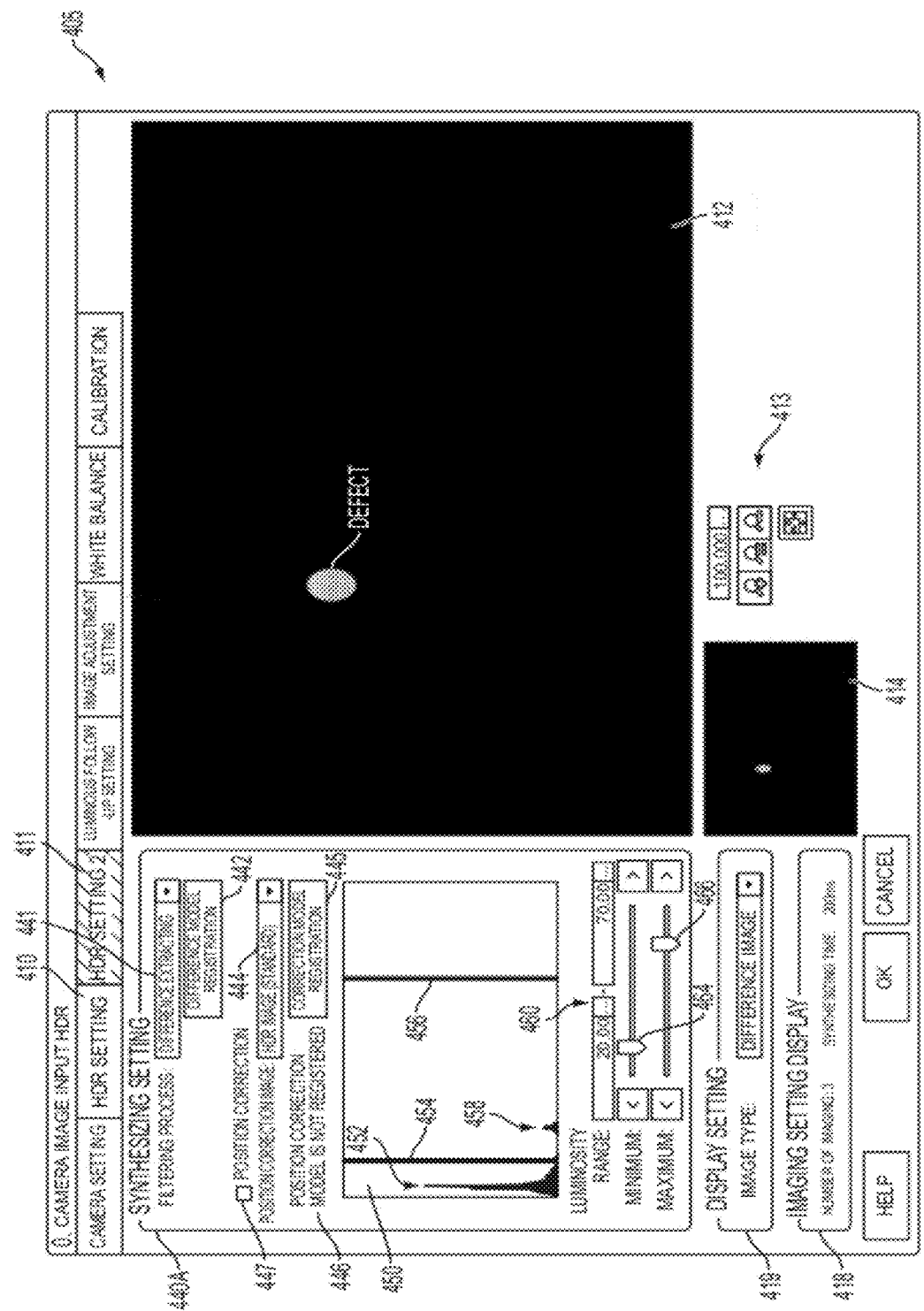
FIG. 17 is a view showing a screen display example when the image shown in FIG. 15B is the target.
Figure 18:
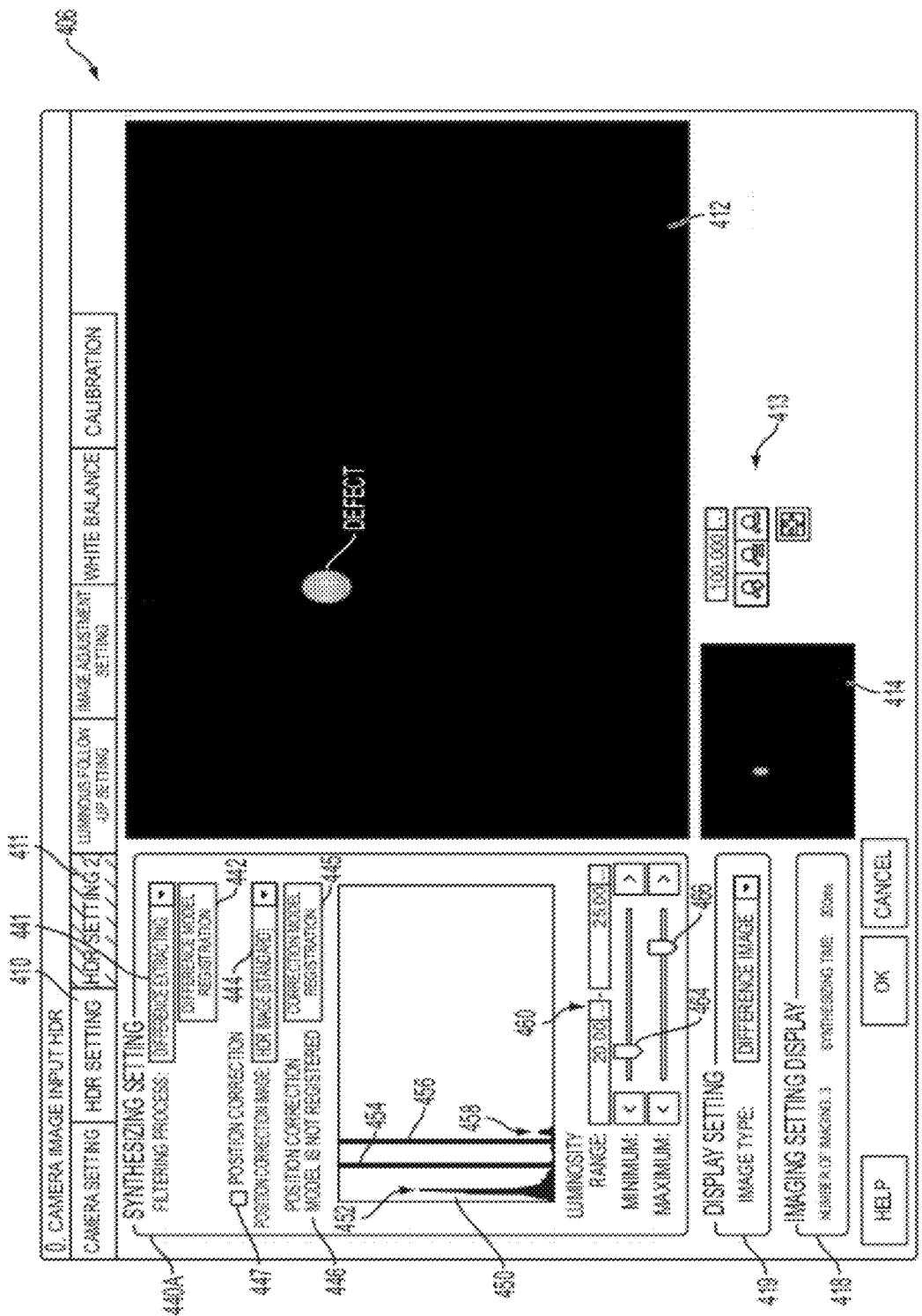
FIG. 18 is a view showing a screen display example when the luminosity upper and lower limit range is changed in the screen shown in FIG. 17.

The difference extracting process according to the present embodiment will be described with reference to FIGS. 15 to 18. FIGS. 15A and 15B are views showing one example of the synthetic image data used in the difference extracting process according to the embodiment of the present invention. FIG. 16 is a view showing a screen display example when the image shown in FIG. 15A is the target. FIG. 17 is a view showing a screen display example when the image shown in FIG. 15B is the target. FIG. 18 is a view showing a screen display example when the luminosity upper and lower limit range is changed in the screen shown in FIG. 17.

In the following description, the synthetic image data obtained by imaging the connector as shown in FIG. 15A as the reference work is registered as the model image data. The process when the synthetic image data similar to the registered model image data is obtained, and the process when the synthetic image data is obtained by imaging the work in which defect occurred at one part of the surface of the connector as shown in FIG. 15B will be described in comparison.

In the setting screen 402 shown in FIG. 13, the display of the message 443 (FIG. 13) disappears and the difference extracting process is executed when the difference model registration button 442 is selected and the model image data is registered. In this case, the item "difference image" may be automatically selected in the display setting area 419.

When the item "difference image" is selected in the display setting area 419, the image display based on the difference image data obtained by the difference extracting process is made in the image display area 412.

When a work without defect having substantially a similar outer appearance as the reference work is imaged, the synthetic image data substantially similar to FIG. 15A is obtained. In this case, the luminosity component contained in the difference image data become relatively small since the color difference vector in each pixel is relatively small. In other words, a great number of pixels is concentrated and distributed in a region in which the value of the luminosity is relatively small, as shown in the histogram display area 450 of FIG. 16. The component in which the value of the luminosity is relatively small rarely have effective information.

An image in which the tone value is substantially "0" over the entire surface (i.e., black image) is displayed in the image display area 412 when the luminosity upper and lower limit range (luminosity upper limit value $V_{max}$ and luminosity lower limit value $V_{min}$) is set so as not to overlap the region in which the value of the luminosity is relatively small.

When the work with defect is imaged, the synthetic image data as shown in FIG. 15B is obtained. In such a case, the color difference vector on each pixel contained at the defect portion becomes relatively large, and thus the luminosity component contained in the difference image data becomes relatively small. In other words, as shown in the histogram display area 450 of FIG. 17, the component 458 in which the value of the luminosity is relatively large appears compared to other pixels. Such a component 458 has information corresponding to the defect portion. The portion corresponding to the defect portion can be made visible by setting the luminosity upper and lower limit range (luminosity upper limit value $V_{max}$ and luminosity lower limit value $V_{min}$) so as to cross the component 458. In other words, the difference information with the model image data comes up in the image display area 412. The tone value of the defect portion displayed in the image display area 412 is defined by the relative relationship of the luminosity upper and lower limit range (luminosity upper limit value $V_{max}$ and luminosity lower limit value $V_{min}$) and the component 458. In other words, the defect portion is displayed relatively bright if the luminosity upper limit value $V_{max}$ is set proximate to the component 458, and the defect portion is displayed relatively dark if the luminosity lower limit value $V_{min}$ is set proximate to the component 458 on the histogram 452.

As another usage mode, the luminosity upper limit value $V_{max}$ and the luminosity lower limit value $V_{min}$ may be set between the error component concentrated and distributed in a region in which the value of luminosity is relatively small and the component 458 when merely distinguishing the defect portion and the normal portion.

With reference to FIG. 18, in this case, the pixels in which the value of the luminosity is smaller than the luminosity lower limit value $V_{min}$ are all displayed with the tone value of "0", and the pixels in which the value of the luminosity is greater than the luminosity upper limit value $V_{max}$ are all displayed with the tone value of "255". As a result, the region corresponding to the defect portion is displayed in "white" and the other regions are displayed in "black" in the image display area 412.

<4. Processing Example of Position Correction Process>

Figure 19A:
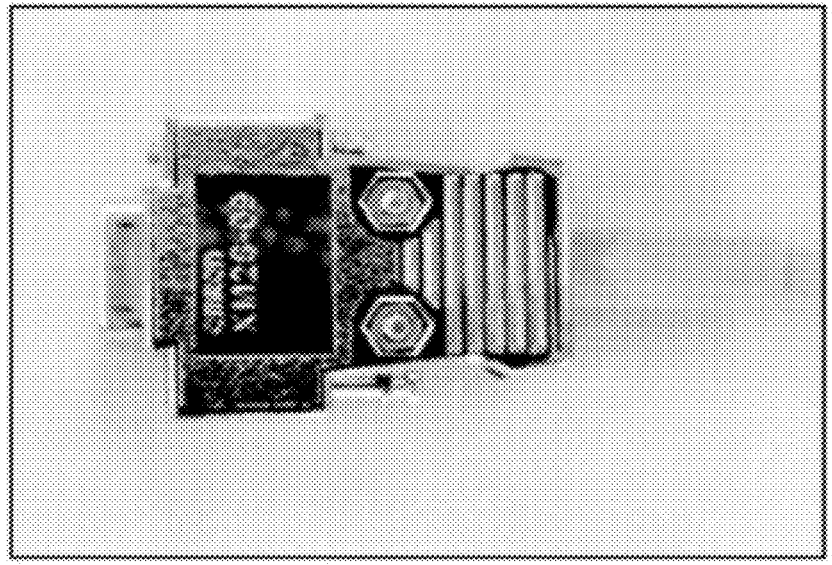
FIGS. 19A and 19B are views showing one example of the synthetic image data used in the position correction process in the difference extracting process according to the embodiment of the present invention.
Figure 19B:
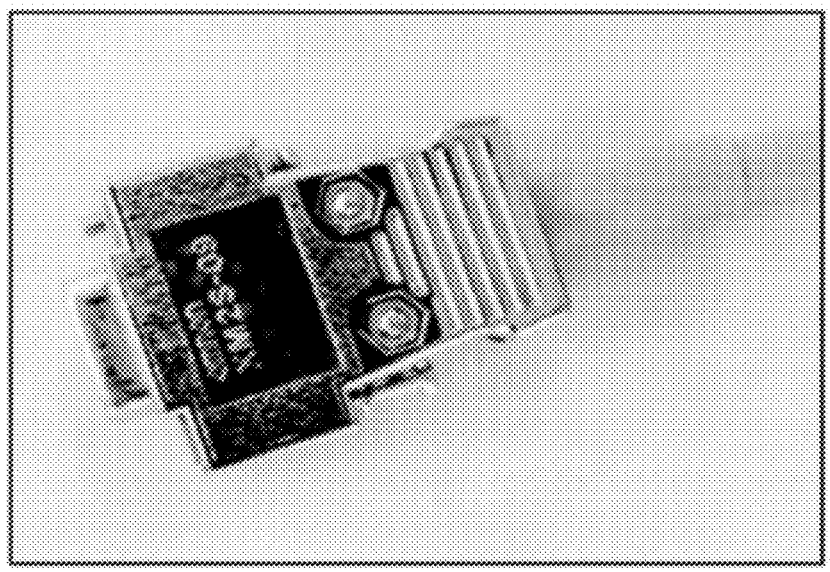
Figure 20:
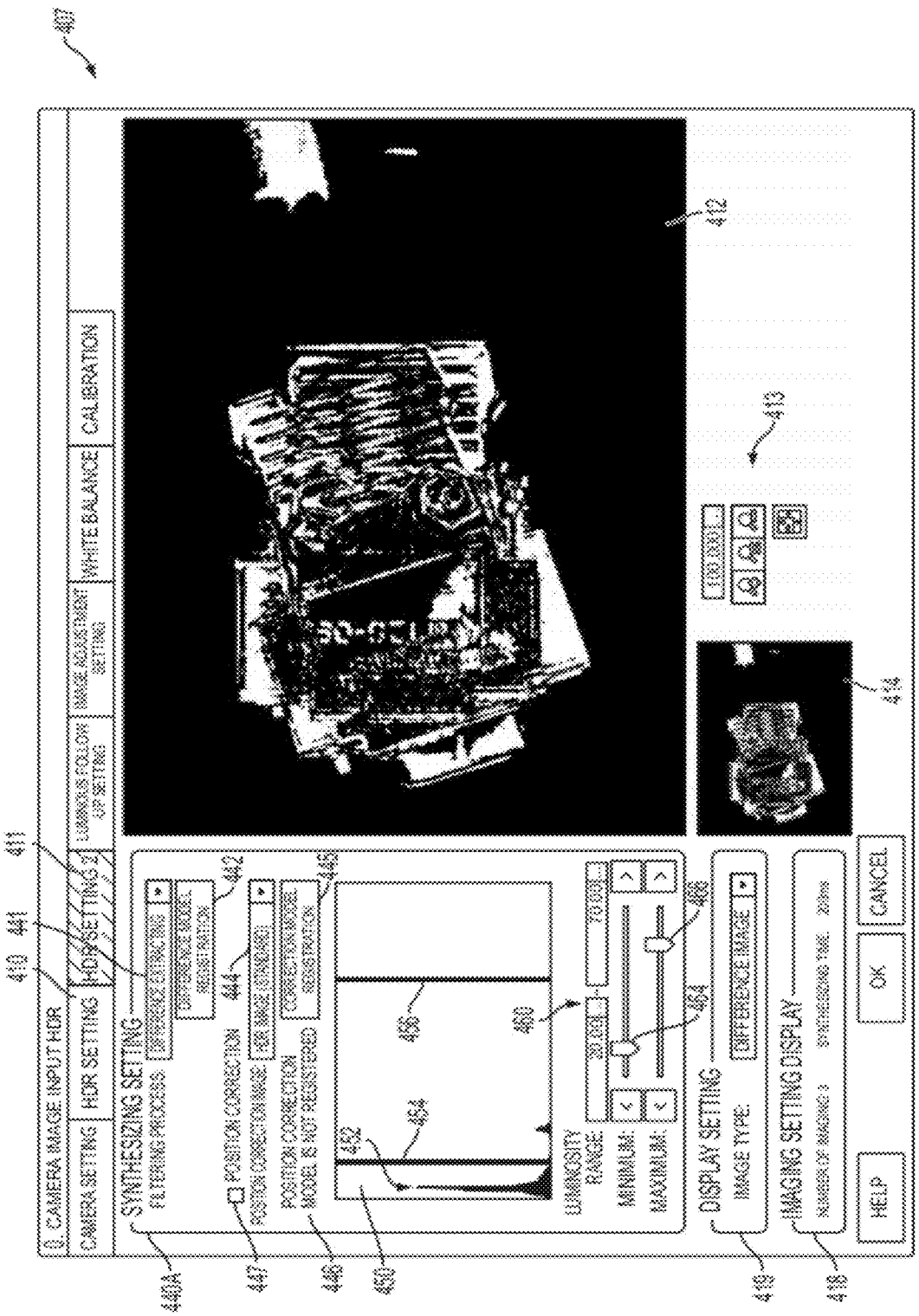
FIG. 20 is a view showing a screen display example when the image shown in FIG. 19B is the target.
Figure 21:
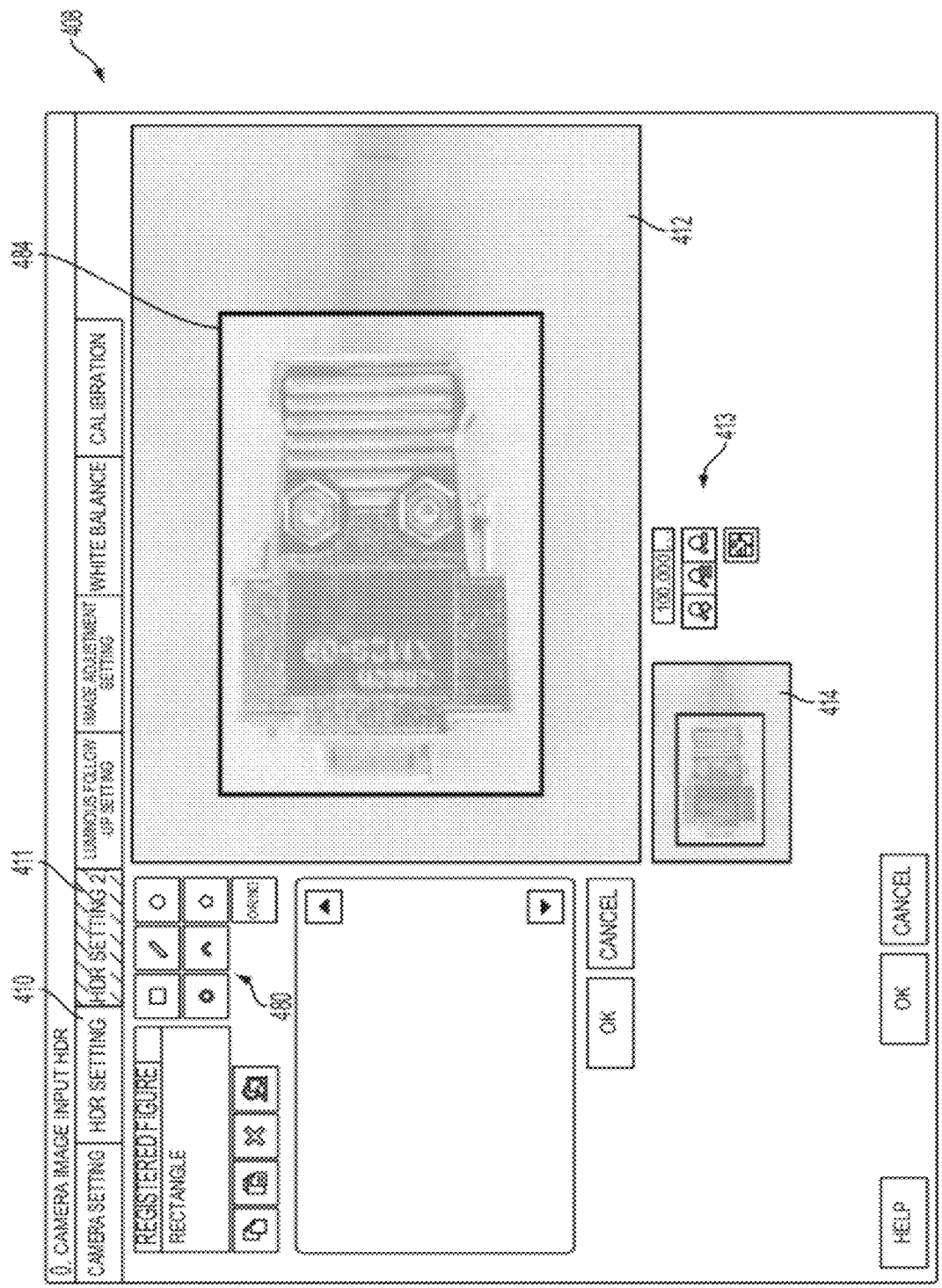
FIG. 21 is a view showing a screen display example at the time of registration of the correction model in the difference extracting process according to the embodiment of the present invention.

The position correction process executed in the difference extracting process will now be described with reference to FIGS. 19 to 21. FIGS. 19A and 19B are views showing one example of the synthetic image data used in the position correction process in the difference extracting process according to the embodiment of the present invention. FIG. 20 is a view showing a screen display example when the image shown in FIG. 19B is the target. FIG. 21 is a view showing a screen display example at the time of registration of the correction model in the difference extracting process according to the embodiment of the present invention. In the following description, the synthetic image data obtained by imaging the connector as shown in FIG. 19A as the reference work is the model image data.

When the work is conveyed by the conveyance line such as the conveyor, the direction may be a different direction or a different imaging position from the direction of the reference work at the time point the model image data is registered due to the influence of some kind of disturbance. For instance, assume a case in which the direction of the work shifted from the original direction, as shown in FIG. 19B, in time of imaging. In such a case, each pixel contained in the synthetic image data generated based on the image data acquired from the work differs from the corresponding pixel of the model image data.

In other words, as shown in FIG. 20, the amount of positional shift between the position of the reference work used in the registration of the model image data and the target work is extracted as the difference image data. Thus, the position correction needs to be performed so that the positional shift on the target work matches the model image data registered in advance to perform a correct examination.

In the image processing device according to the present embodiment, the position correction is performed on the input image data obtained by imaging the work using the search process described above. In other words, the model image data for performing the search (hereinafter after also referred to as "position correction model image data") is registered, the position where the correlation value between the input image data or the synthetic image data after generation and the registered position correction model image data becomes the highest is searched, and image conversion (change of direction and/or change of size) is performed on the input image data or the synthetic image data based on the correspondence relationship. The model image data used in the difference extracting process and the position correction model image data used in the position correction process may be the same, but one or a plurality of position correction model image data is preferably registered focusing on the characteristic portion of the work to enhance the search accuracy. In the image processing device according to the present embodiment, the position correction model image data can be registered independent from the model image data used in the difference extracting process.

A method of using contour information such as edge, a method of using barycentric area of the label, and the like may be used for the position correction process in place of the method of using the search process.

With reference to FIG. 20, the position correction process is enabled when the user selects (checks) the position correction checkbox 447 in the setting screen 407 of the synthesizing setting area 440A. After selecting the position correction checkbox 447, the user selects the image data to be extracted of the position correction model image data using the position correction image pull-down box 444. In the position correction image pull-down box 444, the synthetic image data, in which the model image data to use for the position extraction process is extracted, is selected as the default. In the position correction image pull-down box 444, the synthetic image data generated under different exposure conditions (when "brightness" range differs, when number of images used for image synthesis differs, etc.) can be arbitrarily selected. Furthermore, one of the input image data can be selected from a plurality of input image data used to generate the synthetic image data in the position correction image pull-down box 444. Thus, the time necessary for the search process can be shortened, and the position correction model image data more suited for the search process can be set since the position correction model image data can be extracted from an arbitrary image data.

The correction model registration button 445 accepts the instruction for registering the position correction model image data to use in the position correction process. If the position correction model image data is not yet registered, a message 446 "position correction model is not registered" is displayed adjacent to the correction model registration button 445. When the correction model registration button 445 is selected, the screen transitions to a region setting screen 408 for registering the model image data shown in FIG. 21.

With reference to FIG. 21, the region setting screen 408 includes an operation interface similar to the region setting screen 403 shown in FIG. 14, and displays an icon group 480 for selecting the shape of the region to be extracted as the position correction model image data. The image selected in the position correction image pull-down box 444 (FIG. 20) is displayed in the image display area 412.

The user sets the region 484 to the appropriate size and position in correspondence to the range to be the position correction model image data while referencing the image displayed on the image display area 412. In the region setting screen 408, the model extracting portion 2304 (FIG. 11) extracts the partial image data contained in the region 482 set by the user as the position correction model image and stores the same in the model storing portion 2305 by selecting the "OK" button after the user sets the size and the position of the region 484 to be extracted as the position correction model image data. The screen then returns to the setting screen 407 shown in FIG. 20.

As described above, after the position correction model image data is registered, the search portion 2306 (FIG. 11) searches the portion of highest degree of similarity with the registered position correction model image data of the synthetic image data. The pre-processing portion 2302 (FIG. 11) performs image conversion on the input synthetic image data based on the search result to correct the position and/or size thereof. The difference extracting portion 2303 (FIG. 11) executes the difference extracting process on the synthetic image data after the correction.

The difference image data as shown in FIG. 17 or FIG. 18 can be obtained even with respect to the synthetic image data shown in FIG. 19B by performing the position correction process.

(j2. Edge Extracting Process)
<1. Configuration>

The edge extracting process, which is a typical example of a spatial filtering process, will be described below as the post-process executed when the "edge extraction" is selected in the synthesizing setting area 440 of the setting screen 401 shown in FIG. 10. Similar configuration and processing procedure can be applied to spatial filtering process other than the edge extracting process. More specifically, the spatial filtering process is a process of calculating the feature quantity of the pixel based on the pixel information of each pixel contained in the image data (synthetic image data) to be processed and the pixel adjacent to the relevant pixel. In other words, the pixel information of each pixel of the post-processed image data corresponding to the pixel is calculated from the pixel information of each pixel contained in the synthetic image data and the pixel adjacent to the relevant pixel.

In the edge extracting process, amount of change (hereinafter referred to as "edge intensity") such as the tone value is extracted with respect to the image data arranged two-dimensionally. The two-dimensional data arranged with the edge intensity calculated in correspondence with each pixel of the image data to be processed is also referred to as "edge image data". Such an edge extracting process is used for detection of defects etc. in the work, alignment with respect to the work, and the like.

Figure 22:
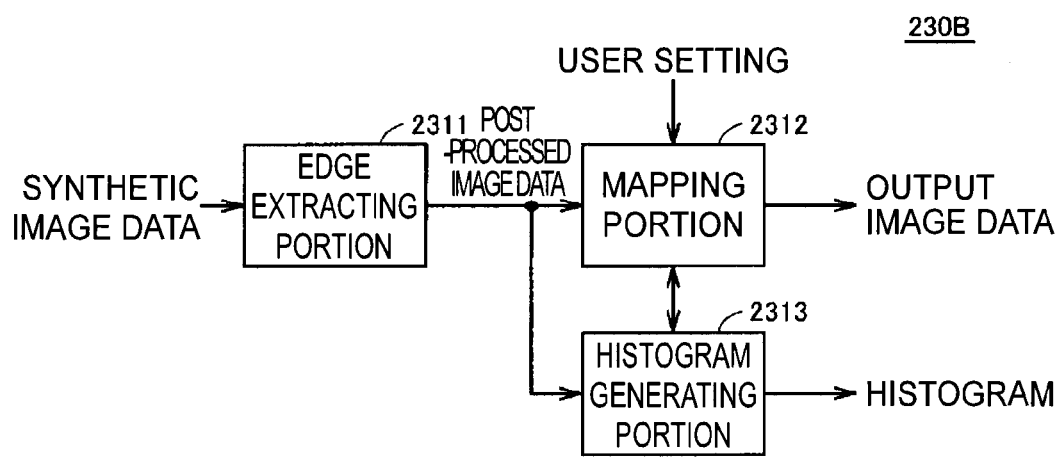
FIG. 22 is a functional block diagram showing a control structure of the post-processing unit according to the embodiment of the present invention.

FIG. 22 is a functional block diagram showing a control structure of the post-processing unit 230B (FIG. 6) according to the embodiment of the present invention. With reference to FIG. 22, the post-processing unit 230B includes an edge extracting portion 2311, a mapping portion 2312, and a histogram generating portion 2313.

The edge extracting portion 2311 executes the edge extracting process on the synthetic image data output from the image synthesizing unit 212 (FIG. 6). Various methods are proposed and put to practical use for the algorithm for implementing the edge extracting process. The Laplacian filter, and the like are typically used. The edge extracting portion 2311 outputs the edge image data (post-processed image data) containing the information of the calculated edge intensity of each pixel to the mapping portion 2312 and the histogram generating portion 2313. In other words, the edge extracting portion 2311 sequentially calculates the edge intensity $ED_i$ in correspondence with the coordinate position of the input synthetic image data. The edge extracting portion 2311 outputs the edge intensity $ED_i$ having the tone range same as the tone range (32 bits of each color) of the input synthetic image data.

The mapping portion assigns the edge intensity $ED_i$ of each pixel of the edge image data to the tone value $Y_i$ (e.g., 0 to 255 tone values) at the corresponding coordinate position i to determine the gray value (luminosity) of the synthetic image data. Generally, the tone value of the edge intensity $ED_i$ of each pixel is wider than the tone range of the tone value $Y_i$. The mapping process in the mapping portion 2312 is similar to FIG. 12 described above.

In other words, the mapping portion 2312 assigns to the tone value $Y_i$ according to the following conversion equation if the range of mapping (edge intensity upper limit value $ED_{max}$ and edge intensity lower limit value $ED_{min}$) is set by the user.

$$Y_i < ED_{min} : Y_i = 0 \quad (i)$$

$$ED_{min} \leq Y_i \leq ED_{max} : Y_i = 255 \times (ED_i - ED_{min})/(ED_{max} - ED_{min}) \quad (ii)$$

$$ED_{max} < Y_i : Y_i = 255 \quad (iii)$$

In the mapping portion 2312, the correspondence relationship used in the conversion from the edge intensity $ED_i$ to the tone value $Y_i$ is appropriately updated by changing the edge intensity upper limit value $ED_{max}$ and the edge intensity lower limit value $ED_{min}$.

As expressed with the above conversion equation, the pixels having the edge intensity $ED_i$ greater than the edge intensity upper limit value $ED_{max}$ are limited (held) at the maximum tone value (e.g., 255), and thus information on such edge intensity is lost. Similarly, the pixels having the edge intensity $ED_i$ smaller than the edge intensity lower limit value $ED_{min}$ are limited (held) at the minimum tone value (e.g., 0), and thus information on such edge intensity is lost. Therefore, only the pixels which value of edge intensity $ED_i$ is in the range of the edge intensity lower limit value $ED_{min}$ and the edge intensity upper limit value $ED_{max}$ become the pixels having an effective tone value on the output image data. In other words, the mapping portion 2312 assigns the edge intensity $ED_i$ of the edge image data having the value in a predetermined range to the effective value in the tone range. In other words, when the edge intensity upper limit value $ED_{max}$ and the edge intensity lower limit value $ED_{min}$ are set by the user, the mapping portion 2312 assigns the lower limit value (0) in the tone value $Y_i$ with respect to the pixel which value of the edge intensity $ED_i$ matches the edge intensity lower limit value $ED_{min}$, and assigns the upper limit value (255) in the tone value $Y_i$ with respect to the pixel which value of the edge intensity $ED_i$ matches the edge intensity upper limit value $ED_{max}$.

Returning back to FIG. 22, the histogram generating portion 2313 generates a histogram on the edge intensity $ED_i$ of the pixel contained in the edge image data. In other words, the histogram generating portion 2313 generates distribution data for displaying the distribution of the edge intensity $ED_i$ of the pixel contained in the edge image data on the monitor 102. More specifically, the histogram generating portion 2313 partitions the edge intensity $ED_i$ of each pixel to a class of a predetermined width, and calculates the frequency of each class. The user can easily set which pixel having the edge intensity of which range to output as the output image data by referencing the histogram generated by the histogram generating portion 2313.

The extent of the edge intensity of the edge image data extracted from the generated synthetic image data based on the input image data imaged by the imaging unit 8 is difficult to predict in advance. Thus, in the image processing device according to the present embodiment, the edge intensity range (edge intensity lower limit value $ED_{min}$ and edge intensity upper limit value $ED_{max}$) can be set to an appropriate range for every target work by providing the distribution state of the edge intensity of the pixel contained in the edge image data to the user.

<2. User Interface Example>

To facilitate the understanding on the edge extracting process, one example of user interface according to the edge extracting process displayed on the monitor 102 (FIG. 1) will be described with reference to FIG. 23.

Figure 23:
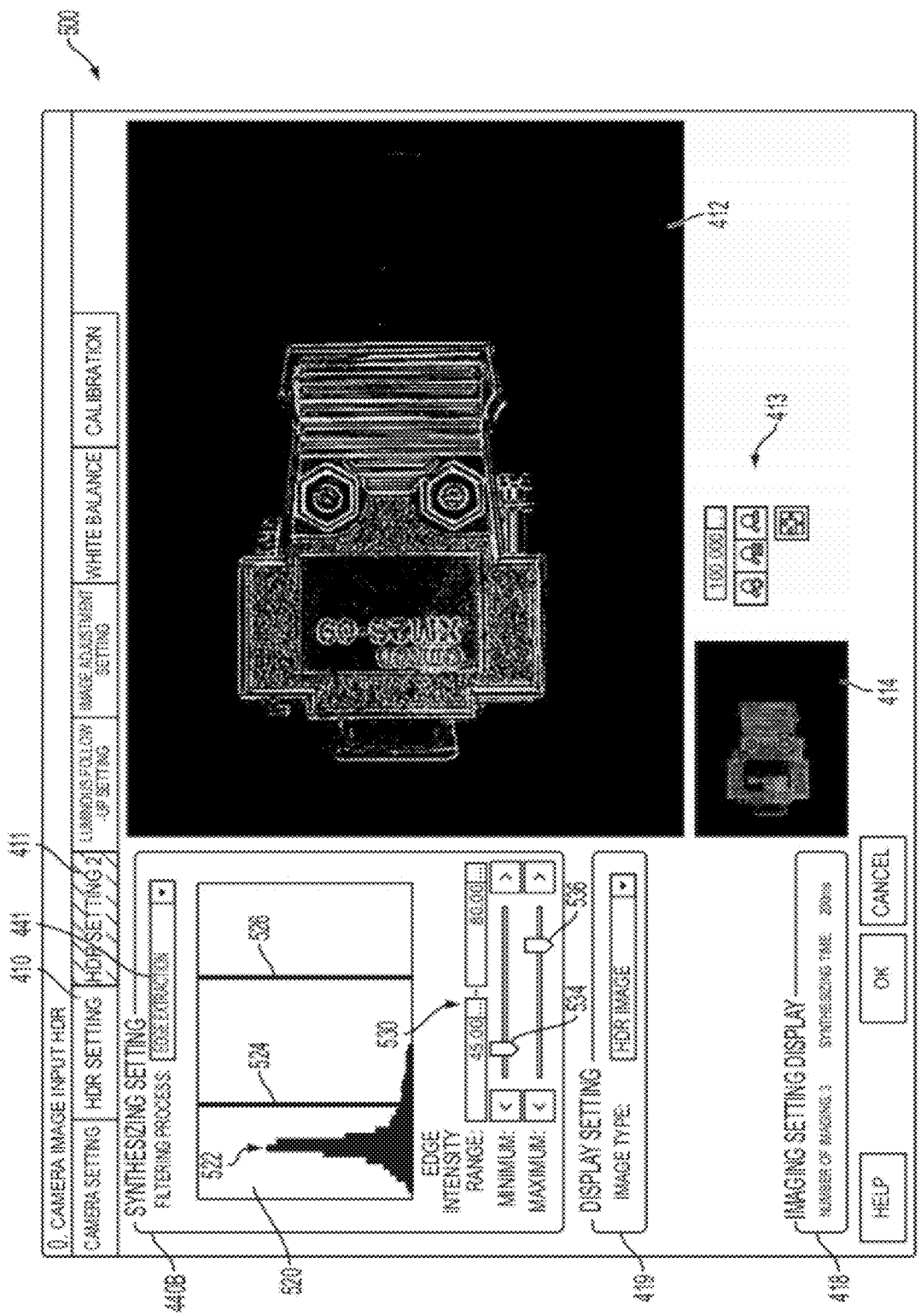
FIG. 23 is a view showing a screen display example at the time of selection of the edge extracting process displayed on the monitor of the image processing device according to the embodiment of the present invention.

FIG. 23 is a view showing a screen display example at the time of selection of the edge extracting process displayed on the monitor 102 of the image processing device according to the embodiment of the present invention.

FIG. 23 shows one example of a setting screen 501 displayed when the item "edge extraction" is selected in the filtering process pull-down box 441 in the synthesizing setting area 440 shown in FIG. 10. The edge extracting portion 2311 (FIG. 22) executes the edge extracting process with respect to the synthetic image data by selecting the item "edge extraction" in the filtering process pull-down box 441.

The setting screen 501 shown in FIG. 23 includes a synthesizing setting area 440B, the display setting area 419, the imaging setting display area 418, the image display area 412, the display control icon group 413, and the entire display area 414. The display setting area 419, the imaging setting display area 418, the image display area 412, the display control icon group 413, and the entire display area 414 are similar to the setting screen 401 shown in FIG. 10, and thus the detailed description will not be repeated.

The synthesizing setting area 440B corresponds to that in which a histogram display area 520 is added to the synthesizing setting area 440 shown in FIG. 10. The histogram display area 520 displays a histogram on the edge intensity of the edge image data obtained by the edge extracting process. In other words, the histogram 522 generated by the histogram generating portion 2313 (FIG. 22) is displayed in the histogram display area 520.

Indicators 524 and 526 indicating the user set edge intensity upper limit value $ED_{max}$ and the edge intensity lower limit value $ED_{min}$, respectively, are displayed in the histogram display area 520. Furthermore, a numerical value input box 530 for accepting direct numerical input of the edge intensity upper limit value $ED_{max}$ and the edge intensity limit value $ED_{min}$, a slide bar 534 for setting the edge intensity lower limit value $ED_{min}$ and a slide bar 536 for setting the edge intensity upper limit value $ED_{max}$ are displayed in association with the histogram display area 520.

The mapping process is performed on the edge image data obtained by the edge extracting process according to the edge intensity upper and lower limit range (edge intensity upper limit value $ED_{max}$ and edge intensity lower limit value $ED_{min}$) set by the user operation on the slide bar 534 or 536, or the numerical value input box 530. In other words, the edge intensity upper and lower limit range (edge intensity upper limit value $ED_{max}$ and edge intensity lower limit value $ED_{min}$) set through the slide bar 534 or 536, or the numerical value input box 530 is provided to the mapping portion 2312 (FIG. 22).

<3. Processing Example of Edge Extracting Process>

Figure 24:
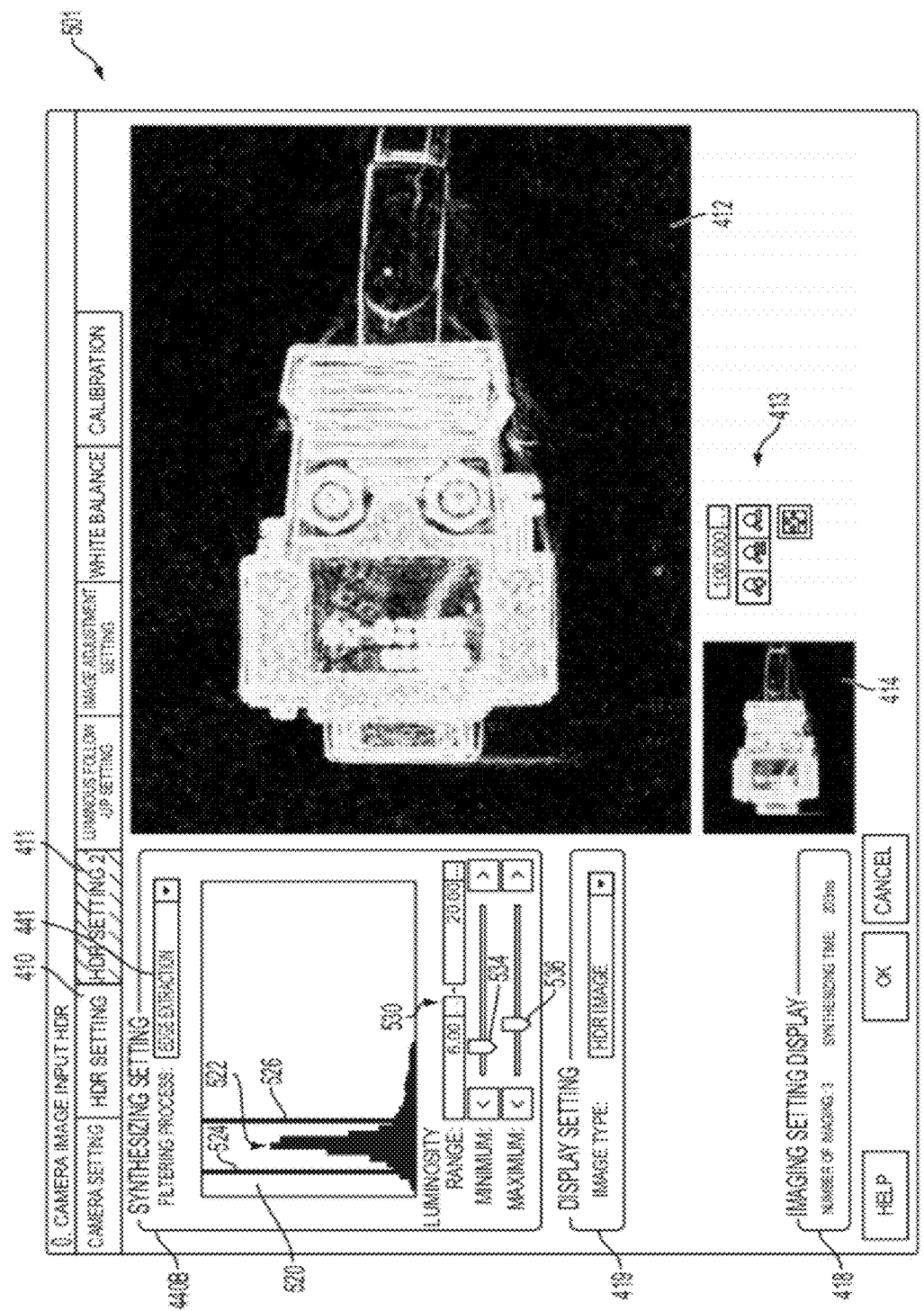
FIG. 24 is a view showing a result (1) of executing the edge extracting process on the synthetic image data obtained by imaging the connector as shown in FIG. 15A.

In FIGS. 23 and 24, the result of executing the edge extracting process on the synthetic image data obtained by imaging the connector as shown in FIG. 15A is shown.

FIG. 23 shows a case in which the edge intensity upper and lower limit range (edge intensity upper limit value $ED_{min}$ and edge intensity lower limit value $ED_{min}$) is set to a range of relatively high edge intensity with respect to the main component of the histogram 522 in the histogram display area 520. FIG. 24 shows a case in which the edge intensity upper and lower limit range (edge intensity upper limit value $ED_{min}$ and edge intensity lower limit value $ED_{min}$) is set so as to cross the main component of the histogram 522 in the histogram display area 520.

In the example shown in FIG. 23, an entirely dark edge image is displayed in the image display area 412 since the value of the edge intensity of the majority of pixels contained in the edge image data is smaller than the edge intensity lower limit value $ED_{min}$. In the example shown in FIG. 24, an entirely brighter edge image is displayed in the image display area 412 compared to FIG. 22 since the value of the edge intensity of the majority of pixels contained in the edge image data is within the edge intensity upper and lower limit range. In this case, however, whiteout (one type of halation) occurs at the center portion of the work.

The image display can be made with an appropriate luminosity according to the target portion of the work since the edge image displayed in the image display area 412 changes, as needed, by changing the edge intensity upper and lower limit range.

(j3. Band Pass Filtering Process)

<1. Configuration>

The band pass filtering process of extracting only a specific frequency component contained in the image will be described below as the post-process executed when the "band pass filtering" is selected in the synthesizing setting area 440 of the setting screen 401 shown in FIG. 10.

The frequency component of a specific region can be extracted by using the band pass filtering process, whereby a specific edge can be extracted, and the shading of the image can be cut.

Such a band pass filtering process can be typically implemented by calculating the difference between the image data obtained by performing the smoothing (filtering) process in two different window sizes with respect to one input image data. As another alternative method, similar band pass filtering process can be implemented by performing the Fourier transformation on the image data.

In the following description, a configuration of performing the smoothing process on one synthetic image data in two different window sizes will be described. In other words, in the band pass filtering process described below, first smoothed image data is generated by performing a first smoothing process on the synthetic image data, second smoothed image data is generated by performing a second smoothing process different from the first smoothing process, and output image data is generated by calculating the difference between the images.

Figure 25:
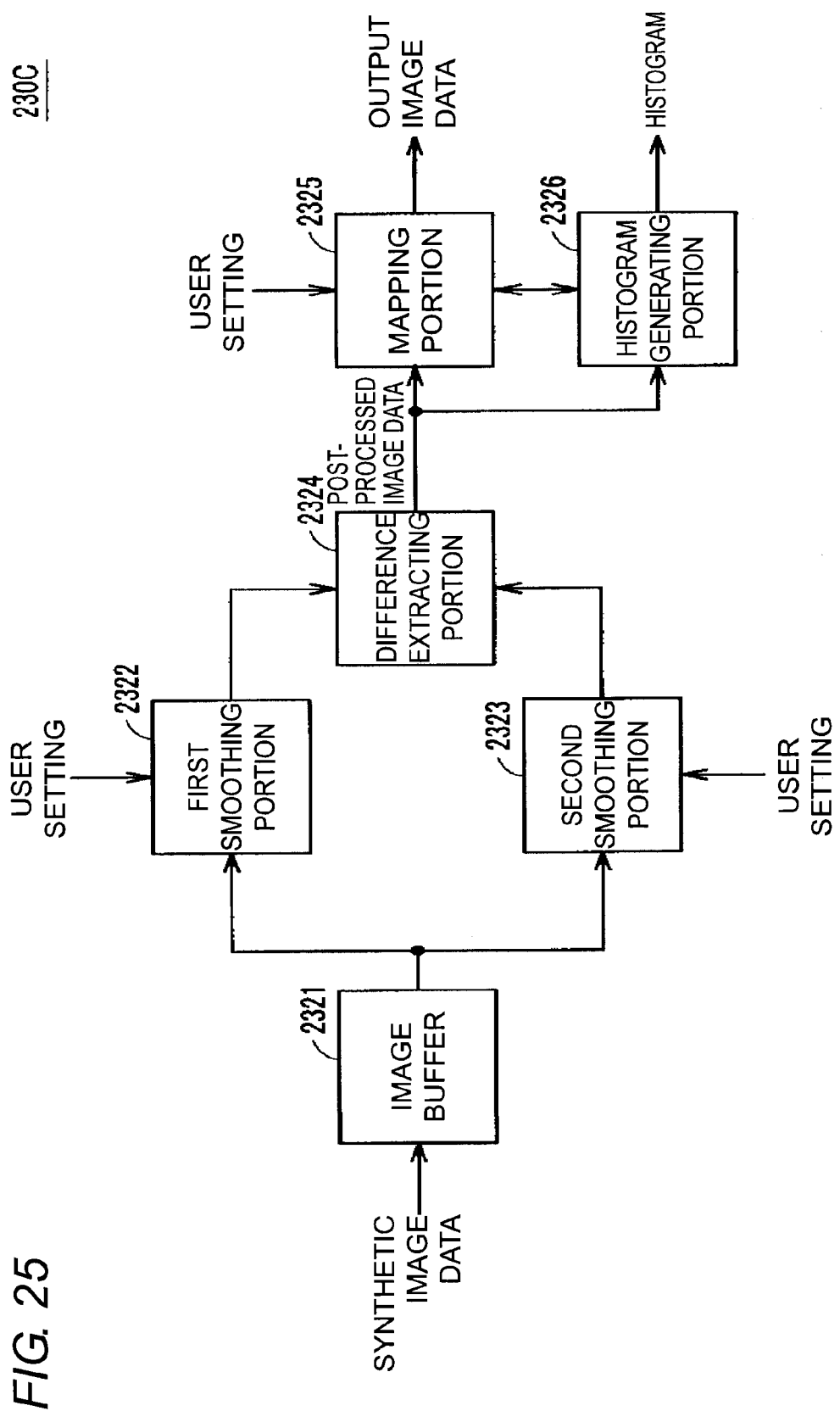
FIG. 25 is a view showing a result (2) of executing the edge extracting process on the synthetic image data obtained by imaging the connector as shown in FIG. 15A.

FIG. 25 is a functional block diagram showing a control structure of the post-processing unit 230C (FIG. 6) according to the embodiment of the present invention. With reference to FIG. 25, the post-processing unit 230C includes an image buffer 2321, a first smoothing portion 2322, a second smoothing portion 2323, a difference extracting portion 2324, a mapping portion 2325, and a histogram generating portion 2326.

The image buffer 2321 temporarily stores the synthetic image data output from the image synthesizing unit 212 (FIG. 6). The synthetic image data stored in the image buffer 2321 can be accessed from both the first smoothing portion 2322 and the second smoothing portion 2323.

The first smoothing portion 2322 and the second smoothing portion 2323 both perform the smoothing process in the window size respectively set with respect to the synthetic image data stored in the image buffer 2321. The smoothing process sets a plurality of windows in the window size set with respect to the synthetic image data, and performs an averaging process among the pixels contained in each window. The window size is the range of pixels contained in the corresponding window. For instance, if the window size is 3×3, each window includes nine pixels. The smoothed image data output by the first smoothing portion 2322 and the second smoothing portion 2323 are then output to the difference extracting portion 2324.

In other words, the image data output from the first smoothing portion 2322 and the second smoothing portion 2323 correspond to the image data that passed the frequency filter corresponding to the corresponding window size. In other words, the first smoothing portion 2322 functions as a low pass filter of cutoff frequency f1, and the second smoothing portion 2323 function as a low pass filter of cutout frequency f2.

The difference extracting portion 2324 generates difference image data (post-processed image data) by extracting a difference between the first image data input from the first smoothing portion 2322 and the second image data input from the second smoothing portion 2323. More specifically, the difference extracting portion 2324 calculates the difference in each color component of the color information ($R^{(1)}{}_i$, $G^{(1)}{}_i$, $B^{(1)}{}_i$) at the coordinate position i of the first image data and the color information ($R^{(2)}{}_i$, $G^{(2)}{}_i$, $B^{(2)}{}_i$) at the coordinate position i of the second image data. The difference extracting portion 2324 calculates a color difference vector for each pixel with respect to all pixels. The difference extracting portion 2324 also calculates an absolute value of the calculated color difference vector as a luminosity $V_i$ at the corresponding coordinate position i. The difference extracting portion 2324 outputs the difference image data including the luminosity $V_i$ calculated for all pixels. The difference extracting portion 2324 outputs the luminosity $V_i$ having a tone range same as the tone range (32 bits of each color) of the input synthetic image data.

Thus, the difference image data output by calculating the difference of the first image data and the second image data corresponds to the image in which the synthetic image data is passed through the band pass filter between the cutoff frequency f1 and the cutoff frequency f2. If the smoothing process is performed in the second smoothing portion 2323, the difference image data output from the difference extracting portion 2324 corresponds to the image in which the synthetic image data is passed through the high pass filter of cutoff frequency f1.

Figure 26B:
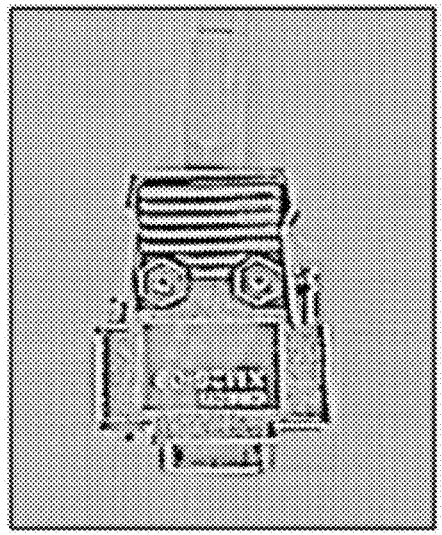
FIGS. 26A to 26D are views showing one example of the image data in each stage of the band pass filtering process according to the embodiment of the present invention.
Figure 26D:
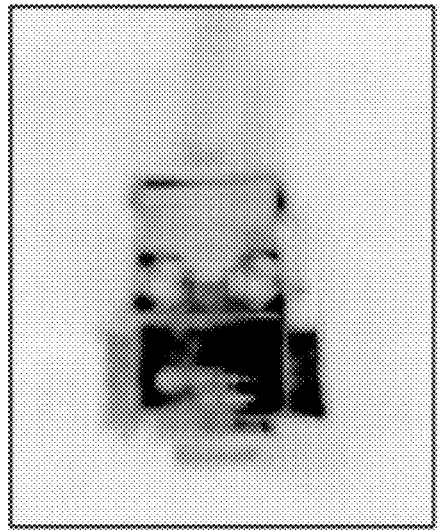
Figure 26A:
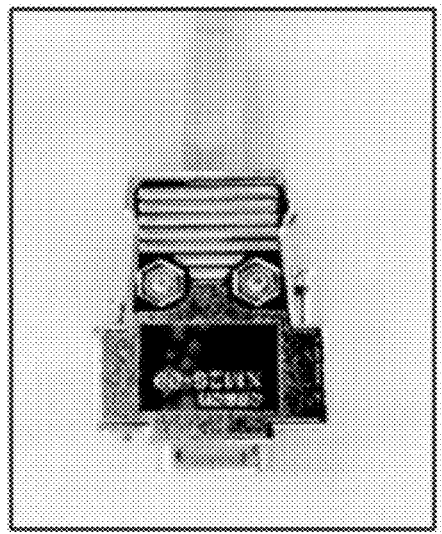
Figure 26C:
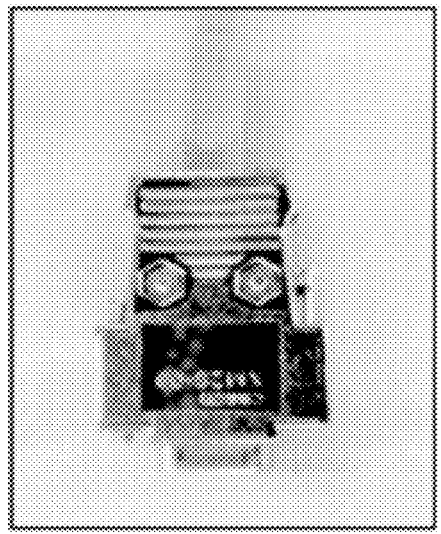

FIGS. 26A to 26D are views showing one example of the image data in each stage of the band pass filtering process according to the embodiment of the present invention. For instance, assume that the synthetic image data as shown in FIG. 26A is input to the image buffer 2321. FIG. 26B shows one example of the output image data or the output result of the band pass filtering process set with a certain window size with respect to the synthetic image data as shown in FIG. 26A. In the generation process of the output image data, the smoothing process is executed with respect to the synthetic image data as shown in FIG. 26A from the first smoothing portion 2322 set with a smaller window size, and the image data after smoothing as shown in FIG. 26C is output. The output image data as shown in FIG. 26B is generated by taking a difference between the image data shown in FIG. 26C and the image data shown in FIG. 26D.

The mapping portion 2325 determines the gray value (luminosity) of the synthetic data by assigning the luminosity $V_i$ of each pixel of the difference image data to the tone value $Y_i$ (e.g., 0 to 255 tone values) at the corresponding coordinate position i. Generally, the tone range of the luminosity $V_i$ of each pixel is wider than the tone range of the tone value Y. In other words, the mapping process in the mapping portion 2325 is similar to that in FIG. 12 described above.

In other words, when the range of mapping (luminosity upper limit value $V_{max}$ and luminosity lower limit value $V_{min}$) is set by the user, the mapping portion 2325 performs assignment to the tone value $Y_i$ according to the following conversion equation.

$$Y_i < V_{min} : Y_i = 0 \quad \text{(i)}$$

$$V_{min} \leq Y_i \leq V_{max} : Y_i = 255 \times (V_i - V_{min})/(V_{max} - V_{min}) \quad \text{(ii)}$$

$$V_{max} < Y_i : Y_i = 255 \quad \text{(iii)}$$

Thus, the correspondence relationship used in the conversion from the luminosity $V_i$ to the tone value $Y_i$ is appropriately updated by changing the luminosity upper limit value $V_{max}$ and the luminosity lower limit value $V_{min}$ in the mapping portion 2325.

Returning back to FIG. 25, the histogram generating portion 2326 generates a histogram on the luminosity $V_i$ of the pixel contained in the difference image data. In other words, the histogram generating portion 2326 generates distribution data for displaying the distribution of the luminosity $V_i$ of the pixel contained in the difference image data on the monitor 102. More specifically, the histogram generating portion 2326 partitions the luminosity $V_i$ of each pixel to a class of a predetermined width, and calculates the frequency of each class. The user can easily set which pixel having the luminosity of which range to output as the output image data by referencing the histogram generated by the histogram generating portion 2326.

<2. User Interface Example>

To facilitate the understanding on the band pass filtering process, one example of user interface according to the band pass filtering process displayed on the monitor 102 (FIG. 1) will be described with reference to FIG. 27.

Figure 27:
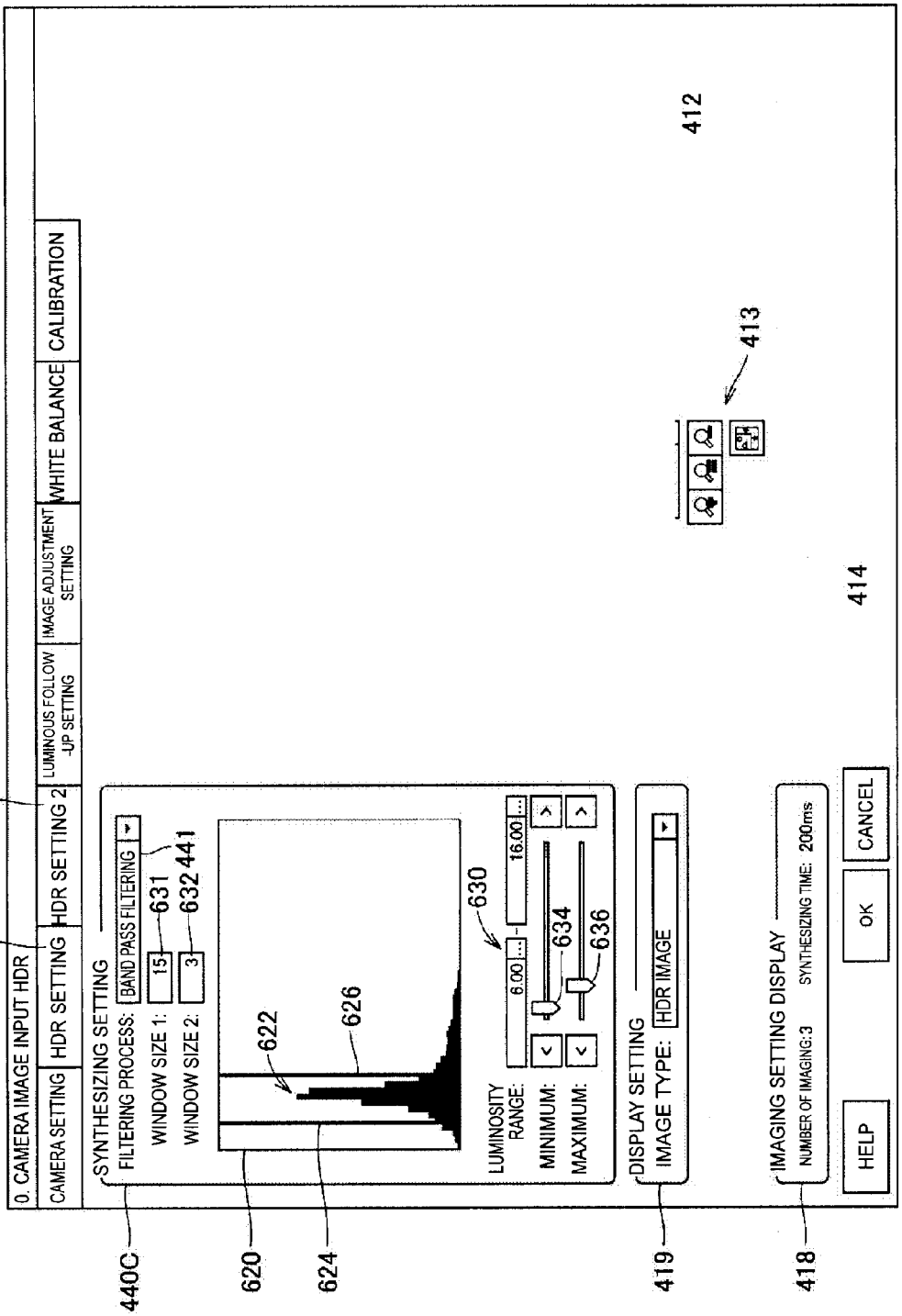
FIG. 27 is a view showing a screen display example at the time of selection of the band pass filtering process displayed on the monitor of the image processing device according to the embodiment of the present invention.

FIG. 27 is a view showing a screen display example at the time of selection of the band pass filtering process displayed on the monitor 102 of the image processing device according to the embodiment of the present invention.

FIG. 27 shows one example of a setting screen 601 displayed when the item "band pass filtering" is selected in the filtering process pull-down box 441 in the synthesizing setting area 440 shown in FIG. 10. The band pass filtering process starts with respect to the synthetic image data by selecting the item "band pass filtering" in the filtering process pull-down box 441.

The setting screen 601 shown in FIG. 27 includes a synthesizing setting area 440C, the display setting area 419, the imaging setting display area 418, the image display area 412, the display control icon group 413, and the entire display area 414. The display setting area 419, the imaging setting display area 418, the image display area 412, the display control icon group 413, and the entire display area 414 are similar to the setting screen 401 shown in FIG. 10, and thus the detailed description will not be repeated.

The synthesizing setting area 440C corresponds to that in which window size setting boxes 631 and 632 and a histogram display area 620 are added to the synthesizing setting area 440 shown in FIG. 10.

The window size setting boxes 631 and 632 accept the numerical input of the window size used in the smoothing process in the first smoothing portion 2322 and the second smoothing portion 2323 (both shown in FIG. 25), respectively. In other words, the numerical value S1 input to the window size setting box 631 is provided to the first smoothing portion 2322. The first smoothing portion 2322 executes the smoothing process in the window size of S1×S1. Similarly, the numerical value S2 input to the window size setting box 632 is provided to the second smoothing portion 2323. The second smoothing portion 2323 executes the smoothing process in the window size of S2×S2.

The histogram display area 620 displays a histogram on the luminosity of the difference image data obtained by the band pass filtering process. In other words, the histogram 622 generated by the histogram generating portion 2326 (FIG. 25) is displayed in the histogram display area 620.

Indicators 624 and 626 indicating the user set luminosity lower limit value $V_{min}$ and the luminosity upper limit value $V_{max}$, respectively, are displayed in the histogram display area 620. Furthermore, a numerical value input box 630 for accepting direct numerical input of the luminosity upper limit value $V_{max}$ and the luminosity limit value $V_{min}$, a slide bar 634 for setting the luminosity lower limit value $V_{min}$ and a slide bar 636 for setting the luminosity upper limit value $V_{max}$ are displayed in association with the histogram display area 620.

The mapping process is performed on the difference image data obtained by the band pass filtering process according to the luminosity upper and lower limit range (luminosity upper limit value $V_{max}$ and luminosity lower limit value $V_{min}$) set by the user operation on the slide bar 634 or 636, or the numerical value input box 630. In other words, the luminosity upper and lower limit range (luminosity upper limit value $V_{max}$ and luminosity lower limit value $V_{min}$) set through the slide bar 634 or 636, or the numerical value input box 630 is provided to the mapping portion 2325 (FIG. 25).

(j4. Color Extracting Process)

The color extracting process of extracting the pixel (region) having a specific color component contained in the image will be described below as the post-process executed when the "color extraction" is selected in the synthesizing setting area 440 of the setting screen 401 shown in FIG. 10.

The color extracting process is one type of color filtering process, and specifies the position of the pixel having the color information same as the color specified by the user or proximate to the relevant color in the input synthetic image data. The area measuring process, labeling process, and the like can be carried out on the pixel having the specified color by using the color extracting process.

The HSB (Hue, Saturation, Brightness) color system may be used for the color information to be specified by the user, in addition to the RGB color system that uses the gray value of "red", "green", and "blue". The color can be extracted in a distinguished manner by performing such color extracting process on the synthetic image data even if a slight color difference that cannot be represented on the monitor 102 exists.

K. Processing Procedure

Figure 28:
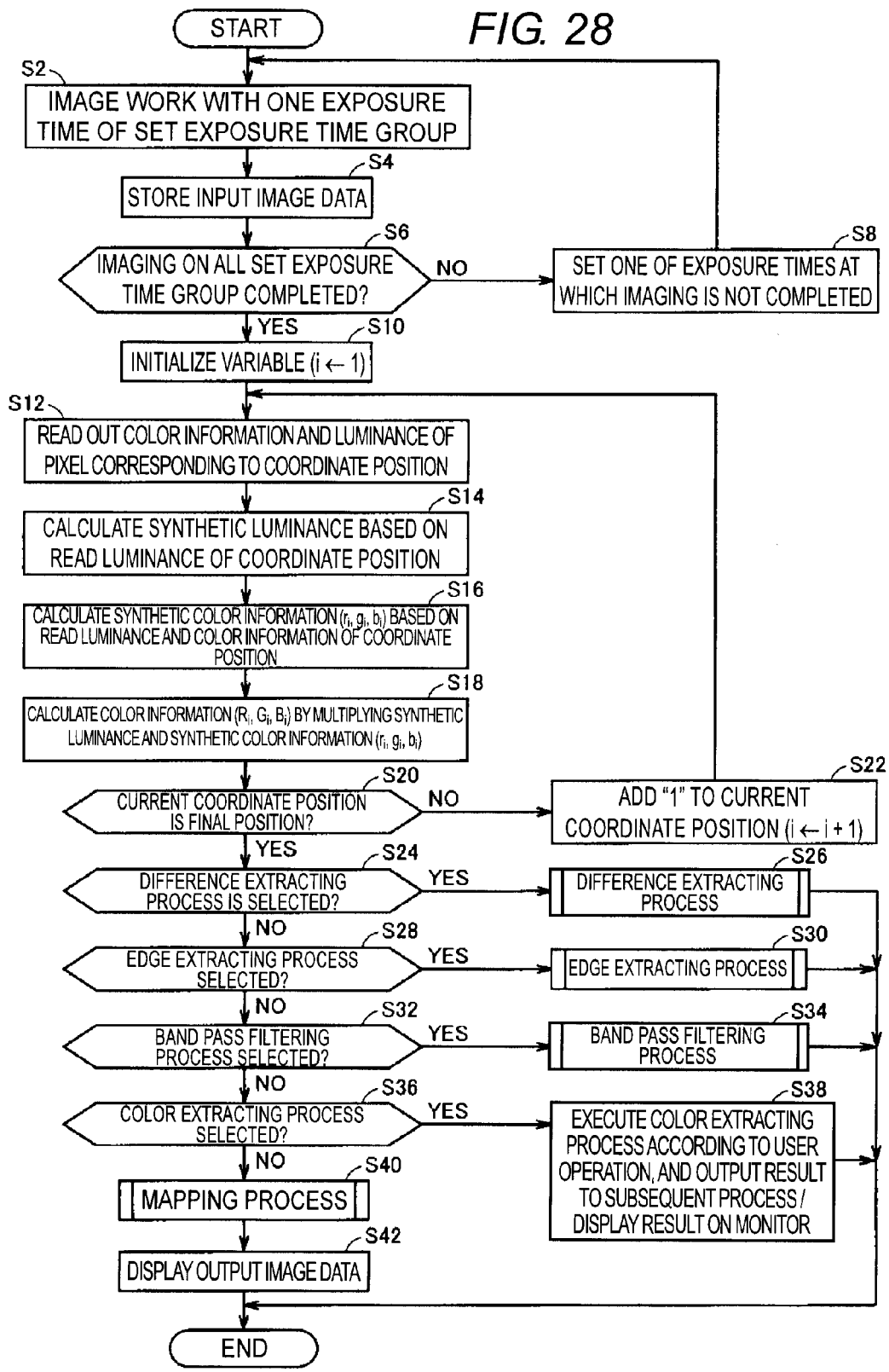
FIG. 28 is a flowchart showing an overall processing procedure in the image processing device according to the embodiment of the present invention.
Figure 29:
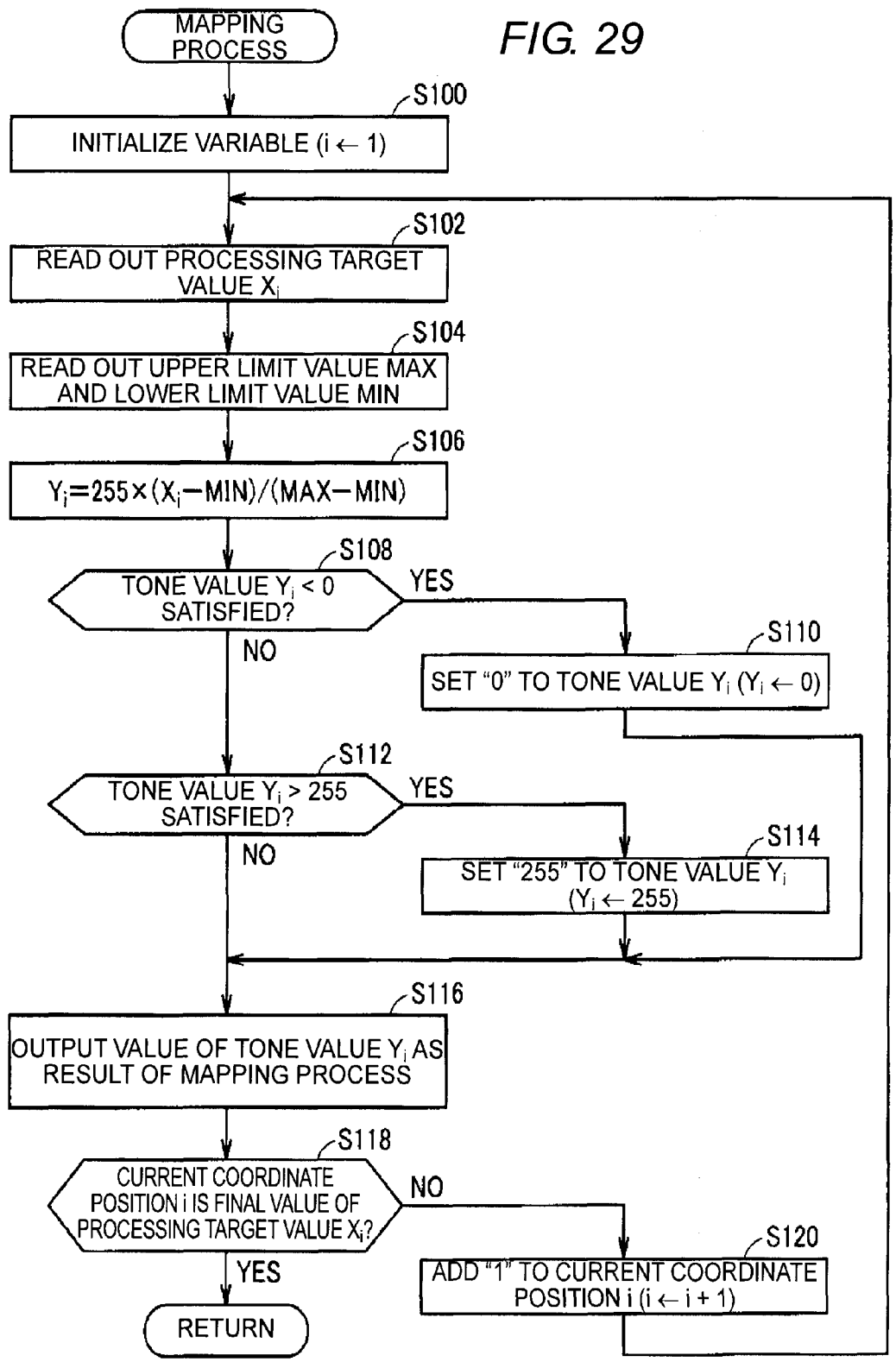
FIG. 29 is a flowchart showing the procedure of the mapping process in the image processing device according to the embodiment of the present invention.
Figure 30:
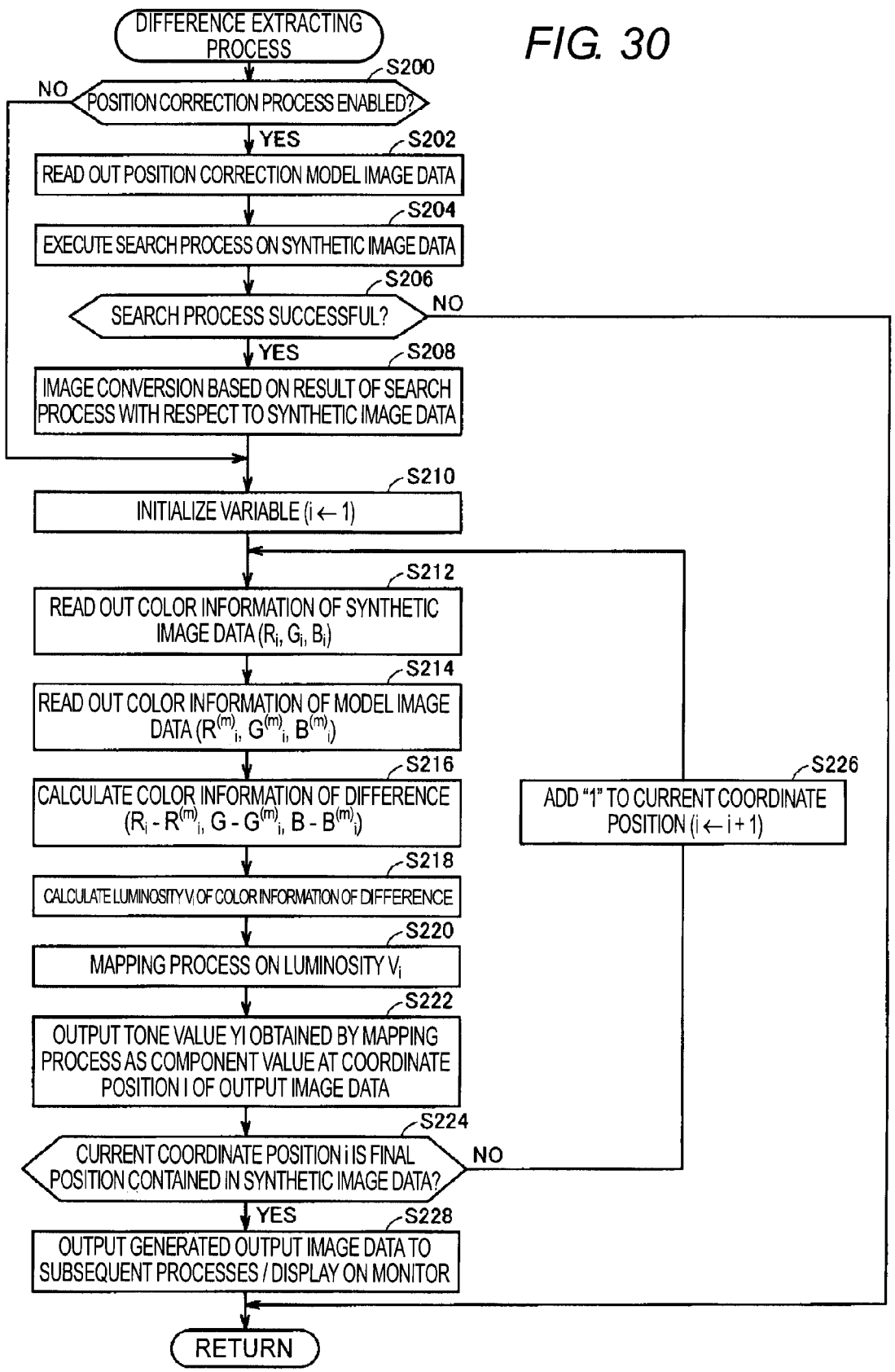
FIG. 30 is a flowchart showing the procedure of the difference extracting process in the image processing device according to the embodiment of the present invention.
Figure 31:
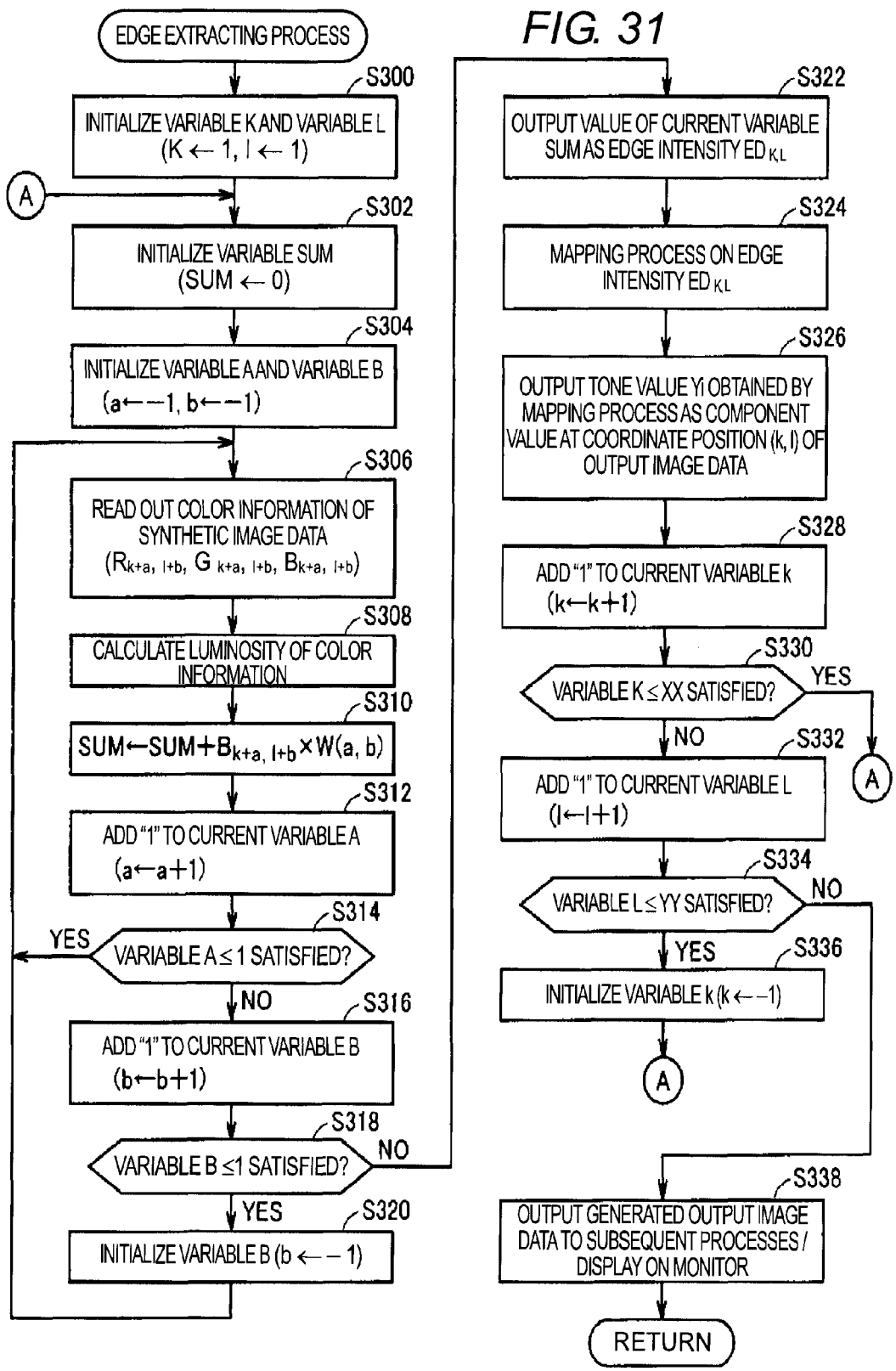
FIG. 31 is a flowchart showing the procedure of the edge extracting process in the image processing device according to the embodiment of the present invention.
Figure 32:
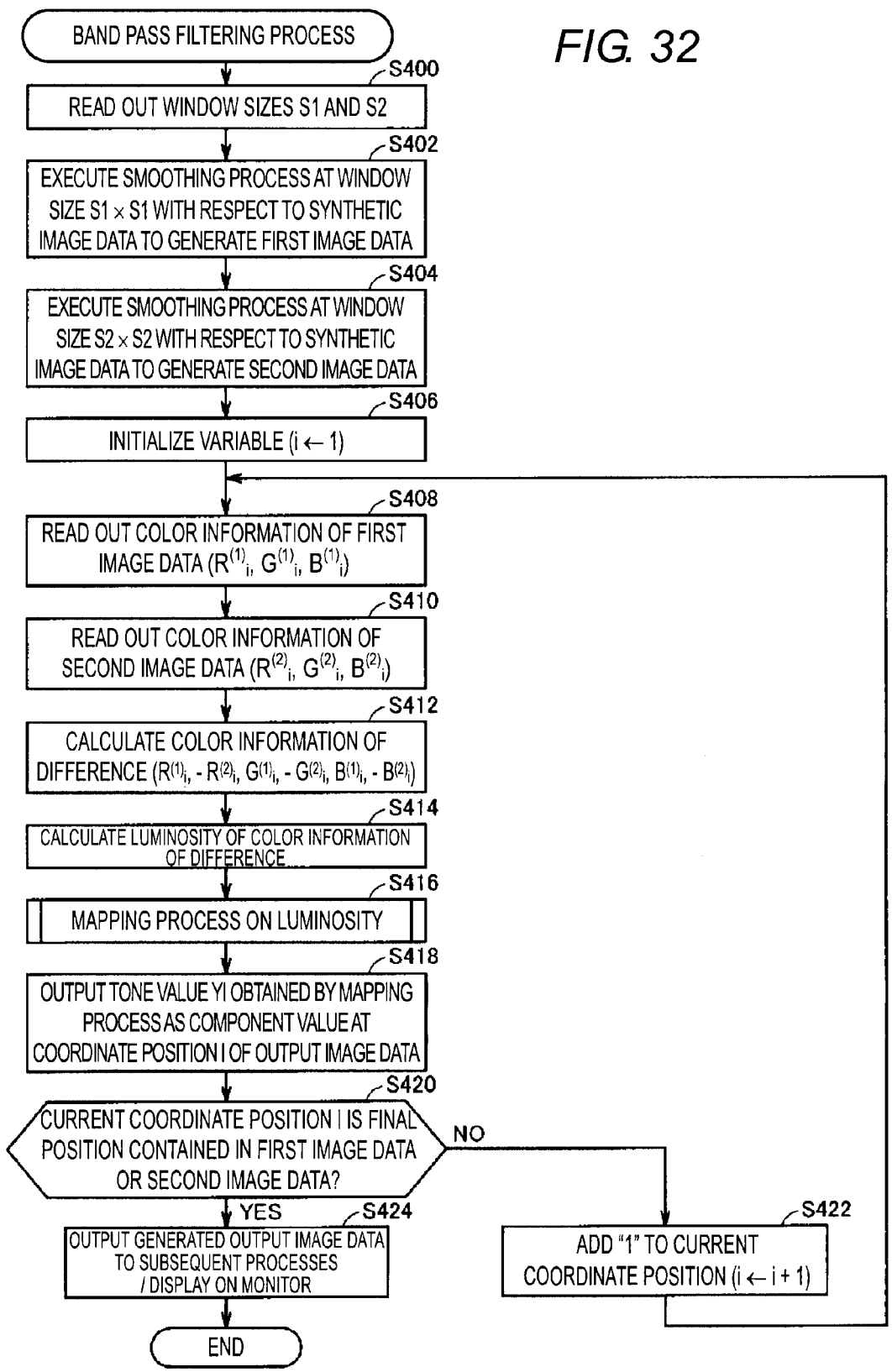
FIG. 32 is a flowchart showing the procedure of the band pass filtering process in the image processing device according to the embodiment of the present invention.

FIG. 28 is a flowchart showing an overall processing procedure in the image processing device according to the embodiment of the present invention. FIG. 29 is a flowchart showing the procedure of the mapping process in the image processing device according to the embodiment of the present invention. FIG. 30 is a flowchart showing the procedure of the difference extracting process in the image processing device according to the embodiment of the present invention. FIG. 31 is a flowchart showing the procedure of the edge extracting process in the image processing device according to the embodiment of the present invention. FIG. 32 is a flowchart showing the procedure of the band pass filtering process in the image processing device according to the embodiment of the present invention. Each step in the flowcharts shown in FIGS. 28 to 32 is typically implemented when the CPU 105 reads out the program stored in advance in the fixed disc 107, and the like to the memory 106, and executes the program. The number of imaging, the exposure time in each imaging, and the like related to the image synthesizing process are set in advance.

The input image data is configured by n pixels, and the coordinate position thereof is represented as a variable i ($1 \leq i \leq n$).

(k1. Overall Process)

With reference to FIG. 28, the CPU 105 first gives an instruction to the imaging unit 8 to image the work 2 at one of the exposure time group set in advance (step S2), and temporarily stores the input image data transmitted from the imaging unit 8 in the memory 106, and the like (step S4). Thereafter, the CPU 105 determines whether or not imaging on all exposure time group set in advance is completed (step S6). If imaging on one part of the exposure time group set in advance is not completed (NO in step S6), the CPU 105 sets one of the exposure times at which imaging is not completed in the exposure time group set in advance (step S8), and repeats the processes after step S2.

If imaging on all exposure time group set in advance is completed (YES in step S6), the CPU 105 initializes the variable i (i←1) (step S10), and reads out the color information and the luminance of the pixel corresponding to the coordinate position i for the plurality of input image data temporarily stored in the memory 106, and the like (step S12). The CPU 105 then calculates the synthetic luminance $E_i$ of the coordinate position i based on the read luminance of the pixel corresponding to the coordinate position i of the plurality of input image data (step S14). Concurrently, the CPU 105 calculates the synthetic color information ($r_i$, $g_i$, $b_i$) of the coordinate position i based on the read luminance and the color information of the pixel corresponding to the coordinate position i of the plurality of input image data (step S16).

The CPU 105 then calculates the absolute color information ($R_i$, $G_i$, $B_i$) of the coordinate position i by multiplying the synthetic luminance $E_i$ of the coordinate position i calculated in step S14 and the synthetic color information ($r_i$, $g_i$, $b_i$) of the coordinate position i calculated in step S16 (step S18).

The CPU 105 determines whether or not the current coordinate position i is the final position ($n^{th}$) in the input image data (step S20). If the current coordinate position i is not the final position in the input image data (NO in step S20), the CPU 105 adds "1" to the current coordinate position i (i←i+1) (step S22), and repeats the processes after step S12.

If the current coordinate position i is the final position in the input image data (YES in step S20), the CPU 105 determines whether or not the difference extracting process is selected as the post-process (step S24). If the difference extracting process is selected (YES in step S24), the CPU 105 executes the difference extracting process shown in FIG. 30 (step S26). The process is thereafter terminated.

If the difference extracting process is not selected (NO in step S24), the CPU 105 determines whether or not the edge extracting process is selected as the post-process (step S28). If the edge extracting process is selected (YES in step S28), the CPU 105 executes the edge extracting process shown in FIG. 31 (step S30). The process is thereafter terminated.

If the edge extracting process is not selected (NO in step S28), the CPU 105 determines whether or not the band pass filtering process is selected as the post-process (step S32). If the band pass filtering process is selected (YES in step S32), the CPU 105 executes the band pass filtering process shown in FIG. 32 (step S34). The process is thereafter terminated.

If the band pass filtering process is not selected (NO in step S32), the CPU 105 determines whether or not the color extracting process is selected as the post-process (step S36). If the color extracting process is selected (YES in step S36), the CPU 105 executes the color extracting process according to the user operation, and outputs the result to the subsequent processes and/or displays the result on the monitor (step S38). The process is thereafter terminated.

If the color extracting process is not selected (NO in step S36), the CPU 105 executes the mapping process shown in FIG. 29 (step S40). In other words, the CPU 105 converts the synthetic image data having greater amount of tone value to the output image data of a predetermined tone range. The CPU 105 then displays the generated output image data on the monitor 102 (step S42). The process is thereafter terminated.

(k2. Mapping Process)

The mapping process will be illustrated with reference to FIG. 29. The mapping process shown in FIG. 29 is a subroutine used in the difference extracting process shown in FIG. 30, the edge extracting process shown in FIG. 31, and the band pass filtering process shown in FIG. 32 in addition to the step S40 shown in FIG. 28. Therefore the physical value (synthetic luminance $E_i$, luminosity $V_i$, edge intensity $ED_i$, etc.) of the mapping target is represented as the processing target value $X_i$, and the upper limit value and the lower limit value defining the mapping range are respectively represented as MAX and MIN.

With reference to FIG. 29, the CPU 105 first initializes the variable i (i←1) (step S100). The CPU 105 then reads out the processing target value $X_i$ (step S102), and reads out the user set upper limit value MAX and lower limit value MIN (step S104).

The CPU 105 calculates the tone value $Y_i$ according to the calculation formula of $Y_i = 255 \times (X_i - MIN)/(MAX - MIN)$ (step S106). The CPU 105 then determines whether or not the tone value $Y_i < 0$ is satisfied for the calculated tone value $Y_i < $ (step S108). If the tone value $Y_i < 0$ (YES in step S108) is satisfied, the CPU 105 sets "0" to the tone value $Y_i$ ($Y_i \leftarrow 0$) (step S110).

If the tone value $Y_i < 0$ is not satisfied (NO in step S108), the CPU 105 determines whether or not the tone value $Y_i > 255$ is satisfied (step S112). If the tone value $Y_i > 255$ is satisfied (YES in step S112), the CPU 105 sets "255" to the tone value $Y_i$ ($Y_i \leftarrow 255$) (step S114).

If the tone value $Y_i > 255$ is not satisfied (NO in step S112), after the execution of step S110 or step S114, the CPU 105 outputs the value of the calculated tone value $Y_i$ as the result of the mapping process (step S116). Furthermore, the CPU 105 determines whether or not the current coordinate position i is the final value of the processing target value $X_i$ (step S118). If the current coordinate position i is not the final value of the processing target value $X_i$ (NO in step S118), the CPU 105 adds "1" to the current coordinate position i (i←i+1) (step S120), and repeats the processes after step S102.

If the current coordinate position i is the final value of the processing target value $X_i$ (YES in step S118), the CPU 105 terminates the current process, and returns to the original process.

(k3. Difference Extracting Process)

The difference extracting process will now be described with reference to FIG. 30. Assume that the model image data is registered in advance. If the position correction process, to be described later, is enabled, the position correction model image data is registered in advance.

With reference to FIG. 30, the CPU 105 first determines whether or not the position correction process is enabled (step S200). In other words, the CPU 105 determines whether or not the position correction checkbox 447 shown in FIG. 10 is checked. If the position correction process is not enabled (NO in step S200), the process proceeds to step S210.

If the position correction process is enabled (YES in step S200), the CPU 105 reads out the position correction model image data (step S202). Thereafter, the CPU 105 executes the search process on the synthetic image data based on the read position correction model image (step S204). The CPU 105 then determines whether or not the search process is successful (step S206). If the search process fails (NO in step S206), the CPU 105 notifies that the search process failed, and terminates the process.

If the search process is successful (YES in step S206), the CPU 105 performs image conversion based on the result of the search process on the synthetic image data (step S208). More specifically, the CPU 105 changes the direction and/or size of the synthetic image data so that the synthetic image data and the model image data are arranged in correspondence. The process then proceeds to step S210.

In step S210, the CPU 105 initializes the variable i (i←1). The CPU 105 then reads out the color information $(R_i, G_i, B_i)$ at the coordinate position i of the synthetic image data (or synthetic image data after image conversion) (step S212), and reads out the color information $(R^{(m)}_i, G^{(m)}_i, B^{(m)}_i)$ at the coordinate position i of the model image data (step S214). Furthermore, the CPU 105 calculates the color information $(R-R^{(m)}_i, G_i - G^{(m)}_i, B_i - B^{(m)}_i)$ of the difference of the read color information $(R_i, G_i, B_i)$ and the color information $(R^{(m)}_i, G^{(m)}_i, B^{(m)}_i)$ (step S216).

The CPU 105 then calculates the luminosity $V_i$ of the calculated color information of the difference (step S218). Specifically, the luminosity $V_i$ is calculated according to the calculation formula $V_i = \sqrt{\{(R-R^{(m)}_i)^2 + (G_i - G^{(m)}_i)^2 + (B_i - B^{(m)}_i)^2\}}$. The CPU 105 then executes the mapping process on the calculated luminosity $V_i$ (step S220). In other words, the CPU 105 executes the mapping process shown in FIG. 29 on the calculated luminosity V.

Thereafter, the CPU 105 outputs the tone value $Y_i$ obtained by the mapping process as a component value at the coordinate position i of the output image data (step S222). Furthermore, the CPU 105 determines whether or not the current coordinate position i is the final position contained in the synthetic image data (step S224). If the current coordinate position i is not the final position contained in the synthetic image data (NO in step S224), the CPU 105 adds "1" to the current position i (i←i+1) (step S226), and the processes after step S214 are repeated.

If the current coordinate position i is the final position contained in the first image data and the second image data (YES in step S224), the CPU 105 outputs the generated output image data to the subsequent processes and/or displays the same on the monitor 102 (step S228). Thereafter, the process is terminated.

(k4. Edge Extracting Process)

The edge extracting process will now be described with reference to FIG. 31. In the edge extracting process shown in FIG. 31, the process when using the Laplacian filter will be illustrated. For the sake of convenience of the explanation, assume that the coordinate position of the synthetic image data is represented as a two-dimensional coordinate (k, l) (where $1 \leq k \leq XX$; $1 \leq l \leq YY$; k×l=n).

With reference to FIG. 31, the CPU 105 initializes the variable k and the variable l (k←1, l←1) (step S300).

In steps S302 to S334, a spatial filtering process on the pixel of coordinate position (k, l) is executed.

In other words, the CPU 105 initializes the variable SUM (SUM←0) (step S302), and initializes the variable a and the variable b (a←−1, b←−1) (step S304). The CPU 105 thereafter reads out the color information $(R_{k+a, l+b}, G_{k+a, l+b}, B_{k+a, l+b})$ at the coordinate position (k+a, l+b) of the synthetic image data (step S306), and calculates the luminosity $V_i$ of the relevant color information (step S308). Specifically, the luminosity $V_{k+a, l+b}$ is calculated according to the calculation formula $V_i = \sqrt{(R_{k+a, l+b}^2 + G_{k+a, l+b}^2 + B_{k+a, l+b}^2)}$.

Furthermore, the CPU 105 adds the value, which is obtained by multiplying a weighting coefficient W(a, b) to the luminosity $V_{k+a, l+b}$ calculated in step S308, to the variable SUM (SUM←SUM+$V_{k+a, l+b}$×W(a,b)) (step S310). The weighting coefficient W(a, b) takes the following values.

W(−1,−1)=−1, W(0,−1)=−1, W(1,−1)=−1, W(−1,0)=−1, W(0,0)=8, W(1,0)=−1, W(−1,1)=−1, W(0,1)=−1, W(1,1)=−1

Thereafter, the CPU 105 adds "1" to the current variable a (a←a+1) (step S312), and determines whether or not the variable a≦1 is satisfied (step S314). If a≦1 is satisfied (YES in step S314), the processes after step S306 are repeated.

If a≦1 is not satisfied (NO in step S314), the CPU 105 adds "1" to the current variable b (b←b+1) (step S316), and determines whether or not the variable b≦1 is satisfied (step S318). If b≦1 is satisfied (YES in step S318), the CPU 105 initializes the variable b (b←−1) (step S320), and repeats the processes after step S306.

If the variable b≦1 is not satisfied (NO in step S318), the CPU 105 outputs the value of the current variable SUM as the edge intensity $ED_{k,l}$ (step S322). The CPU 105 then executes the mapping process on the calculated edge intensity $ED_{k,l}$ (step S324). In other words, the CPU 105 executes the mapping process shown in FIG. 29 on the calculated edge intensity $ED_{k,l}$. The CPU 105 outputs the tone value $Y_i$ obtained by the mapping process as the component value at the coordinate position (k, l) of the output image data (step S326).

The CPU 105 adds "1" to the current variable k (k←k+1) (step S328), and determines whether or not the variable k≦XX is satisfied (step S330). If the variable k≦XX is satisfied (YES in step S330), the processes after step S302 are repeated.

If the variable k≦XX is not satisfied (NO in step S330), "1" is added to the current variable k (l←l+1) (step S332), and whether or not the variable l≦YY is satisfied is determined (step S334). If the variable l≦YY is satisfied (YES in step S334), the variable k is initialized (k←−1) (step S336), and the processes after step S302 are repeated.

If the variable l≦YY is not satisfied (NO in step S334), the generated output image data is output to the subsequent processes and/or displayed on the monitor 102 (step S338). The process is thereafter terminated.

(k5. Band Pass Filtering Process)

The band pass filtering process will now be described with reference to FIG. 32. With reference to FIG. 32, the CPU 105 reads out the user set window sizes S1 and S2 (step S400). The CPU 105 then executes the smoothing process at the window size of S1×S1 with respect to the synthetic image data to generate the first image data (step S402). The CPU 105 concurrently executes the smoothing process at the window size of S2×S2 with respect to the synthetic image data to generate the second image data (step S404).

The CPU 105 initializes the variable i (i←1) (step S406). The CPU 105 thereafter reads out the color information ($R^{(1)}_i$, $G^{(1)}_i$, $B^{(1)}_i$) at the coordinate position i of the first image data (step S408), and reads out the color information ($R^{(2)}_i$, $G^{(2)}_i$, $B^{(2)}_i$) at the coordinate position i of the second image data (step S410). Furthermore, the CPU 105 calculates the color information ($R^{(1)}_i - R^{(2)}_i$, $G^{(1)}_i - G^{(2)}_i$, $B^{(1)}_i - B^{(2)}_i$) of the difference of the read color information ($R^{(1)}_i$, $G^{(1)}_i$, $B^{(1)}_i$) and the color information ($R^{(2)}_i$, $G^{(2)}_i$, $B^{(2)}_i$) (step S412).

The CPU 105 then calculates the luminosity $V_i$ of the calculated color information of the difference (step S414). Specifically, the luminosity $V_i$ is calculated according to the calculation formula $V_i = \sqrt{(R^{(1)}_i - R^{(2)}_i)^2 + (G^{(1)}_i - G^{(2)}_i)^2 + (B^{(1)}_i - B^{(2)}_i)^2}$. The CPU 105 then executes the mapping process on the calculated luminosity $V_i$ (step S416). In other words, the CPU 105 executes the mapping process shown in FIG. 29 on the calculated luminosity $V_i$.

Thereafter, the CPU 105 outputs the tone value $Y_i$ obtained by the mapping process as a component value at the coordinate position i of the output image data (step S418). Furthermore, the CPU 105 determines whether or not the current coordinate position i is the final position contained in the first image data and the second image data (step S420). If the current coordinate position i is not the final position contained in the first image data and the second image data (NO in step S420), the CPU 105 adds "1" to the current position i (i←i+1) (step S422), and the processes after step S408 are repeated.

If the current coordinate position i is the final position contained in the first image data and the second image data (YES in step S420), the CPU 105 outputs the generated output image data to the subsequent processes and/or displays the same on the monitor 102 (step S424). Thereafter, the process is terminated.

L. Variant 1

In the above-described embodiment, the configuration in which the user sets the upper limit value and the lower limit value defining the mapping range in the mapping process has been described, but the mapping range may be automatically set based on the generated histogram. More specifically, the main component appearing on the histogram is specified, the degree of dispersion thereof is calculated, and the position and the width corresponding thereto are set in the mapping range.

M. Variant 2

In the above-described embodiment, the configuration in which various types of post-processes are applied to the entire synthetic image data has been described, but the post-process may be executed only on the partial image data of one part of the synthetic image data. In this case, the user sets the region to be processed in the synthetic image data on the user interface as shown in FIG. 14. If various types of post-processes are executed on the partial image data, the size of the output image data will also correspond to the size of the specified partial image data.

N. Other Embodiments

The program according to the present invention may be a program of calling out and executing the necessary module, of the program modules provided as part of the operating system (OS) of the computer, in a predetermined array and at a predetermined timing. In this case, the program itself does not include the module, and the process is executed in cooperation with the OS. The program that does not include the module is also encompassed in the program according to the present invention.

The program according to the present invention may be provided by being incorporated to one part of another program. In this case as well, the program itself does not include the module included in another program, and the process is executed in cooperation with another program. The program incorporated in another program is also encompassed in the program according to the present invention.

The provided program product is installed in a program storage unit such as a hard disc, and then executed. The program product includes the program itself, and the storage medium stored with the program.

Furthermore, one part of or all of the functions implemented by the program according to the present invention may be configured by a dedicated hardware.

O. Effects According to the Embodiment

According to the embodiment of the present invention, the input image data (e.g., eight bit tones of each color) acquired through imaging by the imaging unit are synthesized to generate the synthetic image data (e.g., 32 bit tones of each color) having pixel information of wider tone range, and then various types of post-processes are executed without reducing the amount of information of the synthetic image data. Thus, image processing such as the difference extracting process, the edge extracting process, the band pass filtering process, and the color extracting process can be carried out at higher accuracy.

Furthermore, according to the embodiment of the present invention, the image obtained as a result of image processing is output to the subsequent processes of the output destination and/or output in accordance with the tone range corresponding to the device. Thus, a special performance is not required on the subsequent processes of the output destination or the device. The existing image processing module for performing the detection process or the measurement process, and various types of devices thereby maintain high compatibility.

In other words, the image processing of high accuracy by the synthetic image data with enlarged dynamic range incorporating the detection/measurement module (typically, legacy software), in which the processable tones are limited, can be realized.

According to the embodiment of the present invention, increase in the calculation processing amount (processing time) in the detection process or the measurement process can be avoided although the synthetic image data containing greater amount of information is being handled.

The embodiments disclosed herein are illustrative in all aspects and should not be construed as being restrictive. The scope of the invention is defined by the Claims rather than by the description made above, and all modifications equivalent in meaning to the Claims and within the scope thereof are intended to be encompassed therein.

What is claimed is:

1. An image processing device connected to an imaging unit, in which exposure conditions are changeable;
the image processing device comprising:
an acquiring unit for acquiring a plurality of input image data by performing imaging over plural times at different exposure conditions using the imaging unit, the input image data containing pixel information defined with a first tone range corresponding to a detection sensitivity of the imaging unit;
a synthesizing unit for generating synthetic image data by synthesizing the plurality of input image data, the synthetic image data containing pixel information defined with a second tone range wider than the first tone range;
a processing unit for generating processed image data containing pixel information defined with the second tone range by performing image processing on the synthetic image data to facilitate detection or measurement related to an imaged target; and
a conversion unit for converting the processed image data to output image data containing pixel information defined with a third tone range narrower than the second tone range.

2. The image processing device according to claim 1, wherein the processing unit generates the processed image data by performing image data comparison on the synthetic image data.

3. The image processing device according to claim 2, wherein the processing unit generates the processed image data by calculating an image difference with respect to model image data registered in advance for the synthetic image data.

4. The image processing device according to claim 2, wherein
the processing unit includes,
a unit for generating first smoothed image data by performing a first smoothing process on the synthetic image data,
a unit for generating second smoothed image data by performing a second smoothing process different from the first smoothing process on the synthetic image data, and
a unit for generating the processed image data by calculating an image difference between the first smoothed image data and the second smoothed image data.

5. The image processing device according to claim 1, wherein the processing unit generates the processed image data reflecting a characteristic quantity on the pixel information contained in the synthetic image data.

6. The image processing device according to claim 5, wherein the processing unit calculates, from pixel information of each pixel and pixels adjacent to the pixel contained in the synthetic image data, the pixel information of each pixel of the processed image data corresponding to the pixel.

7. The image processing device according to claim 1, wherein
the image processing device is further connected to a display unit; and
the third tone range is adapted to a displayable tone in the display unit.

8. The image processing device according to claim 1, wherein the third tone range is adapted to an output destination device of the output image data.

9. The image processing device according to claim 1, wherein the conversion unit assigns the pixel information including a value being within a predetermined range of the pieces of pixel information of the processed image data to an effective value in the third tone range.

10. The image processing device according to claim 9, wherein
the image processing device is further connected to an input unit for accepting user instruction; and
when a lower limit value and an upper limit value are set through the input unit, the conversion unit assigns a tone value of the lower limit value of the third tone range with respect to a pixel, a value of the pixel information matching the lower limit value, and assigns a tone value of the upper limit value of the third tone range with respect to a pixel, a value of the pixel information matching the upper limit value.

11. The image processing device according to claim 1, wherein the processing unit generates the processed image data from image data, which is one part of the synthetic image data.

12. The image processing device according to claim 1, further comprising a detection measurement unit for executing a detection process or a measurement process related to the imaged target using the output image data.

13. An image processing method in a processing device connected to an imaging unit, in which exposure conditions are changeable;
the method comprising the steps of:
acquiring a plurality of input image data by performing imaging over plural times at different exposure conditions using the imaging unit, the input image data containing pixel information defined with a first tone range corresponding to a detection sensitivity of the imaging unit;

generating synthetic image data by synthesizing the plurality of input image data, the synthetic image data containing pixel information defined with a second tone range wider than the first tone range;

generating processed image data containing pixel information defined with the second tone range by performing image processing on the synthetic image data to facilitate detection or measurement related to an imaged target; and converting the processed image data to output image data containing pixel information defined with a third tone range narrower than the second tone range.

14. The image processing method according to claim 13, wherein the generating step includes a step of generating the processed image data by performing image data comparison on the synthetic image data.

15. The image processing method according to claim 13, wherein the generating step includes a step of generating the processed image data reflecting a characteristic quantity on the pixel information contained in the synthetic image data.

* * * * *